United States Patent
Kojima et al.

(10) Patent No.: US 8,133,567 B2
(45) Date of Patent: *Mar. 13, 2012

(54) INFORMATION RECORDING MEDIUM AND METHOD FOR PRODUCING THE SAME

(75) Inventors: Rie Kojima, Osaka (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/892,188

(22) Filed: Sep. 28, 2010

(65) Prior Publication Data

US 2011/0020582 A1    Jan. 27, 2011

Related U.S. Application Data

(62) Division of application No. 11/916,640, filed as application No. PCT/JP2006/310146 on May 22, 2006, now Pat. No. 7,829,169.

(30) Foreign Application Priority Data

Jun. 7, 2005  (JP) ................................ 2005-166488

(51) Int. Cl.
B32B 3/02 (2006.01)
(52) U.S. Cl. ..................... 428/64.1; 428/64.4; 428/64.6; 430/270.13
(58) Field of Classification Search .................. 428/64.4, 428/64.5; 430/270.13
See application file for complete search history.

(56) References Cited

U.S. PATENT DOCUMENTS

| 6,011,757 A * | 1/2000 | Ovshinsky ................. 369/13.35 |
| 6,242,157 B1 | 6/2001 | Tominaga et al. |
| 6,416,837 B1 | 7/2002 | Kojima et al. |
| 6,432,502 B1 | 8/2002 | Kitaura et al. |
| 7,063,876 B2 | 6/2006 | Nishihara et al. |

(Continued)

FOREIGN PATENT DOCUMENTS

EP          0 217 293          4/1987

(Continued)

OTHER PUBLICATIONS

International Search Report issued Aug. 22, 2006 in the International (PCT) Application of which the present application is the U.S. National Stage.

*Primary Examiner* — Elizabeth Mulvaney
(74) *Attorney, Agent, or Firm* — Wenderoth, Lind & Ponack, LLP

(57) ABSTRACT

An information recording medium ensuring high recording and erase function and excellent archival characteristic at a high linear velocity and over a wide range of linear velocities is provided. Such a medium is obtained by constructing a recording layer which has a composition that can generate phase change as a whole, of a first through an M-th constituent layers (wherein M is an integer of 2 or greater) which are stacked in a thickness direction, such that elemental compositions of contiguous an m-th constituent layer and a (m+1)th constituent layer are different from each other (wherein m is an integer and satisfies $1 \leq m \leq M$) assuming that the constituent layer located at an m-th position from a laser light incident side is the m-th constituent layer. In this information recording medium, at least one m-th constituent layer constituting the recording layer preferably includes at least one element selected from Te, Bi, Sb, Ge, In, Ga, Al, Sn, Pb, Se and Si.

32 Claims, 5 Drawing Sheets

U.S. PATENT DOCUMENTS

| | | | |
|---|---|---|---|
| 7,142,496 B2 * | 11/2006 | Miyagawa et al. | 369/59.11 |
| 7,709,073 B2 | 5/2010 | Kojima et al. | |
| 2001/0028938 A1 | 10/2001 | Kojima et al. | |
| 2004/0191683 A1 | 9/2004 | Nishihara et al. | |

FOREIGN PATENT DOCUMENTS

| | | |
|---|---|---|
| EP | 0 355 865 | 2/1990 |
| EP | 1 039 448 | 9/2000 |
| JP | 62-243144 | 10/1987 |
| JP | 63-237232 | 10/1988 |
| JP | 1-92937 | 4/1989 |
| JP | 3-165341 | 7/1991 |
| JP | 8-106647 | 4/1996 |
| JP | 2574325 | 10/1996 |
| JP | 2584741 | 11/1996 |
| JP | 2000-215509 | 8/2000 |
| JP | 2001-209970 | 8/2001 |
| JP | 2001-322357 | 11/2001 |
| JP | 2002-100071 | 4/2002 |
| JP | 2004-103136 | 4/2004 |
| JP | 2004-164686 | 6/2004 |
| JP | 2004-199786 | 7/2004 |
| JP | 2004-241046 | 8/2004 |
| JP | 2004-310992 | 11/2004 |

* cited by examiner

INFORMATION RECORDING MEDIUM AND METHOD FOR PRODUCING THE SAME

This is a divisional application of Ser. No. 11/916,640 now U.S. Pat. No. 7,829,169, filed Dec. 5, 2007, which is the National Stage of International Application No. PCT/JP2006/310146, filed May 22, 2006.

TECHNICAL FIELD

This invention relates to an information recording medium which is used for optically or electrically recording, erasing, overwriting and/or reproducing information, and a method for producing the same.

BACKGROUND OF THE INVENTION

The inventors have developed a 4.7 GB/DVD-RAM (hereinafter, DVD-RAM), which is an overwritable information recording medium used for datafiles and image files and have commercialized said DVD-RAM in the year 2000. In the original DVD-RAM put to practical use, a recording layer had a two-layer construction of SnTe/Ge—Sb—Te (see, for example, Japanese Patent Kokai (Laid-Open) Publication No. 2001-209970). This is a construction in which a crystallization improvement layer composed of SnTe having strong crystallinity is formed before a phase transformation layer composed of a high-speed crystallization material Ge—SB—Te (see, for example, Japanese Patent Publication No. 2584741) that has been conventionally used in a product thereof.

Moreover, the material of the recording layer of the DVD-RAM put to practical use includes Ge—Sn—Sb—Te (see, for example, Japanese Patent Kokai (Laid-Open) Publication No. 2001-322357). This is a material in which SnTe is added to GeTe and $Sb_2Te_3$. SnTe is a telluride whose crystalline structure is the same rock salt-type structure as that of GeTe, and therefore, SnTe is added to partially substitute for GeTe. Therefore, when this material was used, crystallization speed was enhanced without phase separation due to repeated recording. To ensure stability of the amorphous phase, addition concentration of the SnTe was carefully optimized. Thus, the present inventors have found that a practical recording layer is composed of a specific two-layer construction and is conveniently formed by materials to which specific additives are added.

Currently, 2-fold speed (22 Mbps) and 3-fold speed media are commercially available for DVD-RAMs. Moreover, 1-fold speed (36 Mbps) rewritable Blu-ray Discs (hereinafter, BD-RE) as recording media for high definition images were commercialized in 2004. Capacities of BD-REs are 25 GB and 50 GB. In recent years, increased data processing speeds have been required for media for datafile applications, and high-speed dubbing has been required for media for image file applications. Considering these requirements, further development is required for higher-speed recordable BD-REs and DVD-RAMs. Specifically, adaptation to 12-fold speed for BD-REs and 16-fold speed for DVD-RAMs is required.

16-fold speed corresponds to the linear speed at the outermost circumference of the medium when the rotation frequency of the drive motor is about 11000 rpm (the current approximate upper limit). For a recording method using constant angular velocity (hereinafter referred to as CAV), a 12-cm diameter medium provides a linear speed at the outermost circumference of the medium that is approximately 2.4 times larger than the linear speed at the innermost circumference. Therefore, development is required for CAV-mode BD-REs capable of recording/erasing favorably in the range of 5-fold speed to 12-fold speed, and for CAV-mode DVD-RAMs capable of recording/erasing favorably in the range of 6-fold speed to 16-fold speed.

For both BD-REs and DVD-RAMs, drastic improvement of crystallization speed of the recording layer material is essential for adapting to linear speeds several-times more than that of commercially available product. Accordingly, for example, increasing the concentration of SnTe in Ge—Sn—Sb—Te has been proposed, or material in which GeTe and $Bi_2Te_3$ are mixed, referred to as Ge—Bi—Te based material (see, for example, Japanese Patent Publication No. 2574325), has been proposed as an ultrahigh-crystallization-speed material.

DISCLOSURE OF INVENTION

Problems to be Solved by Invention

The inventors have confirmed that said SnTe/Ge—Sb—Te construction enhances crystallization speed while ensuring amorphous phase stability. If a phase-change material is made easy to be crystallized (easy to erase) by enhancing the crystallization speed, the crystallization temperature lowers and therefore stability of the amorphous phase decreases (archival characteristic of the recording mark decreases). In the two-layer construction of SnTe/Ge—Sb—Te, it is thought that SnTe having a low crystallization temperature functions to enhance the crystallization speed and Ge—Sb—Te having a high crystallization temperature functions to maintain stability of the amorphous phase and therewith, changes optically by laser beam irradiation so as to enable information to be recorded and reproduced. However, for the recording layer of a two-layer construction, crystallization speed is insufficient and the desired adaptation to 16-fold speed is not achievable even if the composition of Ge—Sb—Te or even the thickness of SnTe is adjusted.

Moreover, in the case of said Ge—Sn—Sb—Te, it has been necessary to increase the concentration of SnTe to a large amount in order to adapt to 16-fold speed. In such a case, problems have occurred that the concentration of Ge decreases (because GeTe is substituted by SnTe) reducing the degree of the optical change thereby lowering the signal quality, and that the crystallization temperature lowers such that stability of the amorphous phase cannot be ensured. Moreover, said Ge—Bi—Te has a crystallization speed sufficient to adapt to 16-fold speed, but the problem remains that even the stability of the signal recorded at 16-fold speed (namely, the amorphous phase formed at 16-fold speed) cannot be ensured. Thus, none of the two-layer construction of SnTe/Ge—Sb—Te, the Ge—Sn—Sb—Te layer or the Ge—Bi—Te layer can provide a medium capable of recording both at a high linear speed and over a wide linear speed range.

The present invention solves the problems as described above, and provides a recording layer which has a high crystallization speed and stability of an amorphous phase. Further, the object of the present invention is to provide, by applying this recording layer, an information recording medium which has a high erasability and excellent archival characteristic at a high linear velocity and over a wide range of linear velocities irrespective of the recording wavelength.

Means to Solve the Problems

An information recording medium of the present invention is an information recording medium including a recording layer having as a whole a composition which can generate phase change, characterized in that the recording layer includes constituent layers from first through M-th (M is an integer of 2 or more) that are stacked the thickness direction, and elemental compositions of the m-th constituent layer and the (m+1)th constituent layer are different from each other assuming that the constituent layer located at an m-th position from the laser beam incident side is the m-th constituent layer (m is an integer and satisfies $1 \leq m \leq M$).

"Recording layer having as a whole a composition which can generate phase change" refers to a recording layer having a composition as a whole which can generate phase change when the composition is represented by ratio of the components constituting the respective constituent layers, to the entire recording layer. Moreover, the term "constituent layer" in this specification is used for referring to the individual layers in the case that the recording layer composes two or more layers. Moreover, the meaning of the term "elemental composition" includes a simple substance as well as a combination of two or more elements. For example, it should be noted that when an m-th constituent layer is composed of a simple substance and a (m+1)th constituent layer is composed of another simple substance, or when an m-th constituent layer is a simple substance and a (m+1)th constituent layer is composed of two or more elements, the elemental compositions of said m-th constituent layer and said (m+1)th constituent layer shall be different from each other. Furthermore, a medium having a recording layer including two or more different parts as indicated by elemental composition analysis in the thickness direction is included in the medium of the present invention, even if interfaces between the layers are unclear (for example, a recording layer having elemental compositions that are different from each other when the elemental composition at two distinct positions in the thickness direction are compared).

That is, the information recording medium of the present invention is characterized by having a recording layer formed by dividing a composition which can generate phase change (hereinafter, referred to as "phase change composition") into a plurality of layers so that the contiguous layers are composed of different materials. In such a recording layer, characteristics of the components thereof appear more strongly and advantages provided by the respective components can be effectively used, as compared to that of a recording layer composed of a single layer in which each component of the phase change compositions is uniformly distributed. Accordingly, with the information recording medium of the present invention, higher crystallization temperature and larger crystallization speed can be achieved by appropriately selecting the reversible phase change composition and division form thereof.

In the information recording medium of the present invention, it is preferable that when M is 3 or more, the first constituent layer and the M-th constituent layer have the same elemental composition. Thereby, in the thickness direction of the recording layer, a cyclic structure can be obtained that contributes to improved performance of the recording layer, in particular to improvement of archival characteristics at lower-fold peeds. As described above, it should be noted that also when two constituent layers are composed of the same simple substance, the layers can be said to have the same elemental composition.

In the information recording medium of the present invention, the first constituent layer and the M-th constituent layer may have different elemental compositions irrespective of the number of M. Even by such a construction, various functions can be realized. Moreover, the medium having a recording layer of such a construction generally improves the archival overwrite characteristic at high-fold speeds.

It is preferable that the thickness dm (nm) of each of the constituent layers of the recording layer complies with $0.1 < dm \leq 15$. If dm is less than 0.1 nm, the function of each of the layers cannot be sufficiently exerted, and if dm is more than 15 nm (namely, if the thickness of one of the constituent layers is large), the thickness of another layer becomes small and it is difficult to obtain the effects of dividing the phase change composition into layers.

It is preferable that at least one m-th constituent layer is a layer including at least one element selected from Te, Bi, Sb, Ge, In, Ga, Al, Sn, Pb, Se, and Si (hereinafter, this layer is referred to for convenience as constituent layer R). The constituent layer R including such elements in a simple substance, mixture, alloy, or compound form provides various performances to the recording layer as a layer having a large optical change or a high crystallization speed.

It is preferable that the constituent layer R containing the said specific elements includes Te and at least one element of Ge, Al, In, and Ga. A constituent layer containing such elements has a high crystallization temperature and ensures stability of the amorphous phase at low linear speeds.

It is preferable that the constituent layer contiguous to said constituent layer R including Te and at least one element of Ge, Al, In, and Ga (hereinafter, this contiguous layer is referred to for convenience as constituent layer Q) includes Bi and Te. Materials containing Bi and Te are phase change materials having a high crystallization speed, and therefore, the constituent layer Q ensures reliability of erasability at high linear speeds. Moreover, when the constituent layer R including said specified elements and Te is contiguous to the constituent layer Q including Bi—Te, the materials of both layers come very close at the layer interface resulting in a mixed state, which thereby establishes the initial performance over the used linear velocity range. Accordingly, the combination of the specific two layers enables securement of initial performance and reliability.

The constituent layer Q may include at least one element selected from Sb, Ge, In, Ga, Al, Sn, Pb, Se, and Si. When such an element is included, performance of the recording layer (for example, archival characteristics at low linear velocities) can be further improved.

It is preferable that at least one constituent layer of the recording layer is a constituent layer including Sb (hereinafter, the layer is conveniently referred to as constituent layer T). As, for example, a film whose thickness is about 10 nm, Sb as a simple substance has a strong crystallinity and a crystallization temperature of 100° C. or less. By utilizing these properties of said Sb, the desired crystallinity can be provided for the recording layer, and therefore Sb as a simple substance can be preferably used. Moreover, when Sb is combined with another element, the crystallization temperature becomes high and reliability of the recording layer is enhanced, and therefore Sb is preferably used as a component of a constituent layer of the recording layer.

It is preferable that the constituent layer T including Sb also includes at least one element selected from Te, Al, In, Ge, Sn, and Ga. As described above, the Sb simple substance has a high crystallinity, and combining with one or a plurality of these said elements yields a recording material which can generate a reversible phase change. Furthermore, by adjusting the added amount of these elements, it becomes possible to raise the crystallization temperature to 200° C. or more and to optimize the crystallization speed according to conditions of use.

One of the m-th constituent layers preferably includes at least one rare-earth metal element selected from Sc, Y, La, Ce, Pr, Nd, Sm, Gd, Tb, Dy, Ho, Er, Yb, and Lu and includes at least one element selected from a group α consisting of Ge, Sb, Bi, and Te. The constituent layer including the elements selected from such two groups (hereinafter, the layer is referred to for convenience as constituent layer X) has a high crystallization temperature and therefore the crystallization temperature of the recording layer can be improved.

It is preferable the constituent layer X includes at least one element selected from a group β consisting of Al, Ag, Au, Co, Cr, Cu, Fe, Ga, Hf, In, Ir, Mn, Mo, Nb, Ni, Os, Pb, Pd, Pt, Re, Rh, Ru, Se, Si, Sn, Ta, Ti, V, W, Zn and Zr. When such an element is included in said specific layer, it becomes possible to adjust the crystallization temperature or the crystallization speed.

The information recording medium of the present invention can be provided such that two or more information layers are included and at least one information layer out of the information layers includes a recording layer composed of a plurality of said constituent layers. This information recording medium makes it easier to record information as desired (for example, at a high speed) by means of a recording layer which is divided into a plurality of constituent layers.

In the recording layer composed of the plurality of constituent layers, occasionally, an interface between the layers is not clear by such a reason as low thickness of each constituent layer or irradiation by laser beam in an initialization step. As described above, the information recording medium including such a recording layer is also included in the scope of the present invention, and can be specified as follows. That is, the present invention also provides an information recording medium including a recording layer having as a whole a composition which can generate phase change, in which the recording layer includes two or more elements and the elemental composition changes in the thickness direction. In other words, in the recording layer of this information recording medium, the composition distribution is not constant in the thickness direction. The elemental composition may be changed so that one elemental composition appears periodically according to the above-described preferable recording layer composition. Alternatively, the elemental composition in the recording layer may be changed, for example, so that one element gradually decreases in the incoming direction of the laser beam, while another element gradually increases.

Also, the present invention provides a method for producing an information recording medium of the present invention including a step of forming a recording layer having as a whole a composition which can generate phase change, in which the step of forming the recording layer includes a first through an M-th steps (M being an integer of 2 or more), and assuming that the step carried out m-thly is an m-th step (m being an integer and complying with $1 \leq m \leq M$), the m-th step and a (m+1) step that are successive are performed by using sputtering targets whose elemental compositions are different from each other.

Effect Of Invention

According to the information recording medium of the present invention, a high erasability and excellent archival characteristic can be realized at a high linear velocity and over a wide range of linear velocities. Specifically, recording on a BD-RE can be performed from 12-fold speed to 5-fold speed, and recording on a DVD-RAM can be performed from 16-fold speed to 6-fold speed. Furthermore, the present invention provides an information recording medium having a high erasability even at a high linear speed and having an excellent archival characteristic of a signal recorded at a low linear speed, irrespective of recording density and capacity and recording wavelength.

| EXPLANATION OF LETTERS OR NUMERALS | |
|---|---|
| 100, 200, 300, 400 | information recording medium |
| 35, 107, 214, 301, 401 | substrate |
| 102, 105, 202, 205, 207, 209, 212, 302, 306 | dielectric layer |
| 103, 203, 210, 303, 305 | interface layer |
| 104, 204, 211, 304, 403 | recording layer |
| 121, 221, 231, 321 | first constituent layer |
| 122, 222, 232, 322 | second constituent layer |
| 123, 223, 233, 323 | m – th constituent layer |
| 124, 224, 234, 324 | (m + 1)th constituent layer |
| 125, 225, 235, 325 | M – th constituent layer |
| 307 | optical compensation layer |
| 106, 206, 213, 308 | reflective layer |
| 309 | adhesive layer |
| 310 | dummy substrate |
| 208 | intermediate layer |
| 101, 201 | cover layer |
| 240 | first information layer |
| 250 | second information layer |
| 120, 220, 320 | laser beam |
| 402 | lower electrode |
| 404 | upper electrode |
| 405 | pulse producing part |
| 406 | resistance measuring device |
| 407, 408 | switch |
| 409 | application part |
| 410 | judgment part |
| 411 | electrically recording/reproducing device |
| 32 | exhaust port |
| 33 | sputtering gas inlet |
| 34 | substrate holder (anode) |
| 36 | sputtering target (cathode) |
| 37 | target electrode |
| 38 | electric power supply |
| 39 | sputtering chamber |

DETAILED DESCRIPTION OF THE PREFERRED EMBODIMENTS

Hereafter, embodiments of the present invention are described with reference to the accompanying drawings. The following embodiments are illustrative, and the present invention is not limited to the following embodiments.

Embodiment 1

Figure 1:
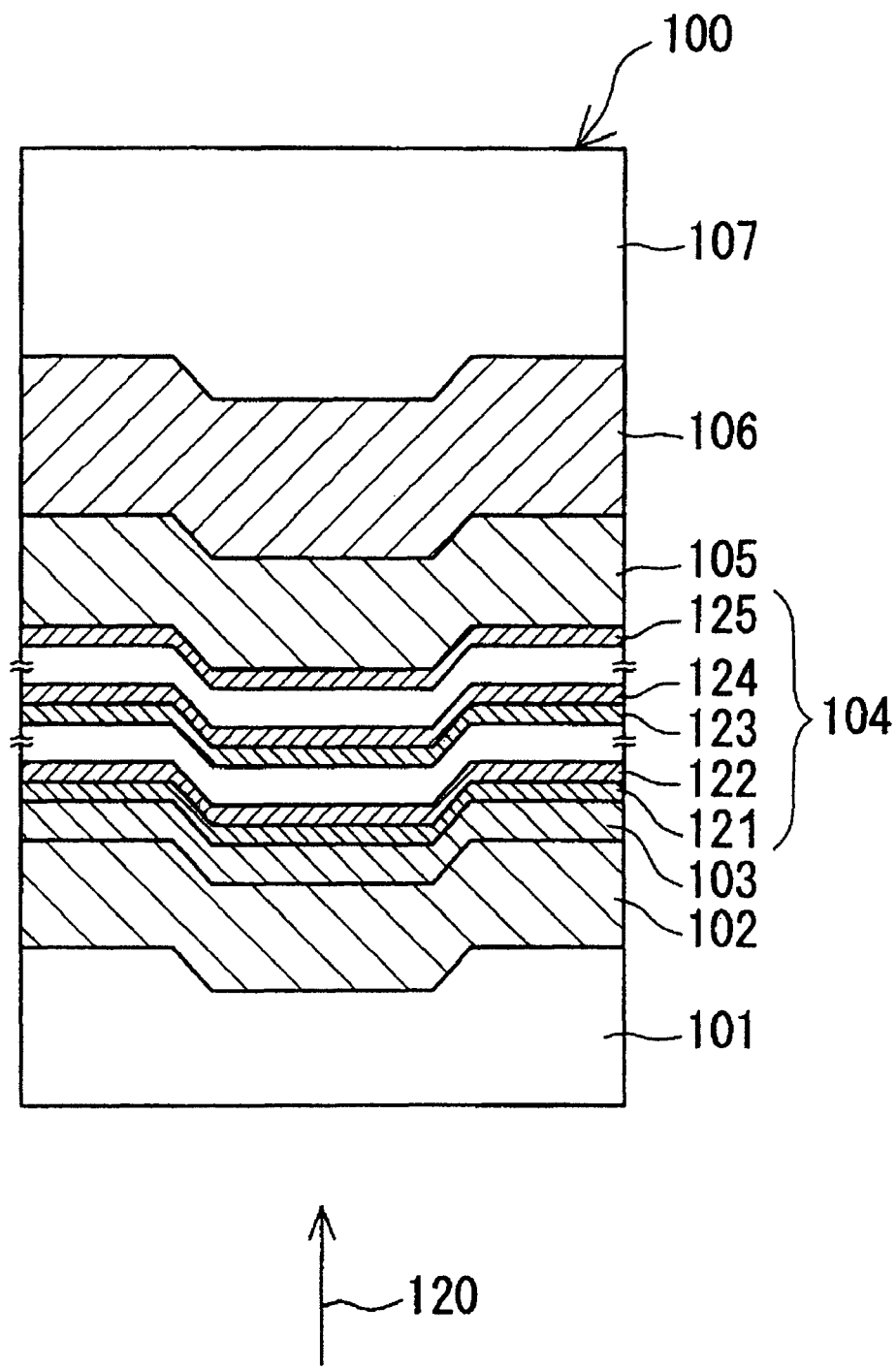
FIG. 1 is a fragmentary sectional view which shows an example of an information recording medium of the present invention.

As Embodiment 1 of the present invention, an example of an optical information recording medium on and from which information is recorded and reproduced by a laser beam, is described. FIG. 1 shows a partial cross-section of the optical information recording medium.

The information recording medium 100 shown in FIG. 1 has a construction in which a reflective layer 106 is formed on one surface of a substrate 107, a dielectric layer 105 is formed on a surface of the reflective layer 106, a recording layer 104 is formed on a surface of the dielectric layer 105, an interface layer 103 is formed on a surface of the recording layer 104, and a dielectric layer 102 is formed on a surface of the interface layer 103, whereupon a cover layer 101 is formed. In this structure, the recording layer 104 includes a first through an M-th constituent layers, and from the side of dielectric layer 105, the M-th constituent layer 125, . . . , the (m+1)th constituent layer 124, the m-th constituent layer 123, . . . , the second constituent layer 122, and the first constituent layer 121 are formed successively.

The information recording medium of this construction can be used as a Blu-ray Disc having a 25-GB capacity on and from which information is recorded and reproduced by a laser beam with a wavelength of about 405 nm in a violet-blue region. A laser beam 120 enters from the cover layer 101 side into the information recording medium 100 of this construction, and conducts the recording and reproduction of information.

The information recording medium of the present invention is characterized in that the recording layer of a particular constitution. Therefore, the recording layer 104 is firstly described.

The recording layer 104 has characteristics:
1) the first through the M-th constituent layers (M is an integer of 2 or more) that are stacked in a thickness direction are included;
2) the elemental compositions of the m-th constituent layer and the (m+1)th constituent layer are different from each other, in which the constituent layer located at an m-th position from a laser beam incident side is set to the m-th constituent layer (m is an integer and complies with $1 \leq m \leq M$); and
3) the composition generates a phase change (reversible phase change in the case of BD-RE) as a whole, namely, the composition of the entire recording layer becomes a composition that can generate phase change, when the composition of the entire recording layer is represented by the ratio of components constituting the respective constituent layers.

By forming the recording layer by the constituent layers having different elemental compositions from each other, the characteristics which have been difficult to be compatible in the case of the recording layer of one-layer construction (hereinafter, such a recording layer is also referred to as "single recording layer") become compatible, or more excellent performance can be obtained. The individual constituent layers do not necessarily need a composition that can generate phase change by irradiation of a laser beam as long as the recording layer in total has a composition that can generate phase change. Moreover, each of the constituent layers is not required to be formed continuously over the entire area of the medium. By the convenience of film-forming, the constituent layer may be interrupted partially and, for example, may be formed as scattered island shapes.

In a medium having a single recording layer, the initial performance (performance at room temperature) of the medium can be established, but it becomes difficult to establish reliability under high-temperature and high-humidity conditions supposed as the working environment or the transit environment. Furthermore, in the case that recording and reproduction of the medium are performed at high and over a wide range of linear speeds, establishment of reliability becomes more difficult.

For example, for developing an information recording medium adapted for a high linear velocity and for a wide range of linear velocities, a phase change material having a high crystallization speed is required to be used. However, it is known that a material which can generate phase change from amorphous phase to crystal phase has a tendency of relatively lower crystallization temperatures when the crystallization speed is relatively high. That is, if a material having a high crystallization speed is used, it becomes difficult to ensure stability of the amorphous phase at a low linear speed.

The recording layer 104 of the information-recording medium 100 of the present invention reduces or eliminates such difficulties. This is considered to be due to the following reason. It should be noted that the present invention is not limited by such considerations. The plurality of constituent layers together shows characteristics of the respective constituent layers because they are partially mixed such that the interface between the layers appears to cease to exist if irradiated with a laser. Simultaneously, the respective constituent layers partially maintain their forms as independent layers and show characteristics of materials constituting the respective constituent layers. That is, it can be thought that the respective layers are not completely mixed by laser irradiation, but a mixed part and an unmixed part in which composition of each of the constituent layers remains, are formed in the recording layer 104. Such construction cannot be obtained by merely mixing two or more components, but is achieved by dividing the respective components in a laminated structure.

Accordingly, for example, in the case that the recording layer 104 is comprised of a constituent layer composed of a material having a high crystallization temperature and a constituent layer composed of a phase change material having a high crystallization speed, the initial performance over the linear speed range used can be established by mixing the two constituent layers with each other, and the constituent layer of the material having a high crystallization temperature ensures stability of the amorphous phase at a low linear speed and the constituent layer of a phase-change material having a high crystallization speed ensures reliability of erasability at a high linear speed. As a result, a recording layer 104 whose crystallization speed is high and whose crystallization temperature is high can be realized, thus realizing an information recording medium 100 adapted to high linear velocities and a wide range of linear velocities. That is, a laminated structure divided into a layer of a material having a high recording-layer crystallization temperature and a layer of a phase-change material having a crystallization speed allows realization of an information recording medium in which the advantages of these materials are more fully utilized.

The respective constituent layers 121-125 can be formed by appropriately selecting the components and thicknesses such that, with one composition formula combining all the components of the constituent layers, the material of said formula can generate phase change (reversible phase change in the case of BD-RE). In the present invention, the compositional formula represented by combining all the components composing the recording layer 104 (this is also referred to as "recording-layer compositional formula") may be a publicly-known compositional formula of a phase-change material and can be appropriately selected according to the type of the recording medium.

For example, when the medium is a BD-RE, it is preferable that the recording-layer compositional formula has a composition that can generate a reversible phase change and is a compositional formula of a material including GeTe and $Bi_2Te_3$. If GeTe is included, a recording layer having a large optical change can be obtained. An optical change means the change in the complex index of refraction when the recording layer undergoes a phase change between amorphous and crystalline phases. In further detail, an optical change means a difference between a complex index of refraction of a crystal phase (nc−ikc) and a complex index of refraction of an amorphous phase (na−ika), $\Delta n$ and $\Delta k$. Herein, "nc" is the refractive index of the crystal phase, "kc" is the extinction coefficient of the crystal phase, "na" is the refractive index of the amorphous phase, "ka" is the extinction coefficient of the amorphous phase, $\Delta n = nc - na$ and $\Delta k = kc - ka$. As the optical change is larger, the signal amplitude detected from the recording signal becomes larger. Accordingly, when the recording layer contains a large amount of GeTe, good signal quality can be obtained. When the recording layer, however, is formed from only GeTe, the crystallization speed is reduced and the capability for repeated recording deteriorates. For this reason, the proportion of GeTe is required to be less than 100 mol %, and preferably less than 98 mol %.

$Bi_2Te_3$ is a material whose crystallinity is very strong such that it has a crystallization temperature below room temperature in a thin-film form, and therefore recording layers that include $Bi_2Te_3$ achieve large crystallization speeds. The ratio of $Bi_2Te_3$ is optimized with respect to the ratio of GeTe, and thereby, a recording-layer composition suitable for the conditions of use can be obtained. Accordingly, by containing GeTe and $Bi_2Te_3$, an excellent recording layer having a large optical change and high crystallization speed can be obtained.

Moreover, if the material including GeTe and $Bi_2Te_3$ also includes a material selected from telluride compounds and antimonide compounds, it becomes possible that the reliability is further enhanced and the crystallization speed is further increased. For example, $In_2Te_3$ has the same valence as $Bi_2Te_3$ and has a high melting point, and therefore the crystallization temperature can be enhanced and stability of the amorphous phase can be obtained when $In_2Te_3$ is included in the recording layer. This means that signals do not deteriorate even when the information recording medium with signals recorded is left under a high-temperature condition. However, because the crystallization speed is reduced by too much addition, it is preferable to optimize the ratio thereof with respect to the ratio of GeTe and the ratio of $Bi_2Te_3$.

One preferable example of recording-layer composition of a BD-RE used at 2-fold speed to 5-fold speed is represented by $(GeTe)_x(Bi_2Te_3)_y(In_2Te_3)_{100-x-y}$ (mol %) (in the formula, x and y comply with $90 \leq x < 100$, $0 < y < 10$, and $90 < x+y < 100$). In the above-described formula, $In_2Te_3$ may be replaced by SnTe, PbTe, SeSn, BiTe, or BiSe, and in this case, the crystallization speed can be further increased. Alternatively, $In_2Te_3$ may be replaced by $SiTe_2$, $SiSe_2$, $Ga_2Te_3$, $Al_2Te_3$, or $Sb_2Te_3$. Moreover, GaTe and InTe have the same properties as GeTe and therefore a part or all of GeTe may be replaced by GaTe or InTe in the above-described formula.

The recording-layer compositional formula is not limited to the above-described formula. For example, a composition formula in which a plurality of telluride compounds selected from $Bi_2Te_3$, BiTe, $Sb_2Te_3$, GeTe, $In_2Te_3$, InTe, $Ga_2Te_3$, GaTe, $Al_2Te_3$, SnTe, $SiTe_2$, and PbTe are combined and a compositional formula in which one or a plurality of telluride compounds selected from these telluride compounds is/are combined with one or a plurality of selenide compounds selected from SeSn, $Bi_2Se_3$, BiSe, and $SiSe_2$ may be determined as the recording-layer compositional formulas, and the respective constituent layers may be formed. The ratio of each of the compounds is appropriately selected according to type of the recording medium and recording speed. The recording-layer compositional formula is not always shown by the ratio of the compounds but may be shown by the ratio of the elements.

Another example of the recording-layer compositional formula contains a large amount of a material having a crystallization temperature of 25° C. or less and having very strong crystallinity. Here, the material having a crystallization temperature of 25° C. or less represents a material in which at least one part is crystallized in room temperature (appropriately 25° C.) when the material is formed into a thickness of 10 nm. According to the present invention, the ratio of such a material in the recording-layer composition formula can be, for example, 40 mol % or more, 45 mol % or more, 50 mol % or more, or 60 mol % or more. If the recording layer of single-layer structure contains the material having strong crystallinity in such a ratio, the reliability is reduced and it becomes difficult to use the recording layer for high-speed recording. According to the present invention, by dividing such a recording-layer compositional formula into a plurality of components to make the recording layer a laminated structure, a medium satisfying both of the initial performance and reliability can be obtained. The recording layer containing a large amount of the material having a crystallization temperature of 25° C. or less is particularly preferably used in the recording medium of FIG. 1 and the medium of FIG. 2 described below.

Materials having a crystallization temperature of 25° C. or less include $Bi_2Te_3$, SnTe, PbTe, SeSn, and BiSe. As the material to be combined with such a material having strong crystallinity, a material having a large optical change and having a high crystallization temperature such as GeTe, GaTe, AlTe, or InTe may be used. Furthermore, as another material, $M_2Te_3$ (M is at least one element selected from Sb, In, Ga, and Al) may be included.

After selecting the recording-layer compositional formula, the components of the compositional formula are divided into a plurality of groups to form the constituent layers 121-125. The division of the compositional formula may be performed by a compound unit or performed by an element unit. For example, the above-described compositional formula represented by $(GeTe)_x(Bi_2Te_3)_y(In_2Te_3)_{100-x-y}$ (mol %) may be divided into three groups of GeTe, $Bi_2Te_3$ and $In_2Te_3$. Alternatively, one group may be a simple substance. Alternatively, the compositional formula may be divided into two groups in which one group is composed of GeTe, $Bi_2Te_3$, and $In_2Te_3$, and another group is composed of GeTe. Or, the compositional formula may be divided into two groups in which one group is composed of GeTe, and another group is composed of $Bi_2Te_3$ and $In_2Te_3$. Furthermore, one group may be divided into a plurality of groups. For example, as described later, one group is divided into two when the elemental compositions of the first constituent layer and the M-th constituent layer are the same.

The division of the recording-layer into groups involves determination of thicknesses of the respective constituent layers. That is, for example, when the compositional formula of $(GeTe)_{95}(Bi_2Te_3)_3(In_2Te_3)_2$ (mol %) is divided into three groups of GeTe, $Bi_2Te_3$, and $In_2Te_3$, the ratio of the thicknesses of the constituent layers formed by the respective compounds becomes the same as the ratio of the compounds in the compositional formula and becomes 95:3:2. In the case that a plurality of the constituent layers composed of GeTe is formed, the thicknesses of the respective GeTe layers are determined so that the entire thickness of the GeTe layer: the thickness of $Bi_2Ti_3$ layer: the thickness of $In_2Te_3$ becomes 95:3:2.

It is preferable that a thickness of each of the constituent layers is from 0.1 nm to 15 nm. That is, it is preferable that a thickness dm (nm) of the m-th constituent layer complies with $0.1 \leq dm \leq 15$ in $1 \leq m \leq M$. In $1 \leq m \leq M$, all the constituent layers may have the same dm, or at least one of the m-th constituent layers may have a different dm. Moreover, dm complies with dm<D when the thickness of the recording layer 104 is set to D (nm).

The combinations of M, D, and dm are exemplified as follows.
(1) M=10, D=10, all of dm are 1.
(2) M=10, D=10, d1=0.1, d2=0.3, d3=0.5, d4=2, d5=2.1, d6=2.1, d7=2, d8=0.5, d9=0.3, d10=0.1.
(3) M=2, D=15, d1=5, d2=10.
(4) M=30, D=15, all of dm are 0.5.
(5) M=2, D=11, d1=2, d2=9.
(6) M=3, D=11, d1=2, d2=7, d3=2.
(7) M=4, D=10, d1=1, d2=2, d3=3, d4=4.
(8) M=5, D=10, all of dm are 2.
(9) M=3, D=10, d1=1, d2=8, d3=1.
(10) M=2, D=13, d1=3, d2=10.

The constituent layers may be formed by dividing the recording-layer compositional formula so that the first constituent layer (m=1) 121 and the M-th constituent layer 125 have the same elemental composition for example, in the case that M is 3 or more. In this case, if M is an odd number of 3 or more, the recording layer can be designed so that the constituent layers having the same elemental compositions are alternately disposed. In the recording layer in which the constituent layers having specific compositions are regularly disposed, the composition is periodically changed, and also, the composition distribution can be homogenous to some extent, and therefore, the performance of the recording layer becomes more excellent.

Of course, occasionally, the elemental compositions of two or more constituent layers are not completely identical by the difference of the conditions or the like when the constituent layers are formed by sputtering which is described later. In this case, the elemental compositions of the respective constituent layers may be analyzed by the following technique to be described as one example, and thereby, whether the elemental compositions of two or more constituent layers are the same or different can be judged. First, the information recording medium 100 is sliced thinly along the thickness direction into thin sections with exposed cross-sections (for example, thin sections in which a cross-section as shown in FIG. 1 is visible). The section of the recording layer shown in the thin section is observed by a transmission electron microscope. If the recording layer is constructed by lamination of a plurality of constituent layers, a plurality of interfaces should be observed in the recording layer.

Next, by using, for example, energy-dispersive X-ray spectroscopy (EDS), an electron beam is irradiated on the section and energy conversion is performed for the characteristic X-ray radiated from each of the constituent layers (the regions between the interfaces). Thereby, the elements contained in the respective constituent layers and the ratio of each of the elements can be analyzed. The ratio (atomic %) of all the elements (including impurities) contained in the constituent layers is obtained, and if the differences in the ratio for the respective elements are within the composition analysis accuracy (generally, for example, ±5%), it is practically not a problem to consider the elemental compositions of the constituent layers as the same. Moreover, if the difference in the ratio for each of the elements is larger than the composition analysis accuracy, the elemental compositions of the constituent layers thereof may be considered as being different.

It is preferable that the elemental analysis is performed by slicing thin sections from a region of the information recording medium 100, which region is in a state of as-depo (a film-formed state which is not initialized). In some media, the state of as-depo is left in the innermost circumference or the outermost circumference of the film-formed region. Even when the entire area of the medium is initialized, whether the elemental compositions are the same or different may be judged by the same technique.

Alternatively, the recording layer 104 may be designed so that the first constituent layer (m=1) 121 and the M-th constituent layer 125 have different elemental compositions. Moreover, in any design of the recording layer, the recording layer is required to be designed so that the contiguous constituent layers have elemental compositions that are different from each other.

In the recording layer 104, it is preferable that at least one constituent layer contains at least one element selected from Te, Bi, Sb, Ge, In, Ga, Al, Sn, Pb, Se, and Si. These elements may be contained in the constituent layer as compounds and may be contained as at least one compound selected from $Bi_2Te_3$, BiTe, $Sb_2Te_3$, GeTe, $In_2Te_3$, InTe, $Ga_2Te_3$, GaTe, $Al_2Te_3$, SnTe, PbTe, SeSn, $Bi_2Se_3$, BiSe, $SiTe_2$, and $SiSe_2$. Alternatively, at least one constituent layer may be composed of any one simple substance selected from a Te simple substance, Bi simple substance, Sb simple substance, Ge simple substance, In simple substance, Al simple substance, Sn simple substance, Pb simple substance, Se simple substance, and Si simple substance.

A constituent layer containing at least one of said specific elements (hereinafter, conveniently referred to as constituent layer R) may be a layer composed of a combination of 2 or more compounds, combination of 2 or more elements, or combination of at least one compound and at least one element. For example, the combination is realized in a form of mixture or alloy. Specifically, the constituent layer R may contain:

GeTe-(M1)$_2$Te$_3$ (M1 is at least one element selected from Bi, Sb, In, Ga, and Al) (here, and hereafter, "-" means combination);

GeTe-(M2)Te (M2 is at least one element selected from Bi, In, Ga, Sn, Pb, Sc, Y, La, Ce, Pr, Nd, Sm, Gd, Tb, Dy, Ho, Er, Yb, and Lu);

Bi—Te;

Bi-(M3), Bi—Te-(M3) (M3 is at least one element selected from Sb, Ge, In, Ga, Al, Sn, Pb, Se, Si, Sc, Y, La, Ce, Pr, Nd, Sm, Gd, Tb, Dy, Ho, Er, Yb, and Lu);

Te-(M4) (M4 is at least one element selected from Al, Se, Si, Sc, Y, La, Ce, Pr, Nd, Sm, Gd, Tb, Dy, Ho, Er, Yb, and Lu); or Ge-(M5) (M5 is at least one element selected from Bi, Sb, In, Ga, Al, Sn, Pb, Se, Si, Sc, Y, La, Ce, Pr, Nd, Sm, Gd, Tb, Dy, Ho, Er, Yb, and Lu)

For example, a combination of two or more constituent layers may be GeTe/$Bi_2Te_3$, GeTe/$Bi_2Te_3$/$In_2Te_3$, GeTe/$Bi_2Te_3$/$Ga_2Te_3$, GeTe/$Bi_2Te_3$/$Al_2Te_3$, GeTe/$Bi_2Te_3$/$Sb_2Te_3$, GeTe/$Sb_2Te_3$, GeTe/$Sb_2Te_3$/$In_2Te_3$, GeTe/$Sb_2Te_3$/$Ga_2Te_3$, GeTe/$Sb_2Te_3$/$Al_2Te_3$, GeTe/$In_2Te_3$, GeTe/$Ga_2Te_3$, GeTe/$Al_2Te_3$, GeTe/SnTe/$Sb_2Te_3$, GeTe/SnTe/$Sb_2Te_3$/$In_2Te_3$, GeTe/SnTe/$Sb_2Te_3$/$Ga_2Te_3$, GeTe/SnTe/$Sb_2Te_3$/$Al_2Te_3$, GeTe/SnTe/$Bi_2Te_3$, GeTe/SnTe/$Bi_2Te_3$/$Sb_2Te_3$, GeTe/SnTe/$Bi_2Te_3$/$In_2Te_3$, GeTe/SnTe/$Bi_2Te_3$/$Ga_2Te_3$, GeTe/SnTe/

$Bi_2Te_3/Al_2Te_3$, $GeTe/PbTe/Sb_2Te_3$, $GeTe/PbTe/Bi_2Te_3$, $GeTe/PbTe/Bi_2Te_3/Sb_2Te_3$, $GeTe/Bi_2Se_3$, $GeTe/Sb_2Se_3$, $GeTe/In_2Se_3$, $GeTe/Ga_2Se_3$, $GeTe/Al_2Se_3$, $GeTe/SnTe/Sb_2Se_3$, $GeTe/SnTe/Bi_2Se_3$, $GeTe/SnTe/Bi_2Se_3/Sb_2Se_3$, $GeTe/PbTe/Sb_2Se_3$, $GeTe/PbTe/Bi_2Se_3$, $GeTe/PbTe/Bi_2Se_3/Sb_2Se_3$, $GaTe/Sb_2Te_3$, or $In_2Te_3/Sb_2Te_3$, wherein the combination of two or more constituent layers is represented by using "/" as the m-th constituent layer / the (m+1)th constituent layer / . . . . The combinations exemplified here do not necessarily represent construction of the entire constituent layers. For example, any of the exemplified combinations may be a part of the constituent layers included in a recording layer and other constituent layer may be included in the recording layer.

If the recording layer is irradiated with a laser beam, the interfaces in the layer become unclear, and occasionally, it becomes difficult to determine whether the layer is composed of a plurality of constituent layers. In such a case, the recording layer can be specified as a layer in which the elemental composition is changed in the thickness direction of the recording layer. For example, the recording layer of a three-layer structure in which the first/the second/the third constituent layers is constructed as $GeTe/PbTe/Bi_2Se$ is specified as a layer having a composition in which Ge concentration is the highest in the closest side to the laser incident beam and decreases gradually along the progression direction of the laser incident beam, and Bi and Se concentrations increase gradually along the progress direction of the laser incident beam to be the highest at the farthest side from the laser incident beam, Pb concentration becomes the highest inside the recording layer (inside representing the position that is distant from the interfaces between the recording layer and other layers). This is applicable for every recording layer composed of a plurality of constituent layers.

It is more preferable that the constituent layer R contains Te and at least one element selected from Ge, Al, In, and Ga because the crystallization temperature becomes 200° C. or more. Furthermore, in the case of producing a medium for performing high-speed recording, it is preferable that a constituent layer (this is referred to for convenience as constituent layer Q) that is contiguous to the constituent layer R includes Bi and Te. In this case, the layer composed of GeTe, AlTe, GaTe, or InTe, which is a material having a high crystallization temperature comes to be contiguous to a layer composed of Bi—Te, which is a phase-change material having a large crystallization speed. Thereby, good recording performance can be achieved.

Combinations of the constituent layer R/ the constituent layer Q include, for example, $GaTe/Bi_2Te_3$, $InTe/Bi_2Te_3$ and $AlTe/Bi_2Te_3$. Moreover, when M is 3 or more, the recording layer may be designed so that the combination of the constituent layer R/ the constituent layer Q/ the constituent layer R is $GeTe/Bi_2Te_3/GeTe$, $GeTe/Bi_2Te_3/GaTe$, or $GeTe/Bi_2Te_3/InTe$.

It is preferable that the constituent layer Q containing Bi and Te further includes at least one element selected from Sb, Ge, In, Ga, Al, Sn, Pb, Se, and Si. In this case, the combination of the constituent layer R/ the constituent layer Q includes $GeTe/GeTe—Bi_2Te_3$, $GaTe/GeTe—Bi_2Te_3$, $InTe/GeTe—Bi_2Te_3$, $GeTe/GeTe—Bi_2Te_3—In_2Te_3$, $GaTe/GeTe—Bi_2Te_3—In_2Te_3$, $InTe/GeTe—Bi_2Te_3—In_2Te_3$, $GeTe/GeTe—Bi_2Te_3—SiTe_2$, $GeTe/GeTe—Bi_2Te_3—Sb_2Se_3$, $GeTe/GeTe—SnTe—Bi_2Te_3$, $GeTe/GeTe—GaTe—Bi_2Te_3$, $GeTe/GeTe—AlTe—Bi_2Te_3$, $GeTe/GeTe—PbTe—Bi_2Te_3$, $GeTe/GeTe—Bi_2Se_3$. By the combination of these constituent layers, the recording layer 104 having a high crystallization temperature and having a high crystallization speed can be realized.

Alternatively, in the recording layer 104, it is preferable that at least one constituent layer includes Sb. The constituent layer including Sb (this is referred to for convenience as constituent layer T) may further include at least one element selected from Te, Al, In, Ge, Sn, and Ga. In the constituent layer T, these elements exist in a form of compound, mixture, alloy, or the like. Specifically, the constituent layer T may include $Sb_2Te_3$, Sb—Te, Sb-(M6), Sb—Te-(M6) (M6 is at least one element selected from Bi, Ge, In, Ga, Al, Sn, Pb, Se, Si, Sc, Y, La, Ce, Pr, Nd, Sm, Gd, Tb, Dy, Ho, Er, Yb, and Lu), AlSb, GaSb, or InSb. It is preferable that any one of Sb—Te, Sb-(M6), and Sb—Te-(M6) includes Sb in an amount of 50 atomic % or more.

As long as the elemental compositions of the m-th constituent layer and the (m+1)th constituent layer are different, each of the m-th constituent layer and the (m+1)th constituent layer may be the constituent layer T. For example, the combination of the m-th constituent layer / the (m+1)th constituent layer / . . . may be $Al/Sb_2Te_3/$, $GaSb/Sb_2Te_3$, $InSb/Sb_2Te_3$, AlSb/Sb—Te, GaSb/Sb—Te, or InSb/Sb—Te. Alternatively, the combination of the m-th constituent layer / the (m+1th constituent layer / . . . may be In—Sb/Ge—Sb, In—Sb/Ge—Sb/In—Sb, In—Sb/Ge—Sb/In—Sb/Al—Sb/In—Sb, Ge—Sb/In—Sb/Ge—Sb/Al—Sb/Ge—Sb, Ge—Sb/In—Sb/Ge—Sb, Ge—Sb/Ga—Sb/Ge—Sb/In—Sb, In—Sb/Ge—Sb/Sb/In—Sb, or the like.

Alternatively, in the recording layer 104, it is preferable that at least one constituent layer includes at least one rare-earth metal element X, namely, at least one element selected from Sc, Y, La, Ce, Pr, Nd, Sm, Gd, Tb, Dy, Ho, Er, Yb, and Lu and at least one element selected from Ge, Sb, Bi, and Te. X forms a compound having stoichiometric composition of XBi, XSb, XTe or XGe. Among them, XBi, XSb, and XTe has a crystal structure of NaCl-type structure that is the same as BiTe, GeTe, and SnTe and has a melting point of about 1000° C. to 2000° C. and a crystallization temperature of 200° C. or more. Accordingly, when XBi, XSb, or XTe is used as a component of the constituent layer, the crystallization temperature of the recording layer can be increased without changing the crystal structure.

It is preferable that the constituent layer (this is referred to for convenience as constituent layer X) containing rare-earth metal element X and the specific element further includes at least one element selected from Al, Ag, Au, Co, Cr, Cu, Fe, Ga, Hf, In, Ir, Mn, Mo, Nb, Ni, Os, Pb, Pd, Pt, Re, Rh, Ru, Se, Si, Sn, Ta, Ti, V, W, Zn, and Zr. Such an element enables adjustment of crystallization temperature or crystallization speed of the recording layer.

The design of the M constituent layers is performed by determining composition and thickness of each of the constituent layers so that the preferable combination of the constituent layers can be obtained based on the recording-layer composition. In one recording layer, number M of the constituent layers is preferably 3 or more, and more preferably 5 or more. When M is 3 or more, it becomes possible that the elemental compositions of the first constituent layer and the M-th constituent layer are the same or it becomes possible to regularly and repeatedly arrange one or a plurality of the specific layers alternatively or every three or more layers, and thereby, the recording layer in which the elemental compositions are periodically changed can be obtained.

For example, in the case that GeTe is included as a main component like the recording-layer compositional formula as exemplified above, if the number M is set to be large, two or more layers including GeTe thereby can be dispersed evenly in the thickness direction of the recording layer. Thereby, an information recording medium having more excellent performance can be obtained. Similarly, it is preferable that the layers having the other chemical compositions are dispersed evenly as a plurality of layers in the thickness direction of the recording layer. Therefore, it is desirable that the number M is larger. However, it is preferable that the upper limit of M is 50 or less, considering a reasonable dm for film-forming and production cost and takt time and so forth.

The order of the plurality of different constituent layers is not particularly limited, as long as the entire recording layer has the phase-change composition. For example, when the recording layer is composed of two constituent layers (M=2) and the two constituent layers are compared, the layer having a higher crystallization temperature may be the first constituent layer and the layer having a higher crystallization speed may be the second constituent layer. By setting the second constituent layer to be a layer having a higher crystallization speed, good archival overwrite characteristic can be obtained. In this case, d1 and d2 can be appropriately selected according to composition of each of the constituent layers, and for example, d1<d2, d1=d2, or d1>d2 is possible. Generally, it is preferable that the layer having a higher crystallization speed is set to be thick. The recording layer having such a construction is preferably adopted in the recording medium shown in FIG. 3 to be described later.

Alternatively, when M is 3 or more, the recording layer may be designed so that the material having a crystallization temperature of 25° C. or less and having strong crystallinity is located inside the recording layer. According to such construction, crystalline nucleation occurs from the center of the recording layer, and crystalline growth progresses. Moreover, compared to the case that the first constituent layer or the M-th constituent layer is composed of a material having strong crystallinity, the recording layer having such construction is thought to have higher crystallization speed because of resistance to influence by a dielectric layer contiguous to the recording layer or the like. In the recording layer of this construction, it is preferable that the constituent layers are designed so that the constitution layer of the material having high crystallinity is placed at the center in the thickness direction of the recording layer.

Alternatively, all the constituent layers may contain Sb. If all the constituent layers contain Sb, the recording layer wherein both high crystallization temperature and high-speed crystallization are realized can be obtained. In this case, it is preferable that the recording-layer compositional formula is set so as to contain Sb preferably at a ratio of 60 atomic % or more. Moreover, one or more constituent layer(s) may be composed of Sb simple substance. Alternatively, the constituent layers composed of Sb simple substance and the constituent layers composed of another simple substance (such as Al) may be alternately deposited. In this case, it is preferable that the ratio of Sb to the entire recording layer is set to be 60 atomic % or more.

Figure 2:
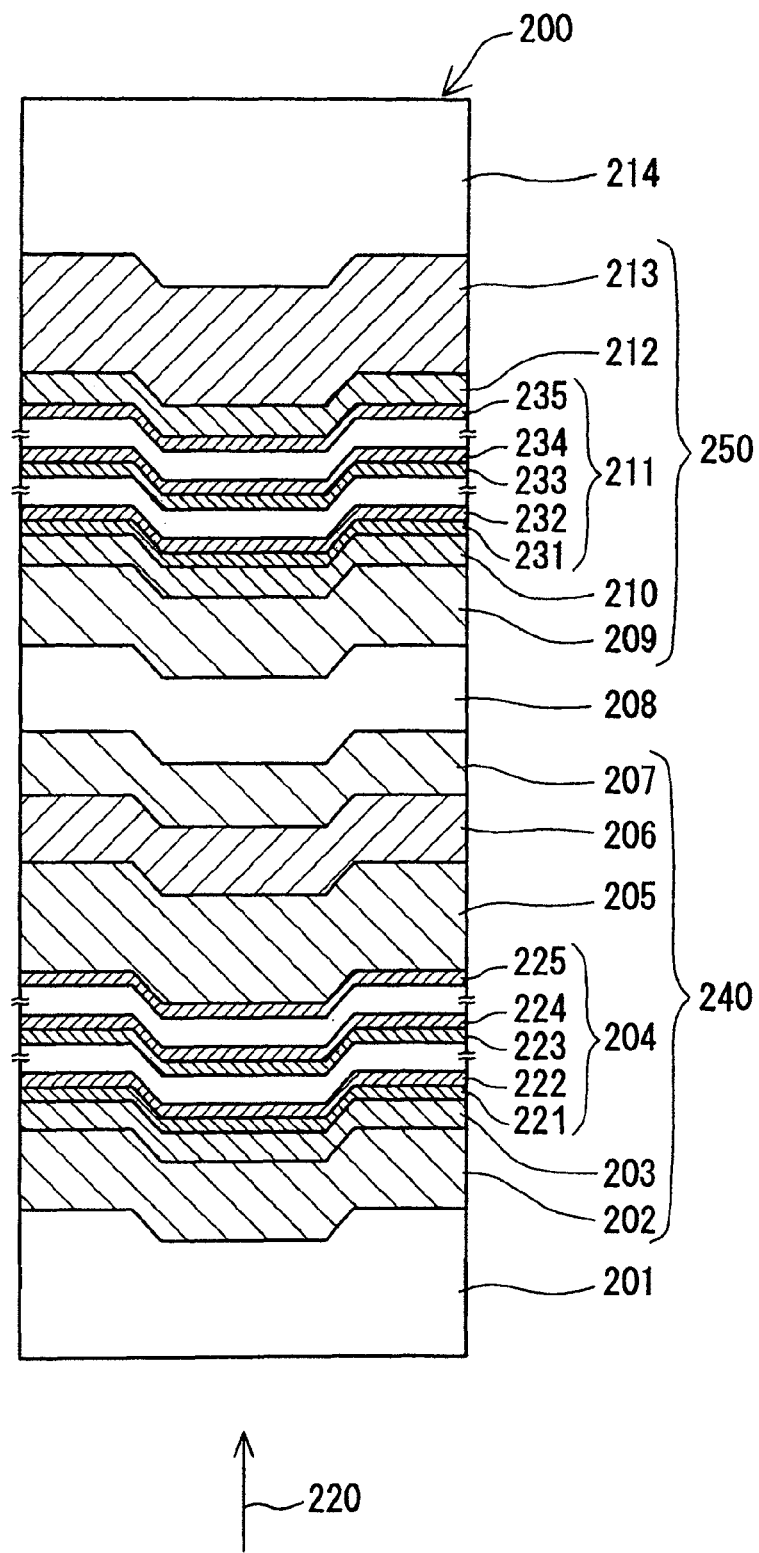
FIG. 2 is a fragmentary sectional view which shows another example of an information recording medium of the present invention.

The recording layer in which all the constituent layers contain Sb or the recording layer in which the constituent layers composed of Sb simple substance and the constituent layers composed of another simple substance are alternately disposed is favorably used in the recording medium having two information layers as shown in FIG. 2 to be described later. In such a recording medium, the recording-layer compositional formula of the recording layer (particularly, recording layer of the first information layer) of each of the information layers contains Sb, preferably, in an amount of 75 atomic % or more, and more preferably 80 atomic % or more.

The following is one example of a more specific method for designing the constituent layers. When the recording-layer composition formula is $(GeTe)_{95}(Bi_2Te_3)_{4.0}(In_2Te_3)_{1.0}$ (mol %) (alternatively also represented as $Ge_{44.2}Te_{51.2}Bi_{3.7}In_{0.9}$ (atomic %)), this can be divided into constituent layers composed of the respective compounds. In this case, M=3. Accordingly, when the thickness D (nm) of the recording layer 104 is 10, the first constituent layer / the second constituent layer / the third constituent layer can be designed to be GeTe (dm=9.5)/$Bi_2Te_3$ (dm=0.4)/$In_2Te_3$ (dm=0.1). Alternatively, with M=2, the first constituent layer/the second constituent layer can be designed to be GeTe(dm=9.5)/$(Bi_2Te_3)_{80}(In_2Te_3)_{20}$ (dm=0.5). Alternatively, with M=5, the first constituent layer / the second constituent layer / the third constituent layer / the fourth constituent layer / the fifth constituent layer can be designed to be GeTe(dm=3.5)/$Bi_2Te_3$(dm=0.4)/GeTe(dm=3.0)/$In_2Te_3$(dm=0.1)/GeTe(dm=3.0).

In every design thereof, the recording layer 104 has a composition of $(GeTe)_{95}(Bi_2Te_3)_{4.0}(In_2Te_3)_{1.0}$ (mol %). In a part in which components composing the constituent layers are mixed by laser irradiation, the function by the entire compositions is exerted, and in a part in which the components are not mixed, the functions as GeTe layer, $Bi_2Te_3$ layer, and $In_2Te_3$ layer come to be exerted. Here, the thickness dm is determined carefully, corresponding to the desirable recording-layer composition. In an actual design, it is not necessary that the initially set recording-layer composition is identical to the recording-layer composition of the recording layer that is actually obtained. For example, dm may be adjusted according to need so as to satisfy the recording and reproduction performance and reliability performance.

Each of the constituent layers exerts a predetermined function in a recording layer according to the elemental compositions thereof. For example, as described above, GeTe has a large optical change as well as a high crystallization temperature, and therefore, by a constituent layer containing GeTe, a recording layer 104 having a large optical change can be obtained. GeTe and InTe have the same functions. $Bi_2Te_3$ is a material having very strong crystallinity such that a crystallization temperature of the thin film thereof is a room temperature or less and, the film is a crystal at a room temperature. Accordingly, the constituent layer containing said material functions to enhance the crystallization speed. $Bi_2Se_3$ has the same function as $Bi_2Te_3$.

$In_2Te_3$ is a telluride having the same valence as $Bi_2Te_3$ and has a high melting point, and therefore, the constituent layer containing $In_2Te_3$ functions to increase the crystallization temperature and to stabilize the amorphous phase. $Ga_2Te_3$, $Al_2Te_3$, $Sb_2Te_3$, $SiTe_2$, and $SiSe_2$ have the same function as $In_2Te_3$. SnTe is a telluride having the same valence and crystal structure as GeTe and is a material having a high melting point and very strong crystallinity such that a crystallization temperature of the thin film thereof is a room temperature or less and the film is a crystal at a room temperature. Accordingly, the constituent layer containing the material functions to increase the crystallization speed. BiTe, PbTe, SeSn, and BiSe have the same function as SnTe.

Here, another effect of the recording layer being composed of a plurality of constituent layers will be explained.

For example, in the case of producing a recording layer including a material having a high melting point such as GdBi and a material having a low melting point such as GeTe—$Bi_2Te_3$, a sputtering target of Gd—Bi—Ge—Te becomes required. However, if there is difference between melting points of the materials, it becomes difficult to produce a sintered body, and a filling rate of the sputtering target occasionally lowers. In this case, there is caused a problem that a part of the sputtering target is split or melted during sputtering, and production of the medium becomes impossible to continue. Alternatively, for avoiding such a problem, the input power has to be reduced, and therefore, production of the medium declines. On the other hand, if the recording layer is set to a two-layer construction of GdBi layer and GeTe—$Bi_2Te_3$ layer, a sputtering target of Gd—Bi and sputtering target of Ge—Te—Bi may be individually prepared, and the recording layer can be easily formed and the medium can be efficiently produced.

The thickness D of the entirety of the recording layer 104 is preferably from 5 nm to 16 nm, and more preferably from 6 nm to 13 nm. If the recording layer is thin, Rc lowers and Ra rises, and the reflection ratio becomes small in terms of optical design. Moreover, if the recording layer is thick, the thermal capacity increases, thereby recording sensitivity lowers.

Formation of the recording layer with a plurality of constituent layers may be applied to an information recording medium having a recording layer generating an irreversible phase change. Specifically, the plurality of constituent layers may be composed so that each of the layers contains at least one element selected from Pd, Au, Ag, Pt, Ir, and Te, oxide of the element, or telluride thereof. For example, the m-th constituent layer may be composed of Te—O and the (m+1)th constituent layer may be at least one combination selected from Pd—Te, Au, and Pd—O, or one element selected from Ag, Pt, and Ir.

Next, elements other than the recording layer are described. The substrate 107 is a smooth-surfaced plate which is discal and transparent. As material for the substrate, resin such as a polycarbonate, amorphous polyolefin or polymethylmethacrylate (PMMA), or glass can be employed. Considering moldability, price and mechanical strength, a polycarbonate is preferably used. In the illustrated embodiment, a substrate 107 with a thickness of 1.1 mm and a diameter of 120 mm is preferably used. A guide groove for guiding a laser beam 120 may be formed in the surface of the substrate 107 where the reflective layer 106, the recording layer 104, and so on are formed. In the case where the guide groove is formed in the substrate 107, the surface which is located closer to the laser beam 120 is referred to as a "groove surface" for convenience, whereas the surface which is located away from the laser beam is referred to as a "land surface" for convenience in this specification. For example, when the medium is used as the Blu-ray Disc, a difference in level between the groove surface and the land surface is preferably in a range of 10 nm to 30 nm. In the Blu-ray Disc, recording is conducted only on the groove surface, and a distance between two grooves (the distance between the center of the groove surface and the center of the groove surface) is about 0.32 μm.

The reflective layer 106 optically serves to increase the light quantity absorbed by the recording layer 104, and thermally serves to rapidly diffuse the heat generated in the recording layer 104 to cool the recording layer quickly and to facilitate amorphization of the recording layer 104. The reflective layer 106 also serves to protect a multilayered film starting with the dielectric layer 105 and ending with the dielectric layer 102, from the operation environment. It is preferable that the material for the reflective layer 106 has a high thermal conductivity and a low optical absorptance at a wavelength of a laser beam that is employed for the medium. For example, a material containing at least one selected from Al, Au, Ag, and Cu can be used. Or an alloy thereof may be used. Particularly, because Ag has small optical absorptance at a wavelength in the vicinity of 405 nm, the reflective layer 106 containing Ag in an amount of 97 atomic % or more is preferably used in the information recording medium 100.

A material may be used which contains, in addition to one or more elements selected from Al, Au, Ag and Cu, another one or more elements for the purpose of improving the moisture resistance of the reflective layer 106 and/or the purpose of adjusting thermal conductivity or optical characteristics (for example, optical reflectance, optical absorptance or light transmittance). Specifically, at least one element selected from Mg, Ca, Sc, Y, La, Ti, Zr, Hf, V, Nb, Ta, Cr, Mo, W, Mn, Fe, Co, Ni, Pd, Pt, Zn, Ga, In, C, Si, Ge, Sn, Sb, Bi, Te, Ce, Nd, Sm, Gd, Tb, and Dy may be added. The concentration of added element is preferably not more than 3 atomic %. Materials in which one or more elements selected from these elements are added may be, for example, alloy materials, such as Al—Cr, Al—Ti, Al—Ni, Au—Cr, Ag—Pd, Ag—Pd—Cu, Ag—Pd—Ti, Ag—Nd, Ag—Nd—Au, Ag—Nd—Pd, Ag—In, Ag—In—Sn, Ag—In—Ga, Ag—In—Cu, Ag—Ga, Ag—Ga—Cu, Ag—Ga—Sn, Ag—Cu, Ag—Cu—Ni, Ag—Cu—Ca, Ag—Cu—Gd, and Ag—Zn—Al. Any of these materials is an excellent material which has excellent corrosion resistance and quenching function. The similar purpose can be accomplished also by forming the reflective layer 106 of two or more layers.

The thickness of the reflective layer 106 is adjusted depending on the composition of the recording layer 104, the linear velocity at which information is recorded on the medium, and preferably is in a range of from 40 nm to 300 nm. When the thickness is below 40 nm, the heat in the recording layer is difficult to diffuse and therefore the recording layer is difficult to become amorphous. When the thickness is over 300 nm, quenching function becomes excessive to cause over-diffuse the heat in the recording layer, whereby the recoding sensitivity is deteriorated (namely, larger laser power is required).

The dielectric layer 102 and the dielectric layer 105 serve to adjust an optical path length so as to enhance the optical absorption efficiency of the recording layer 104, and serve to enlarge the difference between the reflectance of crystal phase and the reflectance of amorphous phase so as to enlarge the signal amplitude. Further, they also serve to protect the recording layer 104 from moisture. The dielectric layers 105 and 102 may be formed from one material selected from an oxide, a sulfide, a selenide, a nitride, a carbide and a fluoride or a mixture of a plurality of these materials.

More specifically, the oxides include, for example, $Al_2O_3$, $CeO_2$, $Cr_2O_3$, $Dy_2O_3$, $Ga_2O_3$, $Gd_2O_3$, $HfO_2$, $Ho_2O_3$, $In_2O_3$, $La_2O_3$, $Nb_2O_5$, $Nd_2O_3$, $Sc_2O_3$, $SiO_2$, $Sm_2O_3$, $SnO_2$, $Ta_2O_5$, $TiO_2$, $Y_2O_3$, $Yb_2O_3$, ZnO and $ZrO_2$. The sulfide is, for example, ZnS, and the selenide is, for example, ZnSe. The nitrides include, for example, AlN, BN, Cr—N, Ge—N, HfN, NbN, $Si_3N_4$, TaN, TiN, VN, and ZrN. The carbides include, for example, $Al_4C_3$, $B_4C$, $CaC_2$, $Cr_3C_2$, HfC, $Mo_2C$, NbC, SiC, TaC, TiC, VC, $W_2C$, WC, and ZrC. The fluorides include, for example, $CeF_3$, $DyF_3$, $ErF_3$, $GdF_3$, $HoF_3$, $LaF_3$, $NdF_3$, $YF_3$, and $YbF_3$.

The mixtures of these compounds include, for example, $ZnS-SiO_2$, $ZnS-LaF_3$, $ZnS-SiO_2-LaF_3$, $ZrO_2-SiO_2$, $ZrO_2-LaF_3$, $ZrO_2-Cr_2O_3$, $ZrO_2-SiO_2-Cr_2O_3$, $ZrO_2-Cr_2O_3-LaF_3$, $ZrO_2-SiO_2-LaF_3$, $ZrO_2-SiO_2-Cr_2O_3-LaF_3$, $ZrO_2-Ca_2O_3$, $ZrO_2-SiO_2-Ca_2O_3$, $ZrO_2-Ca_2O_3-LaF_3$, $ZrO_2-SiO_2-Ga_2O_3-LaF_3$, $ZrO_2-In_2O_3$, $ZrO_2-SiO_2-In_2O_3$, $ZrO_2-In_2O_3-LaF_3$, $ZrO_2-SiO_2-In_2O_3-LaF_3$, $ZrO_2-SiO_2-Cr_2O_3-Ga_2O_3$, $ZrO_2-SiO_2-Cr_2O_3-In_2O_3$, $ZrO_2-SiC$, $ZrO_2-SiO_2-SiC$, $HfO_2-SiO_2$, $HfO_2-LaF_3$, $HfO_2-Cr_2O_3$, $HfO_2-SiO_2-Cr_2O_3$, $HfO_2-Cr_2O_3-LaF_3$, $HfO_2-SiO_2-LaF_3$, $HfO_2-$ $SiO_2$—$Cr_2O_3$—$LaF_3$, $HfO_2$—$Ca_2O_3$, $HfO_2$—$SiO_2$—$Ca_2O_3$, $HfO_2$—$Ca_2O_3$—$LaF_3$, $HfO_2$—$SiO_2$—$Ga_2O_3$—$LaF_3$, $HfO_2$—$In_2O_3$, $HfO_2$—$SiO_2$—$In_2O_3$, $HfO_2$—$In_2O_3$—$LaF_3$, $HfO_2$—$SiO_2$—$In_2O_3$—$LaF_3$, $HfO_2$—$SiO_2$—$Cr_2O_3$—$Ga_2O_3$, $HfO_2$—$SiO_2$—$Cr_2O_3$—$In_2O_3$, $HfO_2$—SiC, $HfO_2$—$SiO_2$—SiC, $SnO_2$—$Ga_2O_3$, $SnO_2$—$In_2O_3$, $SnO_2$—SiC, $SnO_2$—$Si_3N_4$, $SnO_2$—$Ga_2O_3$—SiC, $SnO_2$—$Ga_2O_3$—$Si_3N_4$, $SnO_2$—$Nb_2O_5$, $SnO_2$—$Ta_2O_5$, $CeO_2$—$Al_2O_3$—$SiO_2$.

Of these materials, ZnS—$SiO_2$ is preferably used since it is amorphous, has a low thermal conductivity, high transparency and a high refractive index, and exhibits a high film-forming speed during film formation, and excellent mechanical characteristics and moisture resistance. ZnS—$SiO_2$ more preferably has a composition $(ZnS)_{80}(SiO_2)_{20}$ (mol %). Particularly, it is preferable that the dielectric layer 102 positioned on the side to which the laser beam 120 enters is formed by ZnS—$SiO_2$. In this case, it is preferable that an interface layer 103 (to be described layer) is provided between the dielectric layer 102 and the recording layer 104.

The dielectric layers 102 and 105 may be formed from a material which contains neither sulfide nor Zn. In particular, the dielectric layer 105 may be directly formed on the recording layer 104 by such a material. Such a material includes $ZrO_2$—$SiO_2$—$Cr_2O_3$, $ZrO_2$—$SiO_2$—$Ga_2O_3$, $ZrO_2$—$SiO_2$—$In_2O_3$, $ZrO_2$—$In_2O_3$—$LaF_3$, $ZrO_2$—$SiO_2$—$Ga_2O_3$—$LaF_3$, $ZrO_2$—$Ga_2O_3$, $ZrO_2$—$SiO_2$—$In_2O_3$—$LaF_3$, $ZrO_2$—$In_2O_3$, $HfO_2$—$SiO_2$—$Cr_2O_3$, $HfO_2$—$SiO_2$—$Ga_2O_3$, $HfO_2$—$SiO_2$—$In_2O_3$, $HfO_2$—$SiO_2$—$Cr_2O_3$—$LaF_3$, $HfO_2$—$SiO_2$—$Ga_2O_3$—$LaF_3$, $HfO_2$—$SiO_2$—$In_2O_3$—$LaF_3$, $SnO_2$—$Ga_2O_3$—SiC, and $SnO_2$—$Ga_2O_3$—$Si_3N_4$. These materials are transparent, and have a high refractive index and low thermal conductivity, and show excellent mechanical characteristics and moisture resistance.

By changing each optical path length (that is, the product "nd" of the refractive index n of a dielectric layer and the thickness d of a dielectric layer) the dielectric layer 102 and the dielectric layer 105 serve to adjust an optical absorptance Ac (%) of the recording layer 104 in a crystalline state and an optical absorptance Aa (%) of the recording layer 104 in an amorphous state, and to adjust the optical reflectance Rc (%) of the information recording medium 100 when the recording layer 104 is in a crystalline state and the optical reflectance Ra (%) of the information recording medium 100 when the recording layer 104 is in an amorphous state, and to adjust the phase difference $\Delta\Phi$ of the light between the portions where the recording layer 104 is in a crystalline state and an amorphous state in the information recording medium 100. In order to improve signal quality by increasing the reproduced-signal amplitude of a recorded mark, it is desirable that the reflectance difference (|Rc—Ra|) or the reflectance ratio (Rc/Ra) is large. Further, it is desirable that Ac and Aa are also large so that the recording layer 104 may absorb a laser beam. The optical path length of each of the first dielectric layer 102 and the second dielectric layer 105 is determined so as to satisfy these conditions simultaneously. The optical path length which satisfies those conditions can be determined accurately, for example, by calculation based on a matrix method (for example, see "Wave Optics" by Hiroshi Kubota et al., Section 3, Iwanami Shinsho, 1971).

When setting the refractive index of a dielectric layer at n, the thickness at d (nm), and the wavelength of the laser beam 120 at $\lambda$(nm), the optical path length "nd" is expressed with nd=a$\lambda$, wherein "a" is a positive number. In order to improve the signal quality by increasing the reproduced-signal amplitude of the recorded mark of the information recording medium 100, for example, it is preferable that Rc and Ra satisfy 18%$\leqq$Rc and Ra$\leqq$4%, respectively when the medium is used as Blu-ray Disc like the information recording medium 100. The optical path length (nd) of each of the dielectric layer 102 and the dielectric layer 105 can be determined accurately by calculation based on the matrix method so that these preferable conditions are satisfied. Therefore, when a dielectric material with a refractive index of from 1.8 to 2.5 is used, the thickness of the first dielectric layer 102 is preferably in a range of 20 nm to 100 nm, and more preferably in a range of 30 nm to 80 nm. Further, the thickness of the dielectric layer 105 is preferably in a range of 3 nm to 50 nm, and more, preferably in a range of 5 nm to 40 nm.

The interface layer 103 is provided in order to prevent the material transfer caused due to repeated recording between the first dielectric layer 102 and the recording layer 104. The material transfer here means the phenomenon that when the dielectric layer 102 is formed from, for example, $(ZnS)_{80}(SiO_2)_{20}$ (mol %), S of ZnS diffuses into the recording layer 104 while the recording the layer 104 is irradiated with a laser beam 120 and information is repeatedly overwritten. Further, when adhesiveness of the dielectric layer 102 to the recording layer 104 is bad, the interface layer 103 has a function of bonding both layers. The interface layer may be provided between the dielectric layer 105 and the recording layer 104 according to need.

It is preferable that the interface layer 103 is formed from a material not containing Zn and/or S, and it is more preferable that the interface layer is formed from a material which contains neither Zn nor S. Further, the interface layer is preferably formed from a material which has excellent adhesiveness to the recording layer 104 and high thermal durability such that it does not melt or decompose upon applying the laser beam 120 on the recording layer 104. Specifically, the interface layer 103 may be formed from one material selected from an oxide, a nitride, a carbide and a fluoride, or a mixture of a plurality of these materials.

More specifically, the oxides include, for example, $Al_2O_3$, $CeO_2$, $Cr_2O_3$, $Dy_2O_3$, $Ga_2O_3$, $Gd_2O_3$, $HfO_2$, $Ho_2O_3$, $In_2O_3$, $La_2O_3$, MgO, $Nb_2O_5$, $Nd_2O_3$, $Sc_2O_3$, $SiO_2$, $Sm_2O_3$, $SnO_2$, $Ta_2O_5$, $TiO_2$, $Y_2O_3$, $Yb_2O_3$, and $ZrO_2$. The nitrides include, for example, AlN, BN, Ge—N, HfN, Si—N, Ti—N, VN, and ZrN. The carbides include, for example, C, $Al_4C_3$, $B_4C$, $CaC_2$, $Cr_3C_2$, HfC, $Mo_2C$, NbC, SiC, TaC, TiC, VC, $W_2C$, WC, and ZrC. The fluorides include, for example, $CeF_3$, $DyF_3$, $ErF_3$, $GdF_3$, $HoF_3$, $LaF_3$, $NdF_3$, $YF_3$, and $YbF_3$.

The mixtures include, for example, $ZrO_2$—$Cr_2O_3$, $ZrO_2$—$SiO_2$—$Cr_2O_3$, $ZrO_2$—$SiO_2$—$Cr_2O_3$—$LaF_3$, $ZrO_2$—$Ga_2C_3$, $ZrO_2$—$SiO_2$—$Ga_2O_3$, $ZrO_2$—$SiO_2$—$Ga_2O_3$—$LaF_3$, $ZrO_2$—$In_2O_3$, $ZrO_2$—$SiO_2$—$In_2O_3$, $ZrO_2$—$SiO_2$—$In_2O_3$—$LaF_3$, $HfO_2$—$Cr_2O_3$, $HfO_2$—$SiO_2$—$Cr_2O_3$, $HfO_2$—$SiO_2$—$Cr_2O_3$—$LaF_3$, $HfO_2$—$Ga_2O_3$, $HfO_2$—$SiO_2$—$Ga_2O_3$, $HfO_2$—$SiO_2$—$Ga_2O_3$—$LaF_3$, $HfO_2$—$In_2O_3$, $HfO_2$—$SiO_2$—$In_2O_3$, $HfO_2$—$SiO_2$—$In_2O_3$—$LaF_3$, $ZrO_2$—$SiO_2$—SiC, $HfO_2$—$SiO_2$—SiC, Ge—Cr—N, and Si—Cr—N The thicknesses of the interface layer 103 is preferably in a range of 1 nm to 10 nm and more preferably in a range of 2 nm to 7 nm. When the interface layer 103 is thick, the recording and erasing performance is affected because of the change of the optical reflectance and the optical absorptance of the multilayered body starting with the reflective layer 106 and ending with the dielectric layer 102. When the dielectric layer 102 is formed from a material containing neither sulfide nor Zn, the interface layer 103 may not be provided. Further, when the adhesiveness of the dielectric layer 102 to the recording layer 104 is insufficient, the interface layer 103 is preferably provided. When the dielectric layer 105 contains sulfide or Zn or when adhesiveness of the dielectric layer 105 to the recording layer 104 is insufficient, it is preferable that another interface layer (not shown) is provided between the recording layer 104 and the dielectric layer 105. In this case, another interface can be formed by the same material as the material as described in connection with the interface layer 103 is explained.

Next, the cover layer 101 is described. As a method for increasing a recording density of the information recording medium, there is a technique of increasing the numerical aperture NA of an objective lens so that the laser beam is narrowed using a laser beam having a short wavelength. In this case, since the focal position becomes shallow, the cover layer 101 which is positioned on the side to which the laser beam 120 enters is designed to be thinner. This construction makes it possible to obtain a high-density recordable and large-capacity information recording medium 100.

The cover layer 101 is a smooth-surfaced plate or a smooth-surfaced sheet which is discal and transparent, similarly to the substrate 107. The thickness of the cover layer 101 is preferably within a range of 80 µm to 120 µm, and more preferably within a range of 90 µm to 110 µm. The cover layer 101 may consist of a disc-shaped sheet and an adhesive layer, or may consist of a single layer of an ultraviolet-curing resin such as an acrylic resin or an epoxy resin. Alternatively, the cover layer 101 may be provided on a protective layer that is formed on a surface of the dielectric layer 102. Although the cover layer 101 may take any construction, the cover layer is preferably designed such that a total thickness (for example, [a thickness of the sheet]+[a thickness of the adhesive layer]+[a thickness of the protective layer], or a thickness of the single layer of the ultraviolet-curing resin) is within a range of 80 µm to 120 µm. It is preferable that the sheet is formed from a resin such as a polycarbonate, an amorphous polyolefin, or PMMA, and particularly the polycarbonate. Further, it is preferable that the cover layer 101 optically has a small birefringence with respect to a light in a short wavelength region since the layer is positioned on the side of incident laser beam 120.

Subsequently, the method for producing the information recording medium 100 of Embodiment 1 is described. In the information recording medium 100, a substrate 107 to be a support for forming each of the layers is positioned on the opposite side to the laser beam incident side, and therefore, the medium is produced by forming the layers sequentially from the reflective layer 106 on the substrate 107. The information recording medium 100 is produced by carrying out a process in which the substrate 107 where the guide groove (the groove surface and the land surface) is formed is set in a film-forming apparatus, and then the reflective layer 106 is formed on the surface of the substrate 107 where the guide groove is formed (Process a), a process in which the dielectric layer 105 is formed (Process b), a process in which the recording layer 104 is formed (Process c), a process in which the interface layer 103 is formed (Process d), a process in which the dielectric layer 102 is formed (Process e) thus sequentially, and finally a process in which the cover layer 101 is formed on the surface of dielectric layer 102.

Figure 5:
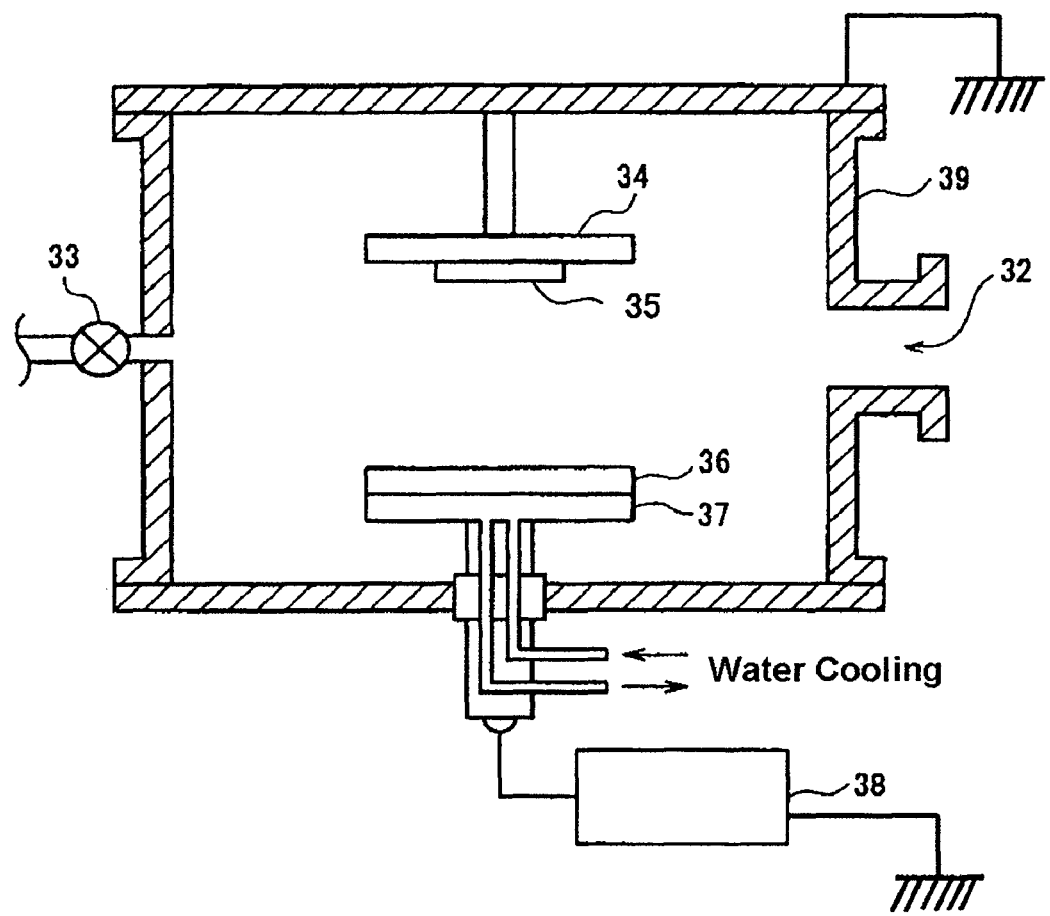
FIG. 5 is a schematic view of an example of a sputtering apparatus used in a method for producing an information recording medium of the present invention.

Here, one example of a sputtering (film-forming) apparatus used in production of the information recording medium will be explained. FIG. 5 shows an example of a diode glow discharge-type sputtering apparatus. The inside of a sputtering chamber 39 is maintained at high vacuum. The vacuum is maintained with a vacuum pump (not shown) which is connected to an exhaust port 32. A sputtering gas (such as an Ar gas) is introduced at a constant flow rate from a sputtering gas inlet 33. A substrate 35 is attached to a substrate holder (anode) 34, a sputtering target (cathode) 36 is fixed to a target electrode 37, and the electrode 37 is connected to an electric power supply 38. The application of a high voltage between two electrodes generates glow discharge and accelerates, for example, Ar cations so that the cations collide against the sputtering target 36 to cause emission of particles from the target. The emitted particles are deposited on the substrate 35 and a thin film is formed. The sputtering apparatus is classified into a direct-current type and a radio-frequency type depending on a type of electric power supply which is connected to the cathode.

The sputtering apparatus may have construction in which a plurality of sputtering chambers 39 is connected. Alternatively, in a sputtering chamber 39 of the sputtering apparatus, a plurality of targets 36 may be arranged. When the apparatus has any of these constructions, a multilayer film can be formed by carrying out a plurality of film-forming processes. This apparatus can be used for forming various layers including the dielectric layer and the recording layer, and also, for producing the medium of embodiment to be described later. The substrate 35 shown in FIG. 5 is specifically substrates 107, 214, 301, and 401, which are shown in FIGS. 1 to 4, respectively.

In the present specification including the following explanations, "surface" represents a surface left exposed when each of the layers is formed (surface perpendicular to the thickness direction) unless otherwise mentioned.

First, the process a of forming the reflective layer 106 is carried out on the surface in which a guide groove of the substrate 107 is formed. The process a is carried out by sputtering. Sputtering is carried out in a noble atmosphere by using a direct-current (DC) power supply or a radio-frequency (RF) power supply. Noble atmosphere may be any one of Ar gas, Kr gas, and Xe gas.

A material containing at least one element selected from Al, Au, Ag and Cu or an alloy thereof may be used as the sputtering target (hereinafter, "target"). The composition of the target and the composition of the formed reflective layer may not be identical for some film-forming apparatuses. In such a case, by appropriately adjusting the composition of the target, the reflective layer 106 of desirable composition is obtained. The target is not limited to one produced by a specific production method, but one produced by melting and solidifying powder, one produced by solidifying powder under a high temperature and a high pressure, and so forth can be used. When, for example, an Ag—Cu-based alloy layer is formed as the reflective layer 106, an Ag—Cu-based alloy target may be used.

Next, Process b is carried out to form the dielectric layer 105 on a surface of the reflective layer 106. Also Process b is carried out by sputtering. The sputtering may be carried out in a noble gas atmosphere or in a mixed gas atmosphere of a noble gas and an oxygen gas and/or a nitrogen gas, using the RF power supply. The DC power supply may be used, if possible. The noble gas may be any one of Ar gas, Kr gas, and Xe gas.

A target used in Process b may be one consisting of a material selected from an oxide, nitride, carbide and fluoride, or a mixture or a plurality of these materials. The material and composition of the target is determined so that the dielectric layer 105 of a desired composition can be formed. The composition of the target and the composition of the formed dielectric layer may not be identical for some film-forming apparatuses. In that case, the composition of the target is optionally adjusted to obtain the dielectric layer 105 having desired composition.

When the dielectric layer containing an oxide is formed, since oxygen deficiency may occur during the sputtering, a target in which the oxygen deficiency is suppressed may be used, or the sputtering may be carried out in an atmosphere in which a small amount, such as 5 vol % or less, of oxygen gas is mixed with the noble gas. Alternatively, the dielectric layer containing oxygen may be formed by a reactive sputtering using a sputtering target of a metal, a semi-metal, or a semiconductor material in an atmosphere in which an oxygen gas and/or a nitrogen gas is mixed at a high concentration, such as 10 vol %, with the noble gas.

For example, when $ZrO_2$—$In_2O_3$ is formed as the dielectric layer 105, a target in which powders of $ZrO_2$ and $In_2O_3$ are solidified can be used. When the density of the target in which the powders are solidified with no space among them is defined as 100%, it is preferable that the density is 80% or more. As the density is lower, water or gas becomes easy to be mixed in the target as impurities. Moreover, when the large sputtering power is applied to the target having much space, the target is occasionally cracked or broken, and therefore, the density of the target is preferably higher. As another method, the $ZrO_2$ target and $In_2O_3$ target are attached to different power supplies, and $ZrO_2$—$In_2O_3$ may be formed by co-sputtering. In this case, by adjusting the ratio of sputtering powers applied to the respective targets, the composition ratio of $ZrO_2$ and $In_2O_3$ can be controlled.

Next, Process c is carried out to form the recording layer 104 on a surface of the dielectric layer 105. Process c further includes a first through a N-th processes (N is 2 or more integer), and the n-th process is represented by Process $c_n$ (n is an integer and satisfies $1 \leq n \leq M$). Because the M-th constituent layer is firstly formed, the m-th constituent layer is formed in Process $c_{(M-m+1)}$. Also Process $c_n$ is carried out by sputtering. The sputtering may be carried out using the DC power supply or the RF power supply in an atmosphere of noble gas, or a mixed gas atmosphere of a noble gas and an oxygen gas and/or a nitrogen gas. If possible, the DC power supply by which a high sputtering rate is achieved may be used.

The target used in Process $c_n$ is produced by appropriately determining the ratio of two or more elements (one element when the constituent layer is a layer of simple substance) so that the (M+1-n)th constituent layer having a desired composition can be obtained. For example, when the constituent layer R that is previously explained is formed, it is preferable that the target contains at least one element selected from Te, Bi, Sb, Ge, In, Ga, Al, Sn, Pb, Se, and Si. The target may contain (as a compound or a mixture) at least one combination selected from Bi—Te, Sb—Te, Ge—Te, In—Te, Ga—Te, Al—Te, Sn—Te, Pb—Te, Se—Sn, Bi—Se, Si—Te, and Si—Se.

For example, when the composition of the m-th constituent layer 123 is $Bi_2Te_3$ (represented as $Bi_{40}Te_{60}$ (atomic %)), Bi—Te target is sputtered to form a $Bi_2Te_3$ layer. In this case, because there is a case in which the composition of the target used in Process $c_{(M-m+1)}$ and the composition of the formed m-th constituent layer may not be identical for some film-forming apparatuses, the ratio of Bi and Te in the target is adjusted to obtain the layer having the composition of $Bi_2Te_3$. Also, when a constituent layer including $Sb_2Te_3$, GeTe, $In_2Te_3$, SnTe, or PbTe is formed, the constituent layer having desired composition is obtained by adjusting the ratio of the elements contained in the target, similarly.

The constituent layers from the first constituent layer to the M-th constituent layer (M is an integer of 2 or more) are formed by the following procedure. First, on the surface of the dielectric layer 105, the M-th constituent layer (not shown) is formed (Process $c_1$). Subsequently, the (M-1)th constituent layer (not shown) is formed on the surface of the constituent layer 125 (Process $c_2$). The (M-2)th constituent layer (Process $c_3$), the (M-3)th constituent layer (Process $c_4$) . . . are sequentially formed, and the (m+1)th constituent layer 124 (Process $c_{M-(m+1)+1}$) is formed, and on the surface thereof, the m-th constituent layer 123 is formed (Process $c_{M-m+1}$). Furthermore, the (m-1)th constituent layer (Process $c_{M-(m-1)+1}$), the (m-2)th constituent layer (Process $c_{M-(m-2)+1}$), . . . are sequentially formed, and the second constituent layer 122 is formed (Process $c_{M-1}$), and on the surface thereof, the first constituent layer 121 is formed (Process $c_M$), to complete Process c.

It is preferable that when the constituent layer R contains Te and at least one element selected from Ge, Al, In, and Ga as described above, the constituent layer contiguous thereto is a layer containing Bi and Te (constituent layer Q). Such two constituent layers can be formed, by a method of forming the constituent layer R by sputtering the target containing Te and at least one element selected from Ge, Al, In, and Ga and then forming the constituent layer Q by sputtering the target including Bi and Te or by a method of forming the constituent layer Q by sputtering and then forming the constituent layer R. Moreover, the constituent layer T and the constituent layer X that are preferable as described above can also be formed by sputtering using the target containing the elements to be contained in these constituent layers.

Processes $C_1$-$C_M$ may be carried out by attaching a plurality of targets in one sputtering chamber, or may be carried out in the respective sputtering chambers. Alternatively, Processes $C_1$-$C_M$ may be carried out using an apparatus wherein a plurality of sputtering chambers each of which is provided with a plurality of targets, is provided. For example, in the case that constituent layers having one composition are repeatedly formed in the recording layer 104 such as GeTe/$Bi_2Te_3$/GeTe/$Bi_2Te_3$/GeTe/$Bi_2Te_3$/GeTe/$Bi_2Te_3$/GeTe, it is preferable to carry out Process $c_1$-$C_M$ in one sputtering chamber. Moreover, when a plurality of targets is attached in one sputtering chamber, targets having small diameters are preferably used in order to avoid enlargement of the film-forming apparatus.

It is preferable that each of the constituent layers has a thickness dm of from 0.1 nm to 15 nm as described above. Such extremely thin layer may be formed with smaller sputtering power so that the thickness can be preciously controlled.

Next, Process d is carried out, wherein the interface layer 103 is formed on a surface of the recording layer 104 (the first constituent layer 121). Process d is also carried out by sputtering. The sputtering may be carried out in a noble gas atmosphere or in a mixed gas atmosphere of a noble gas and an oxygen gas and/or a nitrogen gas, using the RF power supply. The DC power supply may be used, if possible. The noble gas may be any one of an Ar gas, a Kr gas, and a Xe gas.

A target used in Process d may be one consisting of a material selected from an oxide, a nitride, a carbide and a fluoride, or a mixture of a plurality of these materials. The material and composition of the target is determined so that the interface layer 103 of a predetermined composition can be formed. The composition of the target and the composition of the formed interface layer are not identical for some film-forming apparatuses. In that case, the composition of the target is optionally adjusted to obtain the interface layer 103 having desired composition.

When the interface layer containing an oxide is formed, since oxygen deficiency may occur during the sputtering, a target in which the oxygen deficiency is suppressed may be used, or the sputtering may be carried out in an atmosphere in which a small amount, such as 5 vol % or less, of oxygen gas is mixed with the noble gas. Alternatively, the interface layer containing oxygen may be formed by a reactive sputtering using a sputtering target of a metal, a semi-metal, or a semiconductor material in an atmosphere in which an oxygen gas and/or a nitrogen gas is mixed at a high concentration, such as 10 vol %, with the noble gas.

For example, when $ZrO_2$—$SiO_2$—$Cr_2O_3$ is formed as the interface layer 103, sputtering may be carried out in an Ar gas atmosphere, by using $ZrO_2$—$SiO_2$—$Cr_2O_3$ in which oxygen defect is suppressed as the target. Alternatively, for such an interface layer 103 may be formed by carrying out sputtering in an atmosphere in which an oxygen gas is mixed to noble gas, with the use of a Zr—Si—Cr alloy target.

Next, Process e is carried out to form the dielectric layer 102 on the surface of the interface layer 103. Process e is also carried out by sputtering. Process e can be carried out in the same manner as Process b, and therefore, explanation with respect to power supply, target, and atmosphere gas is omitted. The target used in Process e may be composed of the same material as that of the target used in Process b, and alternatively, may be composed of material different from that of the target used in Process b. For example, when the layer composed of $(ZnS)_{80}(SiO_2)_{20}$ (mol %) is formed as the dielectric layer 102, the sputtering may be carried out in the atmosphere in which an oxygen gas is mixed at 1-3 vol % with an Ar gas, by using a target composed of $(ZnS)_{80}(SiO_2)_{20}$ (mol %).

As described above, every one of Processes a-e is a sputtering process. Accordingly, Processes a-e may be continuously carried out by sequentially changing the targets in one sputtering apparatus. Alternatively, at least one process of Processes a-e may be carried out by using another sputtering apparatus.

Next, a process of forming a cover layer 101 will be explained. After film-forming the dielectric layer 102, the substrate 107 is taken out of the sputtering device. Then, an ultraviolet-curing resin is applied to the surface of the dielectric layer 102, for example, by a spin coat method. A disc-shaped sheet is closely-attached to the applied ultraviolet-curing resin and the resin is hardened by applying ultraviolet from the sheet side, and thereby, the cover layer 101 can be formed. As another method, the ultraviolet-curing resin is applied into a thickness of 100 μm on the surface of the dielectric layer 102, for example, by a spin coat method, and ultraviolet is applied to harden the resin, and thereby, the cover layer 101 can also be formed. As described above, the process of forming the cover layer is finished.

After finishing the process of forming the cover layer, an initialization process is carried out if necessary. The initialization process is a process in which the temperature of the recording layer 104 which is in an amorphous state is raised to a temperature equal to or higher than the crystallization temperature so as to crystallize the layer, for example, by application of a semiconductor laser. The initialization process may be carried out before the process of forming the cover layer. In this manner, the information recording medium 100 of Embodiment 1 can be produced by implementing Processes a-e and the process of forming the cover layer in order.

Embodiment 2

As Embodiment 2 of the present invention, one example of the information recording medium will be explained. FIG. 2 shows a partial section view of the information recording medium.

The information recording medium 200 shown in FIG. 2 has a construction in which a substrate 214, a second information layer 250, an intermediate layer 208, a first information layer 240, and a cover layer 201 are arranged in this order. With respect to the medium 204 having a composition shown in FIG. 2, for distinguishing the two information layers and the recording layers contained therein, the layer nearer to the incident light is called as "first" and the farther layer is referred to as "second".

More specifically, the second information layer 250 is formed by stacking a reflective layer 213, a dielectric layer 212, a second recording layer 211, a interface layer 210 and a dielectric layer 209 on one surface of the substrate 214 in this order. Here, in the second recording layer 211, a first through an M-th constituent layers are included and, from the side of the dielectric layer 212, the M-th constituent layer 235, . . . , the (m+1)th constituent layer 234, the m-th constituent layer 233, . . . , the second constituent layer 232, and the first constituent layer 231 are formed in this order.

The intermediate layer 208 is formed on a surface of the dielectric layer 209. The first information layer 240 is formed by stacking a dielectric layer 207, a reflective layer 206, a dielectric layer 205, a first recording layer 204, an interface layer 203 and a dielectric layer 202 on a surface of the intermediate layer 208 in this order. Here, in the first recording layer 204, a first through an M-th constituent layers are included and, from the side of the dielectric layer 205, the M-th constituent layer 225, . . . , the (m+1)th constituent layer 224, the m-th constituent layer 223, . . . , the second constituent layer 222, and the first constituent layer 221 are formed in this order.

Also in this embodiment, a laser beam 220 is applied from the cover layer 201 side. In the second information layer 250, information is recorded and reproduced with the laser beam 220 which passes through the first information layer 240. This is the same in the case of reproducing information from the second information layer 250. In the information recording medium 200, information can be recorded in each of the two recording layers. The medium 200 is provided as a medium having a capacity of 50 GB which is about double capacity of Embodiment 1. Hereinafter, the respective elements will be explained.

First, the two recording layers 211 and 204 will be explained. In the embodiment shown in the figure, the second recording layer 211 is composed of M constituent layers 235-231, similarly to the recording layer 104 of Embodiment 1. The second recording layer 211 can be designed by a technique of setting a recording-layer compositional formula of the second recording layer 211, and dividing the formula, similarly to the recording layer 104 in Embodiment 1. Preferable materials and thicknesses of the constituent layers 235-231 are as explained above in connection with Embodiment 1, and here, the details thereof are omitted.

The first recording layer 204 is also composed of M constituent layers 225-221. The number M of the constituent layers in the first recording layer 204 may be the same as or different from the number M of the constituent layers in the second recording layers 211. Preferable materials of the constituent layers 225-221 composing the first recording layer 204 are also the same as those of the constituent layers 125-121 of the recording layer 104 of Embodiment 1, and here, the details thereof are omitted.

The thickness of the first recording layer 204 is preferably smaller than that of the second recording layer 211. This is because the first information layer 240 should be designed to have a high transmittance such that the laser beam 220 can reach the second information layer 250. Specifically, Ta and Tc preferably satisfy 45%≦(Ta+Tc)/2, wherein Tc (%) is the light transmittance of the first information layer 240 when the first recording layer 204 is in a crystal phase, and Ta (%) is the light transmittance of the first information layer 240 when the first recording layer 240 is in an amorphous phase. Specifically, the thickness of the first recording layer 204 is preferably in a range of 3 nm to 10 nm, and more preferably in a range of 5 nm to 8 nm, in order to achieve such a light transmittance.

In the first recording layer 204, it is preferable that the thickness $d_1m$ (nm) of the m-th constituent layer ("1" represents the recording layer of the first information layer) satisfies $0.1 \leq d_1m < 10$. In $1 \leq m \leq M$, all the constituent layers may have the same $d_1m$ or at least one of the m-th constituent layers may have a different $d_1m$. Moreover, $d_1m$ satisfies $d_1m < D_1$, in which the thickness of the first recording layer 204 is set to $D_1$ (nm).

For the first recording layer 204, the combination of M, $D_1$, and $d_1m$ is exemplified as follows.
(1) M=10, $D_1$=7, all of $d_1m$ are 0.7.
(2) M=10, $D_1$=7, $d_11$=0.4, $d_12$=1, $d_13$=0.1, $d_14$=1.3, $d_15$=1.2, $d_16$=0.2, $d_17$=0.5, $d_18$=0.9, $d_19$=0.8, $d_110$=0.6.
(3) M=2, $D_1$=6, $d_11$=1, $d_12$=5.
(4) M=16, $D_1$=8, all of $d_1m$ are 0.5.
(5) M=2, $D_1$=7, $d_11$=2, $d_12$=5.
(6) M=3, $D_1$=6, $d_11$=1, $d_12$=2, $d_13$=3.
(7) M=4, $D_1$=6.5, $d_11$=0.5, $d_12$=1, $d_13$=2, $d_14$=3.
(8) M=50, $D_1$=5, all of $d_1m$ are 0.1.
(9) M=2, $D_1$=7.5, $d_11$=6, $d_12$=1.5.
(10) M=5, $D_1$=5, all of $d_1m$ are 1.

Next, the elements except for the recording layers will be explained. The substrate 214 is the same as the substrate 107 of Embodiment 1. Accordingly, here, specific explanation for the substrate 214 is omitted.

The reflective layer 213 has the same function as the reflective layer 106 in Embodiment 1, and the preferable material and thickness thereof are the same as those of the reflective layers 106. Accordingly, here, specific explanation for the reflective layers 213 is omitted.

The dielectric layers 212 and 209 have the same function as those of the dielectric layers 105 and 102 in Embodiment 1 and may be formed from the same materials as those of the layers 105 and 102. The signal recorded in the second information layer 250 is reproduced by a laser light passing through the first information layer 240 and being reflected by the second information layer 250. Therefore, a reflectance Rc of the second information layer 250 preferably satisfies 18%≦Rc. In order to satisfy this, the thickness of the dielectric layer 209 is preferably within a range of 20 nm to 100 nm, and more preferably within a range of 30 nm to 70 nm. The thickness of the dielectric layer 212 is preferably within a range of 3 nm to 40 nm, and more preferably within a range of 5 nm to 30 nm.

The interface layer 210 has the same function as that of the interface layer 103 in Embodiment 1, and the preferable material and thickness thereof have the same as those of the interface layer 103. Therefore, the detailed description about the interface layer 210 is omitted here. When the dielectric layer 209 is formed from a material which contains neither a sulfide nor Zn, the interface layer 210 may not be provided.

The intermediate layer 208 is provided in order to make the focal position of the laser beam 220 in the first information layer 240 significantly separate from the focal position in the second information layer 250. In the intermediate layer 208, the guide groove is optionally formed for the first information layer 240. The intermediate layer 208 can be formed from an ultraviolet-curing resin. It is desirable that the intermediate layer 208 is transparent with respect to the light having a wavelength λ which is used for recording and reproducing information, so that the laser beam 220 can reach the second information layer 250 efficiently.

The thickness of the intermediate layer 208 is preferably selected so that i) it is equal to or more than the focal depth determined by the numerical aperture of an objective lens and the laser beam wavelength; ii) a distance between the first recording layer 204 and the second recording layer 211 is within a range where the objective lens can concentrate light; and iii) the total thickness of the intermediate layer and the cover layer 201 is preferably set within a tolerance of substrate thickness acceptable to the objective lens to be used. Therefore, the thickness of the intermediate layer 208 is preferably in the range of 10 μm to 40 μm. If necessary, the intermediate layer 208 may be constituted by stacking a plurality of resin layers. Specifically, the intermediate layer 208 may have a two-layer structure consisting of a layer which protects the dielectric layer 209, and a layer which has a guide groove.

Next, the construction of the first information layer 240 will be explained. The dielectric layer 207 has a function of enhancing optical transmittance of the first information layer 240. The material of the dielectric layer 207 is preferably transparent and has a refractive index of 2.4 or more with respect to a laser beam having a wavelength of 405 nm. As such a material, for example, $ZrO_2$, $Nb_2O_3$, $Bi_2O_3$, $CeO_2$, or $TiO_2$ can be used. $TiO_2$ is preferably used because it has a high refractive index of 2.7 and excellent moisture-resistance. Alternatively, a material containing $TiO_2$ in an amount of 90 mol % or more may be used. Alternatively, a material containing at least one oxide selected from $ZrO_2$, $Nb_2O_5$, $Bi_2O_3$, $CeO_2$, and $TiO_2$ in an amount of 90 mol % or more may be used. Alternatively, a material in which at least two oxides selected from $ZrO_2$, $Nb_2O_5$, $Bi_2O_3$, $CeO_2$, and $TiO_2$ are mixed may be used. Preferably, the thickness of the dielectric layer 207 is from 10 nm to 40 nm.

The first reflective layer 206 serves to diffuse the heat of the first recording layer 240 quickly. Further, as described above, since the first information layer 240 should have a high light transmittance, it is desirable that the optical absorption by the first reflective layer 206 is small. Therefore, the first reflective layer 206 is more limited in the material and the thickness, compared with the second reflective layer 213. The first reflective layer 206 is preferably designed to be thinner, and the optical design therefore is preferably made so that the layer has a low extinction coefficient, and the thermal design therefore is preferably made so that the layer has high thermal conductivity.

Specifically, it is preferable that the reflective layer 206 is made from Ag or an Ag alloy, more specifically, formed from an alloy such as Ag—Pd, Ag—Pd—Cu, Ag—Pd—Ti, Ag—Nd, Ag—Nd—Au, Ag—Nd—Pd, Ag—In, Ag—In—Sn, Ag—In—Ga, Ag—In—Cu, Ag—Ga, Ag—Ga—Cu, Ag—Ga—Sn, Ag—Cu, Ag—Cu—Ni, Ag—Cu—Ca, Ag—Cu—Gd, or Ag—Zn—Al. In particular, Ag—Pd—Cu, Ag—Ga—Cu, and Ag—In—Cu are preferably used because of small optical absorption, high thermal conductivity, and excellent moisture resistance. The reflective layer 206 preferably has a thickness in a range of from 5 nm to 15 nm. When the film thickness is less than 5 nm, the function of diffusing the heat deteriorates, which makes it difficult to form marks in the first recording layer 204. When the film thickness is greater than 15 nm, the light transmittance of the first information layer 240 is below 45%.

The dielectric layer 202 and the dielectric layer 205 serve to adjust an optical path length "nd" so as to adjust Rc, Ra, Tc and Ta of the first information layer 240. For example, the optical path length "nd" of each of the dielectric layer 202 and the dielectric layer 205 may be accurately determined by calculation based on the matrix method so that Rc, Ra, Tc and Ta satisfy 45%≦(Ta+Tc)/2, and 5%≦Rc and Ra≦1% are satisfied. For example, when the dielectric layer 202 and the dielectric layer 205 are formed from a dielectric material having a refractive index of from 1.8 to 2.5, the thickness of the dielectric layer 202 is preferably within a range of 10 nm to 80 nm, and more preferably within a range of 20 nm to 60 nm. The thickness of the dielectric layer 205 is preferably within a range of from 3 nm to 40 nm, and more preferably within a range of from 5 nm to 30 nm.

The materials for these dielectric layers may be similar to those for the dielectric layers 102 and 105 in Embodiment 1. When the dielectric layer 206 is, however, formed from Ag or an Ag alloy as explained above, it is preferable that the dielectric layer 205 does not contain a sulfide or Zn. For example, the dielectric layer 202 is preferably formed by $ZnS-SiO_2$. In this case, the interface layer 203 (described later) is preferably provided. As the material for the dielectric layer 205, $ZrO_2-SiO_2-Cr_2O_3$, $ZrO_2-SiO_2-Ga_2O_3$, $ZrO_2-SiO_2-In_2O_3$, $ZrO_2-SiO_2-Cr_2O_3-LaF_3$, $ZrO_2-SiO_2-Ga_2O_3-LaF_3$, $ZrO_2-Ga_2O_3$, $ZrO_2-SiO_2-In_2O_3-LaF_3$, $ZrO_2-In_2O_3$, $HfO_2-SiO_2-Cr_2O_3$, $HfO_2-SiO_2-Ga_2O_3$, $HfO_2-SiO_2-In_2O_3$, $HfO_2-SiO_2-Cr_2O_3-LaF_3$, $HfO_2-SiO_2-Ga_2O_3-LaF_3$ and, $HfO_2-SiO_2-In_2O_3-LaF_3$ are preferably used.

The interface layer 203 has the same function as that of the interface layer 103 in Embodiment 1, and preferable material and thickness thereof are the same as those of the interface layer 103. When the first dielectric layer 202 is formed from a material which contains neither Zn nor a sulfide, the first interface layer 203 may not be provided. Further, in the illustrated embodiment, an interface layer is not provided between the second dielectric layer 205 and the first recording layer 204. This is because the dielectric layer 205 is preferably formed from a material which contains neither Zn nor S.

The cover layer 201 has the same function as that of the cover layer 101 in Embodiment 1 and is formed from the same material as that of the cover layer 101. The thickness of the cover layer 201 is set so that the distance from the surface of the cover layer 101 to the second recording layer 211 of the second information layer is in a range of, preferably, from 80 μm to 120 μm, more preferably, from 90 μm to 110 μm. For example, when the thickness of the intermediate layer 208 is 15 μm, the thickness of the cover layer 201 may be 85 μm. When the thickness of the intermediate layer 208 is 25 μm, the thickness of the cover layer 201 may be 75 μm. When the thickness of the intermediate layer 208 is 30 μm, the thickness of the cover layer 201 may be 70 μm. Generally, the preferable thickness of the cover layer 201 is from 60 μm to 90 μm.

In this embodiment, the information recording medium having two information layers is described as an embodiment. When there are three, four, or more information layers, the number of the intermediate layers is two or more. In this case, it is preferable that the intermediate layers have different thicknesses, respectively. For example, the thicknesses of the first intermediate layer, the second intermediate layer, the third intermediate layer . . . are preferably set to be 15 μm, 17 μm, 18 μm . . . , respectively. Moreover, even if the number of the information layers increases, the distance from the surface of the cover layer to the recording layer of the information layer that is the farthest from the laser beam is preferably from 80 μm to 120 μm, and it is preferable that the thickness of the cover layer is preferably from 10 μm to 70 μm.

The information recording medium of a constitution having two information layers each of which has a recording layer is described above. The information recording medium which has a plurality of recording layers is not limited to this constitution. The medium can also have a constitution including three or more information layers. Further, in a variation of the illustrated embodiment, for example, it is possible that the recording layer of one of the two information layers is composed of a plurality of constituent layers and generates a reversible phase change as a whole, and the other may have one recording layer in which an irreversible phase change is generated. Moreover, in an information recording medium which has three information layers, it is possible that one is the read-only information layer, another has a recording layer which contains a plurality of constituent layers and generates a reversible phase change, and the other has a recording layer in which an irreversible phase change is generated.

As described above, there are many variations of the information recording mediums having two or more information layers. In any form, at least one recording layer contains the first through the M-th constituent layers laminated in the thickness direction. Each of the constituent layers having different elemental compositions functions as one layer, and the material of each of the constituent layers functions like a mixture with material of the contiguous constituent layers. Thereby, the entire recording layer comes to have high crystallization speed and excellent stability of the amorphous phase, and an information recording medium containing such a recording layer has a high erasability and excellent archival characteristics at a high linear velocity and over a wide range of linear velocities.

Next, the method for producing the information recording medium 200 of Embodiment 2 is described. The information recording medium 200 is produced by forming the second information layer 250, the intermediate layer 208, the first information layer 240, and the cover layer 201 in this order, on the substrate 214 to be a support.

Specifically, the information recording medium 200 is produced by carrying out a process in which the substrate 214 where the guide groove (the groove surface and the land surface) is formed is set in a film-forming device, and then the reflective layer 213 is formed on the surface of the substrate 214 where the guide groove is formed (Process f), a process in which the dielectric layer 212 is formed (Process g), a process in which the second recording layer 211 is formed (Process h), a process in which the interface layer 210 is formed (Process i), a process in which the dielectric layer 209 is formed (Process j) in this order, and further carrying out a process of forming the intermediate layer 208 on the surface of the dielectric layer 209, and carrying out a process in which the dielectric layer 207 is formed on the surface of the intermediate layer 208 (Process k), a process in which the reflective layer 206 is formed (Process l), a process in which the dielectric layer 205 is formed (Process m), a process in which the first recording layer 204 is formed (Process n), a process in which the interface layer 203 is formed (Process o), a process in which the dielectric layer 202 is formed (Process p) in this order, and further carrying out a process in which the cover layer 201 is formed on the surface of dielectric layer 202.

First, Process f in which the reflective layer 213 is formed on the surface of the substrate 214 where the guide groove is formed is carried out. Process f is carried out in the same manner as Process a of Embodiment 1.

Next, Process g is carried out to form the dielectric layer 212 on the surface of the reflective layer 213. Process g is carried out in the same manner as Process b of Embodiment 1.

Next, Process h is carried out to form the second recording layer 211 on the surface of the dielectric layer 212. Process h is carried out in the same manner as Process c of Embodiment 1. Namely, in Process h, a plurality of processes is repeated to form the constituent layers using a plurality of targets.

Next, Process i is carried out to form, the interface layer 210 on the surface of the second recording layer 211. Process i is carried out in the same manner as Process d of Embodiment 1.

Next, Process j is carried out to form the dielectric layer 209 on the surface of the interface layer 210. Process j is carried out in the same manner as Process b of Embodiment 1.

As described above, every one of Processes f-j is a sputtering process. Accordingly, Processes f-j may be continuously carried out by sequentially changing the targets in one sputtering apparatus. Alternatively, at least one process of Processes f-j may be carried out by using another sputtering apparatus.

The substrate 214 on which the second information layer 250 is formed by Processes f-j is taken out of the sputtering apparatus, and the intermediate layer 208 is formed. The intermediate layer 208 is formed by the following procedure. Firstly, an ultraviolet-curing resin is applied to the surface of the dielectric layer 209 by, for example, a spin coat method. Next, a polycarbonate substrate which has concavities and convexities which are complementary to the guide groove to be formed in the intermediate layer is stuck to the ultraviolet-curing resin with the concavo-convex surface in contact with the resin. After applying ultraviolet rays and curing the resin, the polycarbonate substrate with concavities and convexities is peeled. Thereby, the guide groove which is complementary to the concavities and convexities is formed in the ultraviolet-curing resin, and the intermediate layer 208 which has the guide groove to be formed is formed. The shape of the guide groove formed in the substrate 214 may be the same as or different from that formed in the intermediate layer 208. Alternatively, the intermediate layer 208 may be formed by forming a layer from an ultraviolet-curing resin which layer protects the dielectric layer 209, and then forming a layer having a guide groove thereon. In this case, the resultant intermediate layer has a two-layer structure. Alternatively, the intermediate layer may be formed by stacking three or more layers.

By disposing in a sputtering apparatus again the substrate 214 in which the layers up to the intermediate layer 208 are formed, the first information layer 240 is formed on the surface of the intermediate layer 208. Processes of forming the first information layer 240 correspond to Processes k-p.

Process k is the process in which the dielectric layer 207 is formed on the surface of the intermediate layer 208 having the guide groove. The process k is also carried out by sputtering. Sputtering is carried out in a noble atmosphere or in a mixed gas atmosphere of a noble gas and an oxygen gas and/or a nitrogen gas, using a RF power supply. A DC power supply may be used, if possible. The noble atmosphere may be any one of an Ar gas, a Kr gas, and a Xe gas.

The material and composition of the target used in Process k are determined so that the dielectric layer 207 having the desired composition is formed. For example, a target composed of Zr—O, Nb—O, Bi—O, Ce—O, or Ti—O can be used. Alternatively, the material containing at least one combination (for example, a compound) selected from Zr—O, Nb—O, Bi—O, Ce—O, and Ti—O at 90 mol % or more may be used. Alternatively, a mixture in which at least two combinations selected from Zr—O, Nb—O, Bi—O, Ce—O, and Ti—O are mixed may be used. The composition of the target and the composition of the formed dielectric layer may not be identical for some film-forming apparatuses. In such a case, the dielectric layer 207 having the desired composition is obtained by appropriately adjusting the composition of the target. The sputtering conditions and so forth for forming the dielectric layer 207 containing an oxide are as explained above in connection with Process b of Embodiment 1.

Next, Process l is carried out to form the reflective layer 206 on the surface of the dielectric layer 207. In Process l, the DC power supply or the RF power supply is used and, sputtering is carried out in a noble atmosphere using an alloy target containing Ag. The noble atmosphere may be any one of an Ar gas, a Kr gas, and a Xe gas. The composition of the target and the composition of the formed reflective layer may not be identical. In such a case, the reflective layer 206 having the desired composition is obtained by appropriately adjusting the composition of the target. The preferable thickness of the reflective layer is from 5 nm to 15 nm, which is thin, and therefore, it is preferable that the sputtering power is controlled so that the thickness distribution is within ±5% across the information recording medium area.

Next, Process m is carried out to form the dielectric layer 205 on the surface of the reflective layer 206. Process m is carried out in the same manner as Process b of Embodiment 1.

Next, Process n is carried out to form the first recording layer 204 on the surface of the dielectric layer 205. Process n is carried out in the same manner as Process c of Embodiment 1. It is preferable that the thickness $d_1 m$ (nm) of the constituent layer constituting the first recording layer 204 satisfies $0.1 \leq d_1 m < 10$, and therefore, when an extremely thin constituent layer is formed, the sputtering power may be smaller so that the thickness can be controlled accurately.

Next, Process o is carried out to form the interface layer 203 on the surface of the first recording layer 204. Process o is carried out in the same manner as Process d of Embodiment 1.

Next, Process P is carried out to form the dielectric layer 202 on the surface of the interface layer 203. Process P is carried out in the same manner as Process b of Embodiment 1.

As described above, every one of Processes k-p is a sputtering process. Accordingly, Processes k-p may be continuously carried out by sequentially changing the targets in one sputtering apparatus. Alternatively, at least one process of Processes k-p may be carried out using another sputtering apparatus. As described above, by sequentially carrying out Processes k-p, the first information layer 240 is formed.

After forming the layers up to the first information layer 240, the substrate 214 is taken out of the sputtering apparatus. Then, on the surface of the dielectric layer 202, the cover layer 201 is formed in the same manner as Embodiment 1. For example, the ultraviolet-curing resin to become the adhesive is coated so that the thickness thereof becomes 10 µm, and a sheet having a thickness of 65 µm is laminated thereon, and the resin is hardened by applying ultraviolet thereon, and thereby, the cover layer 201 having a thickness of 75 µm can be formed. Moreover, for example, the cover layer 201 can be formed by applying the ultraviolet-curing resin onto the surface of the dielectric layer 202 by, for example, a spin coating method so that thickness thereof becomes 75 µm, followed by hardening the resin with the irradiation of ultraviolet. As described above, the process of forming the cover layer is finished.

After finishing the process of forming the cover layer, an initialization process of the second information layer 250 and the first information layer 240 is carried out if necessary. The initialization process may be carried out on the second information layer 250 before or after forming the immediate layer 208, and may be carried out on the first information layer 240 before or after forming the cover layer 201. Alternatively, the initialization process may be implemented for the first information layer 240 and the second information layer 250 before or after forming the cover layer 201. In this manner, the information recording medium 200 of Embodiment 2 can be produced by implementing Processes f-j, the process of forming the intermediate layer, Processes k-p, and the process of forming the cover layer.

Embodiment 3

Figure 3:
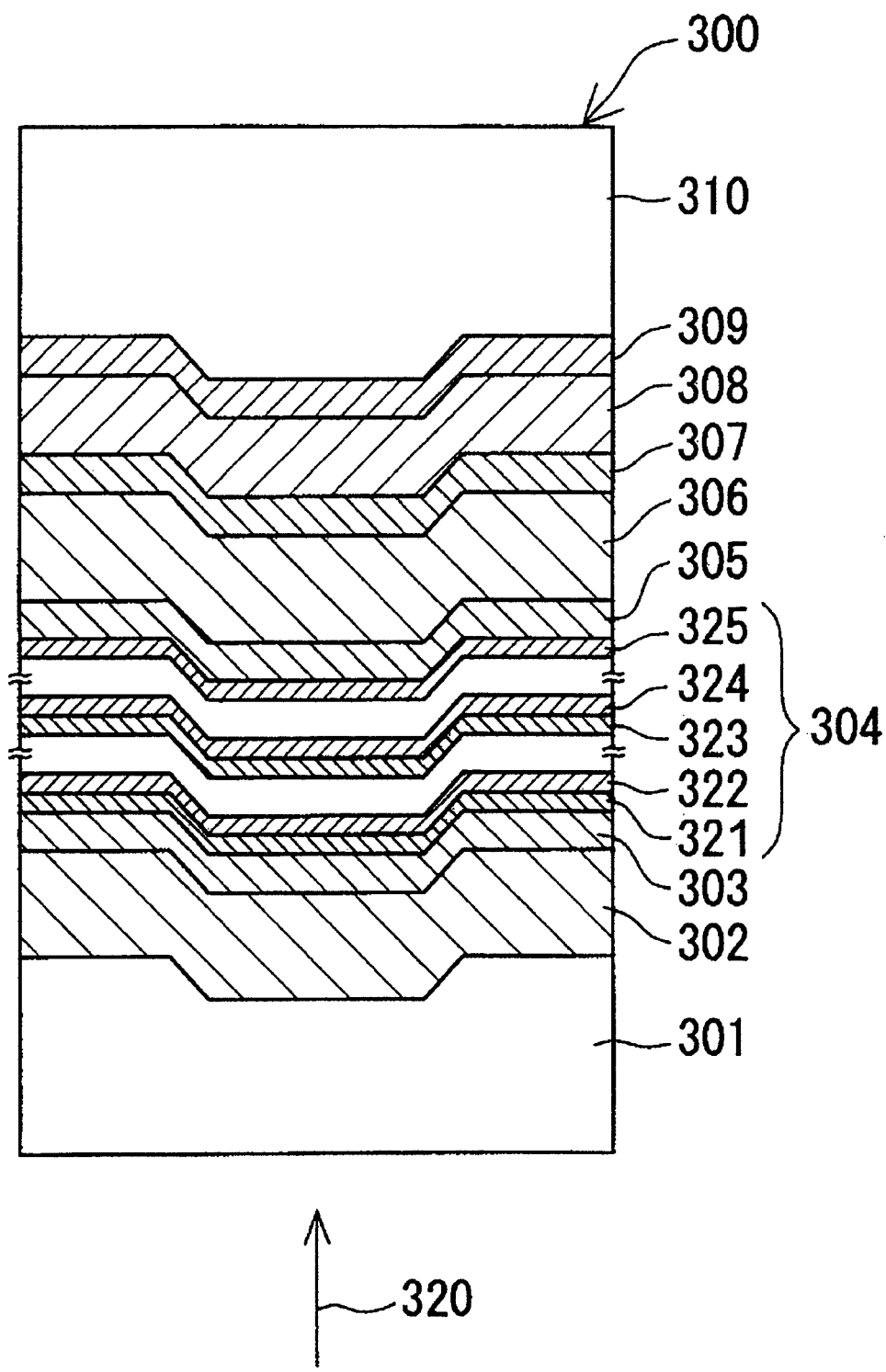
FIG. 3 is a fragmentary sectional view which shows further another example of an information recording medium of the present invention.

As Embodiment 3 of the present invention, an example of the information recording medium is described. FIG. 3 shows a partial cross section of the information recording medium.

The information recording medium 300 shown in FIG. 3 has a construction in which a dielectric layer 302 is formed on one surface of a substrate 301, an interface layer 303 is formed on a surface of the dielectric layer 302, a recording layer 304 is formed on a surface of the interface layer 303, an interface layer 305 is formed on a surface of the recording layer 304, a dielectric layer 306 is formed on a surface of the interface layer 305, an optical compensation layer 307 is formed on a surface of the dielectric layer 306, a reflective layer 308 is formed on a surface of the optical compensation layer 307 and a dummy substrate 310 is bonded with an adhesive layer 309. The recording layer 304 includes a first through an M-th constituent layers. From the side of interface layer 303, the first constituent layer 321, the second constituent layer 322, . . . , the m-th constituent layer 323, the (m+1) constituent layer 324 . . . , and the M-th constituent layer 325 are formed in this order.

The information recording medium having this construction can be used as a DVD-RAM, on and from which information is recorded and reproduced by a laser beam in a red region having a wavelength in the vicinity of 660 nm. In the information recording medium 300 having this construction, the laser light 320 is entered from the side of the substrate 301, and thereby, recording and reproduction of information are carried out.

First, the recording layer 304 will be explained. The recording layer 304 is composed of M constituent layers 321-325, similarly to the recording layer 104 of Embodiment 1 and the recording layers 204 and 211 of Embodiment 2. The recording layer 304 can be designed by a technique of setting the recording-layer compositional formula of the recording layer 304 formula and dividing the formula in the same manner as the recording layers 104 in Embodiment 1. The preferable materials and thicknesses of the constituent layers 321-325 are as described above in connection with Embodiment 1, and here, the detail thereof is omitted.

Next, the components except for the recording layer will be explained. Substrate 301 is a smooth-surfaced plate which is a discal and transparent. The substrate 301 is formed using the same material as that of the substrate 107. In the illustrated embodiment, the substrate 301 having a thickness of about 0.6 mm and a diameter of 120 mm is preferably used. The convexo-concave guide groove for guiding a laser beam may be formed on the surface of the substrate 301 on which surface the dielectric layer, the recording layer, and so forth are formed. It is preferable that when the medium of this embodiment is, for example, used as the DVD-RAM, a different in level between the groove surface and the land surface is from 40 nm to 65 nm. In the case of a DVD-RAM, the recording is performed on both the groove surface and land surface, and a distance between the groove and the land (a distance between a center of the groove surface and a center of the land surface) is about 0.615 μm.

The dielectric layer 302 and the dielectric 306 have the same functions as the dielectric layer 102 and the dielectric layer 105 in Embodiment 1, and the preferable materials and thicknesses of the layers 302 and 306 are the same as those of the dielectric layer 102 and the dielectric layer 105. For example, when the medium 300 is used as the DVD-RAM, it is preferable that the reflectance Rc satisfies 15%≦Rc and Ra≦4%. For satisfying this condition, the thickness of the dielectric layer 302 is preferably from 100 nm to 200 nm, and more preferably, from 130 nm to 170 nm. The thickness of the dielectric layer 306 is preferably from 20 nm to 60 nm, and more preferably, from 30 nm to 50 nm.

The dielectric layers 302 and 306 preferably are formed by $ZnS-SiO_2$. Moreover, each of the dielectric layers 302 and 306 may be constructed of two or more layers having different refractive indexes. For example, the dielectric layer 302 may be composed so as to be . . . /(interface layer 303)/$SiO_2$/ZnS—$SiO_2$/(substrate 301). By such construction, Rc/Ra becomes larger and signal quality is improved.

The interface layers 303 and 305 are provided so as to prevent the material transfer between the dielectric layer 302 and the recording layer 304 and between the dielectric layer 306 and the recording layer 34, caused by repeated recording. The interface layer also has a function of bonding both the dielectric layer and the recording layer in the case of poor adhesiveness therebetween. The preferable materials and thicknesses of the interface layers 303 and 305 are the same as those of the interface layer 103 of Embodiment 1. When the dielectric layer 302 and/or the dielectric layer 306 is/are formed from a material that contains neither Zn nor a sulfide and are sufficiently adhered to the recording layer 304, it is not necessary to provide the interface layer 303 and/or interface layer 305.

The optical compensation layer 307 adjusts the ratio Ac/Aa wherein Ac is the optical absorptance of the recording layer 304 in a crystalline state and Aa is the optical absorptance of the recording layer 304 in an amorphous state, and serves to suppress distortion of marks upon overwriting. It is preferable to form the optical compensation layer 307 of a material which has a high refractive index and absorbs light moderately. For example, the optical compensation layer 307 may be formed using a material whose refractive index n is in a range of from 3 to 6, and whose extinction coefficient k is in a range of from 1 to 4. Specifically, it is preferable to use material selected from amorphous Ge alloys, such as Ge—Cr and Ge—Mo, amorphous Si alloys, such as Si—Cr, Si—Mo and Si—W, tellurides such as SnTe and PbTe, and crystalline metal, such as Ti, Hf, Nb, Ta, Cr, Mo, and W and so on, semimetals, and semiconductor material. The thickness of the optical compensation layer 307 is preferably in a range of from 20 nm to 50 nm.

The reflective layer 308 has the same function as that of the reflective layer 106 in Embodiment 1. It is preferable that the reflective layer 308 is formed from a Ag or Ag alloy having high thermal conductivity such as Ag—In, Ag—Cu, or Ag—Ga. It is preferable, in order to not lower the thermal conductivity, that the concentration of the elements other than Ag is 1.5 atomic % or less. The thickness of reflective layer 308 is adjusted corresponding to the linear speed of the medium to be used or the composition of the recording layer 304 and the thickness of the reflective layer 308 is preferably 60 nm to 300 nm. If thinner than 60 nm, the rapid cooling conditions are insufficient and the heat of the recording layer becomes difficult to diffuse, and therefore the recording layer becomes difficult to be amorphous. If thicker than 300 nm, the cooling conditions becomes excessive, the heat of the recording layer diffuses too much, and therefore the recording sensitivity lowers (namely, more laser power becomes required).

In the illustrated information recording medium 300, the adhesive layer 309 is provided in order to adhere the dummy substrate 310 to the reflective layer 308. The adhesive layer 309 may be formed using a highly heat-resistant and highly adhesive material, for example, a bonding resin such as an ultraviolet-curing resin. Specifically, the adhesive layer 309 may be formed from an acrylic resin-based material, or an epoxy resin-based material. Moreover, if necessary, before forming the adhesive layer 309, a protective layer which consists of an ultraviolet-curing resin and has a thickness of from 1 µm to 20 µm may be provided on the surface of the reflective layer 308. The thickness of the adhesive layer 309 is preferably in a range of from 15 µm to 40 µm, and more preferably in a range of from 20 µm to 35 µm.

The dummy substrate 310 enhances the mechanical strength of the information recording medium 300 and protects the multilayered body formed on the substrate 301. The preferable material of the dummy substrate 310 is the same as the preferable material of the substrate 301. In the information recording medium 300 to which the dummy substrate 310 is bonded, it is preferable that the dummy substrate 310 and the substrate 301 are formed from substantially the same material and have the same thicknesses so that mechanical warpage, deformation, and so forth are not generated.

The information recording medium 300 of Embodiment 3 is a single-sided structural disc having one recording layer. The information recording medium of the present invention may have two recording layers. For example, in Embodiment 3, the pieces in which the layers up to the reflective layer 308 are laminated are bonded through the adhesive layer 309 with the reflective layers 308 facing each other, and thereby, an information recording medium having a double-sided structure can be obtained. In this case, the bonding of two laminated pieces are carried out by forming the adhesive layer 309 from a slow-acting resin and applying heat and pressure. In the case where the protective layer is provided on the reflective layer 308, an information recording medium of the double-sided structure is obtained by bonding two layered pieces in which the layers up to the protective layer are formed, with the protective layers facing each other.

Next, a method for producing the information recording medium 300 of Embodiment 3 will be explained. The method for producing this embodiment is different from the methods for producing Embodiments 1 and 2 in the point that the dielectric layer 302 in the laser incident side is initially formed. The information recording medium 300 is produced by carrying out a process in which the substrate 301 where the guide groove (the groove surface and the land surface) is formed is set in a film-forming apparatus, and then the first dielectric layer 302 is formed on the surface of the substrate 301 where the guide groove is formed (Process q), a process in which the first interface layer 303 is formed (Process r), a process in which the recording layer 304 is formed (Process s), a process in which the interface layer 305 is formed (Process t), a process in which the dielectric layer 306 is formed (Process u), a process in which the optical compensation layer 307 is formed (Process v), and a process in which the reflective layer 308 is formed (Process w) in this order, and further carrying out a process in which the adhesive layer 309 is formed on the surface of the reflective layer 308, and a process in which the dummy substrate 310 is bonded.

First, Process q is carried out to form the dielectric layer 302 on the surface of the substrate 301 where the guide groove is formed is carried out. Process q is carried out in the same manner as Process e of Embodiment 1.

Next, Process r is carried out to form the interface layer 303 on the surface of the interface layer 302. Process r is carried out in the same manner as Process d of Embodiment 1.

Next, Process s is carried out to form the recording layer 304 on the surface of the interface layer 303. Process s is carried out in the same manner as Process c of Embodiment 1 except that the first constituent layer firstly is formed firstly and the subsequent constituent layers are formed and the M-th constituent layer is formed last. The formation of each of the constituent layers can be carried out by sputtering. Sputtering is carried out in a noble atmosphere or in a mixed gas atmosphere of a noble gas and an oxygen gas and/or a nitrogen gas, using a DC power supply or a RF power supply. If possible, DC power supply may be used for high sputtering speeds. The target used in this process can be produced by using the same material as the target used in Process c of Embodiment 1.

Next, Process t is carried out to form the interface layer 305 on the surface of the recording layer 304 (the M-th constituent layer 325). Process t is carried out in the same method as Process d of Embodiment 1.

Next, Process u is carried out to form the dielectric layer 306 is film-formed on the surface of the interface layer 305. Process u is carried out in the same manner as Process e of Embodiment 1. For example, the dielectric layer 306 composed of $(ZnS)_{80}\,(SiO_2)_{20}$ (mol %) may be formed by sputtering in the atmosphere in which oxygen is mixed at 1 vol % to 3 vol % with an Ar gas, with the use of a target composed of $(ZnS)_{80}\,(SiO_2)_{20}$ (mol %).

Next, Process v is carried out to form the optical compensation layer 307 on the surface of the dielectric layer 306. In Process v, sputtering is carried out by using the DC power supply or the RF power supply. Specifically, in the sputtering, it is preferable to use a target composed of a material selected from amorphous Ge alloys such as Ge—Cr and Ge—Mo, amorphous Si alloys such as Si—Cr, Si—Mo, and Si—W, tellurides such as SnTe and PbTe, crystalline metals such as Ti, Hf, Nb, Ta, Cr, Mo, and W, a semi-metal, and a semiconductor material. The sputtering may be carried out in a noble gas atmosphere or carried out in an Ar gas atmosphere. The composition of the target and the composition of the formed optical compensation layer may not be identical for some film-forming apparatuses, and therefore, in such a case, an optical compensation layer 307 having the desired composition is obtained by appropriately adjusting the composition of the target.

Next, Process w is carried out to form the reflective layer 308 on the surface of the optical compensation layer 307. Process w is carried out in the same manner as Process a of Embodiment 1. A target composed of Ag or Ag alloy such as Ag—In, Ag—Cu, or Ag—Ga is preferably used.

The composition of the target and the composition of the formed reflective layer may not be identical for some film-forming apparatuses, and therefore, in such a case, a reflective layer 308 having the desired composition is obtained by appropriately adjusting the composition of the target.

As described above, every one of Processes q-w is a sputtering process. Accordingly, Processes q-w may be continuously carried out by sequentially changing the targets in one sputtering apparatus. Alternatively, at least one process of Processes q-w may be carried out using another sputtering apparatus.

After film-forming the reflective layer 308, the substrate 301 is taken out of the sputtering apparatus. Then, onto the surface of the reflective layer 308, an ultraviolet-curing resin is applied, for example, by a spin coat method. The dummy substrate 310 is adhered to the applied ultraviolet-curring resin, and ultraviolet is applied from the side of the dummy substrate 310 to cure the resin, and thereby, the bonding process is finished.

After finishing the bonding process, the initialization process is carried out if necessary. The initialization process is a process in which the recording layer 304 that is in an amorphous state is crystallized by irradiation of, for example, a semiconductor laser on the layer to raise the temperature of the layer 304 to be the crystallization temperature or more. The initialization process may be carried out before the bonding process. Accordingly, Processes q-w, the process of forming the adhesive layer, and the process of bonding the dummy substrate are carried out in this order, and thereby, the information recording medium 300 of Embodiment 3 can be produced.

Embodiment 4

Figure 4:
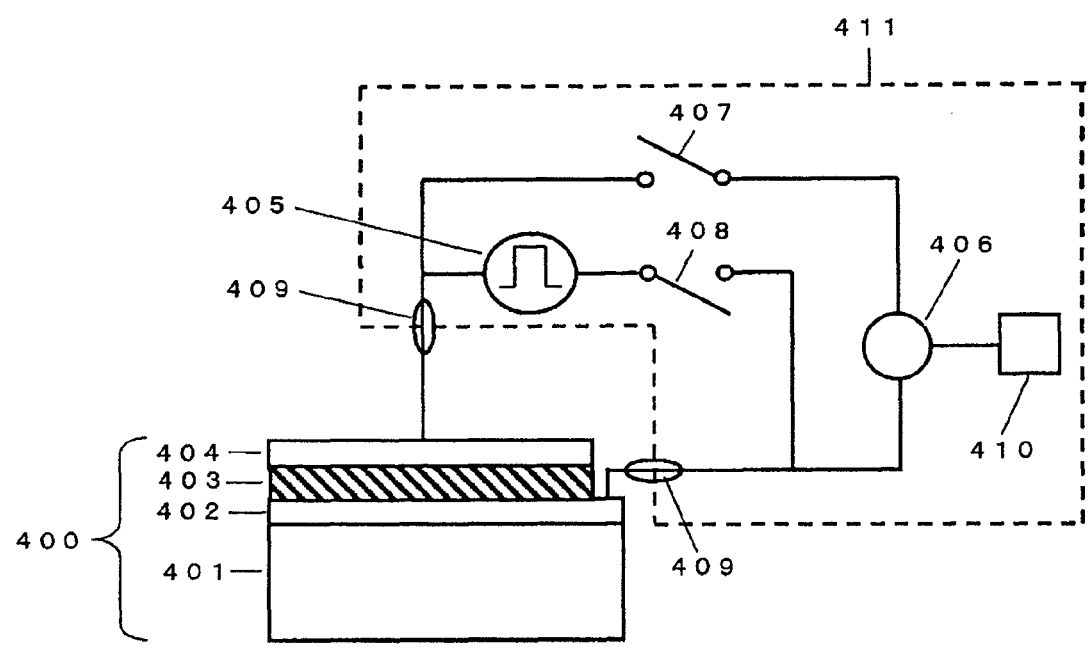
FIG. 4 show a fragmentary sectional view which shows yet another example of an information recording medium of the present invention and an example of a system in which the medium is used.

As Embodiment 4 of the present invention, one example of the information recording medium on or from which information is recorded or reproduced by applying electric energy thereto is explained. FIG. 4 shows a partial section of the information recording medium 400 and one example of the system in which the medium is used. The information recording medium 400 is a so-called memory.

In the information recording medium 400, the lower electrode 402, the recording layer 403, and the upper electrode 404 are formed in this order on the surface of the substrate 401. As the substrate 401, specifically, a semiconductor substrate such as an Si substrate, or an insulating substrate such as a polycarbonate substrate, or an $SiO_2$ substrate or an $Al_2O_3$ substrate can be used. The lower electrode 402 and the upper electrode 404 are formed by sputtering a conductive material or a metal such as Au, Ag, Pt, Al, Ti, W, Cr, or a mixture thereof.

In the recording layer 403 of this medium, Joule heat generated by applying electrical energy can generate a reversible phase change between crystal phase and amorphous phase. The recording layer 403 is constituted so that it includes a first through an M-th constituent layers (M is an integer of 2 or more) that are laminated in the thickness direction, and when the constituent layer is located at an m-th position from the side of the substrate 401 is referred to as an m-th constituent layer (m is an integer and satisfies $1 \leq x \leq M$), the elemental compositions of the m-th constituent layer and a (m+1)th constituent layer are different from each other, and the composition of the entire recording layer which is represented as the ratio of components constituting the constituent layers, can generate phase change. For this medium, the recording layer is formed by dividing a compositional formula of the entire recording layer into a plurality of groups and stacking the layers corresponding to the groups, whereby the crystallization speed and the crystallization temperature of the recording layer are improved and high-speed recording becomes possible.

In this embodiment, it is preferable that at least one constituent layer of the constituent layers constituting the recording layer includes at least one element selected from Te, Bi, Sb, Ge, In, Ga, Al, Sn, Pb, Se, and Si. Moreover, the thickness dm (nm) of each of the constituent layers satisfies 1<dm<100. This information recording medium 400 will be further explained in Example with the method for operating it.

EXAMPLES

Next, the present invention is described in detail with reference to the following examples. In the following examples, medium numbers are used for specifying the respective produced media and a medium is referred to as "medium 'medium number'"

Example 1

In Example 1, an information recording medium was fabricated according to the specifications of a Blu-ray Disc, and was tested. The information recording medium 100 shown in FIG. 1 was made and subjected to evaluation of recording and reproduction and evaluation of reliability. These evaluations were conducted for operations at 2-fold speed and 5-fold speed.

In the information recording medium 100, a recording layer 104 included a first to an M-th constituent layers. Seven types of media 100-1 to 7 were prepared by changing the number M of the constituent layers and thickness dm. For the purpose of comparison, a medium 100-A was also prepared. The recording layer 104 of the medium 100-A was a single layer formed of $(GeTe)_{95}(Bi_2Te_3)_3(In_2Te_3)_2$ (mol %) in a single layer composition with thickness D of 10 nm.

The recording layer 104 of the medium 100-1 comprised three constituent layers (M=3), and these three constituent layers were formed from GeTe, $Bi_2Te_3$ and $In_2Te_3$ respectively (these layers will hereafter be referred to as a GeTe layer, a $Bi_2Te_3$ layer and a $In_2Te_3$ layer, respectively). The recording layer 104 of the medium 100-2 comprised six constituent layers (M=6), and had a constitution wherein two sets of the GeTe layer, the $Bi_2Te_3$ layer and the $In_2Te_3$ layer stacked in this order with the sets being placed one on another. The recording layer 104 of the medium 100-3 comprised seven constituent layers (M==7), including three types of constituent layers, namely the GeTe layer, the $Bi_2Te_3$ layer and the $In_2Te_3$ layer. In the medium 100-3, the first constituent layer and the seventh constituent layer were ones having the same elemental composition (that is the GeTe layer), while the GeTe layers were placed every third layer.

The recording layer 104 of the medium 100-4 comprised eleven constituent layers (M=11), including three types of constituent layers similarly to the medium 100-1. In the medium 100-4, the first constituent layer and the eleventh constituent layer were ones having the same elemental composition (that is the GeTe layer), while the GeTe layers were placed in every other layer. The recording layer 104 of the medium 100-5 comprised seven constituent layers (M=7), including three types of constituent layers similarly to the medium 100-1. In the medium 100-5, the first constituent layer and the seventh constituent layer were ones having the same elemental composition (that is the GeTe layer), while the GeTe layers were placed in every other layer. The recording layer 104 of the medium 100-6 comprised five constituent layers, including three types of constituent layer similarly to the medium 100-1. The first constituent layer and the fifth constituent layer were ones having the same elemental composition (that is, the GeTe layer), while the GeTe layers were placed in every other layer. The recording layer 104 of the medium 100-7 comprised three constituent layers, of which the first and third constituent layers were the GeTe layers and the second constituent layer was formed of $(Bi_2Te_3)_{60}(In_2Te_3)_{40}$. The first constituent layer and the third constituent layer were ones having the same elemental composition (that is, the GeTe layer).

In any of these media, the thickness dm of each constituent layer was set so that the composition represented by combining compounds of the respective constituent layers was the same as the composition of the recording layer of the medium 100-A. Total thickness of dm of the first to Mth constituent layers was set equal to D of the medium 100-A.

Now a method for manufacturing the media 100-1 to 7 of Example 1 will be described below. All layers except for the recording layer 104 were formed by sputtering under the same conditions from the same material to the same thickness, in every medium. The material used to form the layers and thickness thereof will now be described.

A polycarbonate substrate (120 mm in diameter, 1.1 mm in thickness) having guide grooves (20 nm in depth, 0.32 μm apart between the grooves) formed thereon was prepared, for substrate 107, that was mounted in a sputtering apparatus shown in FIG. 5. On the surface of the substrate 107 where the guide grooves were formed, a reflective layer 106 having a thickness of 80 nm was formed from an Ag—Cu alloy and a dielectric layer 105 having thickness of 22 nm was formed from $(ZrO_2)_{50}(In_2O_3)_{50}$ (mol %), by sputtering. On the surface of the dielectric layer 105, an Mth constituent layer was formed, followed by the other layers till the first layer was formed on the top by sputtering, so as to form the recording layer 104 having the constitution shown in Table 1. Then on the recording layer 104, an interface layer 103 having a thickness of 5 nm was formed from $(ZrO_2)_{25}(SiO_2)_{25}(Cr_2O_3)_{50}$ (mol %) and a dielectric layer 102 having a thickness of 60 nm was formed from $(ZnS)_{80}(SiO_2)_{20}$ (mol %) in this order, by sputtering.

Now the sputtering conditions for forming the layers will be described. All targets used in sputtering had a round shape measuring 100 mm in diameter and 6 mm in thickness. The reflective layer 106 was formed by sputtering a target of an Ag—Cu alloy using a DC power supply with an output power of 200 W in an Ar gas atmosphere having a pressure of 0.4 Pa. The dielectric layer 105 was formed by sputtering a target of $(ZrO_2)_{50}(In_2O_3)_{50}$ (mol %) using a RF power supply with an output power of 400 W in an Ar gas atmosphere having a pressure of 0.13 Pa.

Now the sputtering conditions for forming the recording layer 104 will be described for each medium. Sputtering operations for forming the constituent layers were all carried out by using a DC power supply in Ar gas atmosphere having a pressure of 0.13 Pa.

The recording layer 104 of the medium 100-1 was formed in the following procedure. First, an In—Te target was sputtered with a power of 50 W thereby forming the $In_2Te_3$ layer as the third constituent layer on the dielectric layer 105. Then a Bi—Te target was sputtered with a power of 50 W thereby forming the $Bi_2Te_3$ layer as the second constituent layer, followed by sputtering a Ge—Te target with a power of 100 W thereby forming the GeTe layer as the first constituent layer.

The recording layer 104 of the medium 100-2 was formed in the following procedure. First, an In—Te target was sputtered with a power of 50 W thereby forming an $In_2Te_3$ layer as the sixth constituent layer on the dielectric layer 105. Then a Bi—Te target was sputtered with a power of 50 W thereby forming the $Bi_2Te_3$ layer as the fifth constituent layer. Then the Ge—Te target was sputtered with a power of 50 W thereby forming the GeTe layer as the fourth constituent layer. Then similar targets as those used in forming the fourth through the sixth constituent layers were sputtered successively with the same output power thereby forming the $In_2Te_3$ layer as the third constituent layer, the $Bi_2Te_3$ layer as the second constituent layer and the GeTe layer as the first constituent layer.

The recording layer 104 of the medium 100-3 was formed in the following procedure. First, a Ge—Te target was sputtered with a power of 50 W thereby forming the GeTe layer as the seventh constituent layer on the dielectric layer 105. Then an In—Te target was sputtered with a power of 50 W thereby forming the $In_2Te_3$ layer as the sixth constituent layer. Then a Bi—Te target was sputtered with a power of 50 W thereby forming a $Bi_2Te_3$ layer as the fifth constituent layer. Then similar targets as those used in forming the fifth through the seventh constituent layers were sputtered successively with the same power thereby forming the GeTe layer as the fourth constituent layer, the $In_2Te_3$ layer as the third constituent layer, and the $Bi_2Te_3$ layer as the second constituent layer. Then the Ge—Te target was sputtered with a power of 50 W thereby forming the GeTe layer as the first constituent layer.

The recording layer 104 of the medium 100-4 was formed in the following procedure. First, a Ge—Te target was sputtered with a power of 50 W thereby forming the GeTe layer as the eleventh constituent layer on the dielectric layer 105. Then a Bi—Te target was sputtered with a power of 50 W thereby forming the $Bi_2Te_3$ layer as the tenth constituent layer.

Then a Ge—Te target (the ninth constituent layer), an In—Te target (the eighth constituent layer), a Ge—Te target (the seventh constituent layer), a Bi—Te target (the sixth constituent layer), a Ge—Te target (the fifth constituent layer), an In—Te target (the fourth constituent layer), a Ge—Te target (the third constituent layer), a Bi—Te target (the second constituent layer) and a Ge—Te target (the first constituent layer) were sputtered in this order with a power of 50 W. Thus the Ge—Te layers were formed as the ninth, seventh, fifth, third and first constituent layers, the $In_2Te_3$ layers were formed as the eighth and fourth constituent layers and the $Bi_2Te_3$ layers were formed as the sixth and second constituent layers, as shown in Table 1.

The recording layer 104 of the medium 100-5 was formed by sputtering a Ge—Te target (the seventh constituent layer), a Bi—Te target (the sixth constituent layer), a Ge—Te target (the fifth constituent layer), an In—Te target (the fourth constituent layer), a Ge—Te target (the third constituent layer), a Bi—Te target (the second constituent layer) and a Ge—Te target (the first constituent layer) in this order with a power of 50 W. Thus the GeTe layers were formed as the seventh, fifth, third and first constituent layers, the $Bi_2Te_3$ layers were formed as the sixth and second constituent layers and the $In_2Te_3$ layer was formed as the fourth constituent layer.

The recording layer 104 of the medium 100-6 was formed by sputtering a Ge—Te target (the fifth constituent layer), an In—Te target (the fourth constituent layer), a Ge—Te target (the third constituent layer), a Bi—Te target (the second constituent layer) and a Ge—Te target (the first constituent layer) in this order with a power of 50 W.

The recording layer 104 of the medium 100-7 was formed in the following procedure. First, a Ge—Te target was sputtered with a power of 50 W thereby forming the GeTe layer as the third constituent layer. Then a Bi—In—Te target was sputtered with a power of 50 W thereby forming the $(Bi_2Te_3)_{60}(In_2Te_3)_{40}$ layer as the second constituent layer, followed by sputtering the same target as that of the third layer with the same power thereby forming the GeTe layer as the first constituent layer.

The recording layer 104 of the medium 100-A was formed by sputtering a Ge—Te—Bi—In target with a power of 100 W, so as to form a layer having a composition of $(GeTe)_{95}(Bi_2Te_3)_3(In_2Te_3)_2$ (mol %).

The interface layer 103 was formed on the first constituent layer 121 by sputtering a target having a composition of $(ZrO_2)_{25}(SiO_2)_{25}(Cr_2O_3)_{50}$ (mol %) by using a RF power supply with power of 400 W in Ar gas atmosphere having a pressure of 0.13 Pa. The dielectric layer 102 was formed by sputtering a target having a composition of $(ZnS)_{80}(SiO_2)_{20}$ (mol %) by using a RF power supply with power of 400 W at a pressure of 0.13 Pa in a mixed atmosphere wherein an $O_2$ gas of 3% by volume was mixed with an Ar gas.

After forming the reflective layer 106, the dielectric layer 105, the recording layer 104, the interface layer 103 and the dielectric layer 102 successively on the substrate 107 as described above, the substrate 107 was taken out of the sputtering apparatus. Then the dielectric layer 102 was coated with an ultraviolet-curing resin to a thickness of 100 μm by a spin coating method. The coated resin was cured by being irradiating with ultraviolet, thereby forming a cover layer 101.

After completing the process of forming the cover layer, the medium was initialized. In the initialization process, the material in the recording layer 104 of the information recording medium 100 was crystallized over substantially the entire annular region ranging from radius 22 mm to radius 60 mm, by using a semiconductor laser beam of a wavelength 810 nm. Since the material in the recording layer 104 was not melted in the initialization process, it is supposed that respective constituent layers of the recording layer 104 were crystallized after the initialization, and that mixing of materials of adjoining constituent layers occurred only slightly, or did not occur at all. The initialization process completed the fabrication of the media 100-1 to 7 and 100-A. All the media 100-1 to 7 thus fabricated showed mirror-surface reflectance of about 20% in terms of Rc and about 3% in terms of Ra.

Now a method of evaluating the recording and reproduction performance of the information recording medium 100 will be described. The evaluation of recording and reproduction performance was conducted by using a recording and reproduction apparatus of ordinary constitution comprising a spindle motor for driving the information recording medium 100, an optical head having a semiconductor laser that emitted a laser beam 120, and an objective lens that focused the laser beam 120 on the recording layer 104 of the information recording medium 100. Before evaluating the medium 100, data of about 25 GB was recorded on the medium by using a semiconductor laser having a wavelength of 405 nm and an objective lens having a numerical aperture number of 0.85. Recording was carried out while controlling the rotational speed so as to record the data at 2-fold speed (9.84 m/second, 72 Mbps) or 5-fold speed (24.64 m/second, 180 Mbps) at a position of 50 mm from the center. Reproduction of the recorded data was evaluated by irradiating laser beam having a power of 0.35 mW at the base speed. Evaluation of reproduction performance may also be carried out at a linear velocity higher than the base speed, and the reproduction laser beam may have a power greater than 0.35 mW.

The evaluation of recording and reproduction performance was based on measurements of signal carrier-to-noise ratio (CNR) and of the erase ratio. CNR was measured as follows. Power of the laser beam 120 directed to the information recording medium 100 was modulated within a range from a bias power Pb (mW) of a low power level to a peak power Pp (mW) of a high power level, and single signal of 2 T (mark length 0.149 μm) and single signal of 9 T (mark length 0.671 μm) were recorded alternately onto the groove surface, a total 11 times. When the eleventh 2 T signal was recorded, an amplitude of the signal (C) (dBm) and the noise (N) (dBm) were measured with a spectrum analyzer, and CNR (dB) was determined from the difference thereof.

Erase ratio was measured as follows. After measuring the amplitude of the eleventh 2 T signal and recording the twelfth 9 T signal, attenuation of the 2 T signal was measured with a spectrum analyzer. The amount of attenuation was defined as the erase ratio (dB).

In order to determine the recording power during CNR measurement, the peak power Pp and the bias power Pb were set by the following procedure. With the bias power fixed at a proper value, peak power dependency of the 2 T amplitude was measured and 2 T amplitude was saturated. A temporary Pp1 was set to the peak power at the 2 T amplitude that was 3 dBm lower than the saturating power of the 2 T amplitude. With the peak power fixed at Pp1, bias power dependency of the CNR and of the erase ratio were measured. In this measurement, the mean value of the bias power Pb0 on the lower power side and the bias power Pb1 on the high power side when 20 dB or higher erase ratio was achieved was assumed as Pb. With the bias power fixed at Pb, peak power dependency of the 2 T amplitude was measured again, and 2 T amplitude was saturated. Pp was set to a value 1.3 times the peak power at the 2 T amplitude that was 3 dBm lower than the saturating power of the 2 T amplitude. Values of Pp and Pb were determined in this procedure for 2-fold speed and the 5-fold speed.

CNR and erase ratio of the media 100-1 to 7 and 100-A were measured under conditions of 2-fold speed and the 5-fold speed by using the values of Pp and Pb determined in the above procedure ((1) 2TCNR, (2) 2 T erase ratio).

Now a method of evaluation of reliability of the medium will be described. The evaluation of reliability was to check to see whether recorded signals would be preserved when the medium was kept in the atmosphere of high temperature and high humidity, and whether the data could be rewritten after being kept in an atmosphere of high temperature and high humidity. A recording and reproduction apparatus similar to that described above was used in the evaluation. 2 T single signal and 9 T signal were recorded alternately onto the groove surface of the same track 11 times in total while modulating the power between Pp and Pb described above, for each medium. Recording of these signals was carried out on a plurality of tracks at 2-fold speed and 5-fold speed, 2TCNR was measured.

These media were left to stand in a temperature-controlled chamber that was controlled to a temperature of 80° C. and a relative humidity of 80% for 100 hours. Then the media were taken out of the temperature-controlled chamber and the 2 T signals recorded thereon were reproduced at the base speed and CNR was measured (archival characteristic). 9 T signal was written once over the recorded 2 T signal while modulating the power between Pp and Pb, and the erase ratio was measured (archival overwrite characteristic). Overwriting was carried out by running the disc at 2-fold speed for the signal that had been recorded at 2-fold speed and running the disc at the 5-fold speed for the signal that had been recorded at 5-fold speed.

The archival overwrite characteristic was evaluated by the difference between CNR (B) measured before being put into the temperature-controlled chamber and CNR (A) measured after being left stand in the temperature-controlled chamber, CNR (A)–CNR (B) ((3) change in CNR). Decreasing value of CNR after soaking in the temperature-controlled chamber means a poor reliability. The archival overwrite characteristic tends to deteriorate at a lower speed. The archival overwrite characteristic was evaluated by the difference between the erase ratio (B) measured before being put into the temperature-controlled chamber and the erase ratio (A) measured after being left to stand in the temperature-controlled chamber, (erase ratio (A)–erase ratio (B)) ((4) change in erase ratio). Decreasing value of erase ratio after soaking in the temperature-controlled chamber means a poor reliability. The archival overwrite characteristic tends to deteriorate at a higher speed.

Results of evaluating (1) 2TCNR, (2) 2 T erase ratio, (3) change in CNR and (4) change in erase ratio of the 8 types of medium at 2-fold speed (2×) and 5-fold speed (5×) are shown in Table 1. Symbols shown in the table have the following meanings.

(1) CNR
○: 45 dB or over
Δ: 40 dB or over, less than 45 dB
x: Less than 40 dB (2) Erase ratio
○: 30 dB or over
Δ: 20 dB or over, less than 30 dB
x: Less than 20 dB
(3) Change in CNR
○: 1 dB or less
Δ: Over 1 dB, less than 3 dB
x: 3 dB or over
(4) Change in erase ratio
○: 3 dB or less
Δ: Over 3 dB, less than 5 dB
x: 5 dB or over In every evaluation, "x" means that it is difficult to use the medium at the linear speed used in evaluation, "○" and "Δ" means that it is usable while "○" means better performance.

single-layer structure composition cannot be used in a range from 2-fold speed to 5-fold speed. Thus it can be concluded that both satisfactory initial performance and reliability can be achieved at the same time, by forming the recording layer in multilayer structure with divided composition as in the media 100-1 to 7, even when the overall constitution of the constituent layers remains the same.

Comparing these media in more detail revealed an influence of the difference in the number of stacked layers or in the way the layers were stacked, on the reliability. In case the first constituent layer and the M-th constituent layer differed in the elemental composition, as in the medium 100-1 and the medium 100-2, high archival overwrite characteristic was obtained at a high-fold speed. Specifically, these two media

TABLE 1

| Medium No. | Recording layer m-th constituent layer | Composition | Thickness (nm) | 2TCNR 2x | 2TCNR 5x | 2T Erase Ratio 2x | 2T Erase Ratio 5x | CNR Change 2x | CNR Change 5x | Erase Ratio Change 2x | Erase Ratio Change 5x |
|---|---|---|---|---|---|---|---|---|---|---|---|
| 100-1 | Third | $In_2Te_3$ | 0.2 | ○ | ○ | ○ | ○ | ○ | ○ | ○ | ○ |
|  | Second | $Bi_2Te_3$ | 0.3 | | | | | | | | |
|  | First | GeTe | 9.5 | | | | | | | | |
| 100-2 | Sixth | $In_2Te_3$ | 0.1 | ○ | ○ | ○ | ○ | ○ | ○ | ○ | ○ |
|  | Fifth | $Bi_2Te_3$ | 0.15 | | | | | | | | |
|  | Fourth | GeTe | 4.75 | | | | | | | | |
|  | Third | $In_2Te_3$ | 0.1 | | | | | | | | |
|  | Second | $Bi_2Te_3$ | 0.15 | | | | | | | | |
|  | First | GeTe | 4.75 | | | | | | | | |
| 100-3 | Seventh | GeTe | 3.1 | ○ | ○ | ○ | ○ | ○ | ○ | ○ | ○ |
|  | Sixth | $In_2Te_3$ | 0.1 | | | | | | | | |
|  | Fith | $Bi_2Te_3$ | 0.15 | | | | | | | | |
|  | Fourth | GeTe | 3.2 | | | | | | | | |
|  | Third | $In_2Te_3$ | 0.1 | | | | | | | | |
|  | Second | $Bi_2Te_3$ | 0.15 | | | | | | | | |
|  | First | GeTe | 3.2 | | | | | | | | |
| 100-4 | Eleventh | GeTe | 1.5 | ○ | ○ | ○ | ○ | ○ | ○ | ○ | ○ |
|  | Tenth | $Bi_2Te_3$ | 0.1 | | | | | | | | |
|  | Ninth | GeTe | 1.5 | | | | | | | | |
|  | Eighth | $In_2Te_3$ | 0.1 | | | | | | | | |
|  | Seventh | GeTe | 1.5 | | | | | | | | |
|  | Sixth | $Bi_2Te_3$ | 0.1 | | | | | | | | |
|  | Fifth | GeTe | 1.5 | | | | | | | | |
|  | Fourth | $In_2Te_3$ | 0.1 | | | | | | | | |
|  | Third | GeTe | 1.5 | | | | | | | | |
|  | Second | $Bi_2Te_3$ | 0.1 | | | | | | | | |
|  | First | GeTe | 2 | | | | | | | | |
| 100-5 | Seventh | GeTe | 2.3 | ○ | ○ | ○ | ○ | ○ | ○ | ○ | ○ |
|  | Sixth | $Bi_2Te_3$ | 0.15 | | | | | | | | |
|  | Fifth | GeTe | 2.4 | | | | | | | | |
|  | Fourth | $In_2Te_3$ | 0.2 | | | | | | | | |
|  | Third | GeTe | 2.4 | | | | | | | | |
|  | Second | $Bi_2Te_3$ | 0.15 | | | | | | | | |
|  | First | GeTe | 2.4 | | | | | | | | |
| 100-6 | Fifth | GeTe | 3.1 | ○ | ○ | ○ | ○ | ○ | ○ | ○ | ○ |
|  | Fourth | $In_2Te_3$ | 0.2 | | | | | | | | |
|  | Third | GeTe | 3.2 | | | | | | | | |
|  | Second | $Bi_2Te_3$ | 0.3 | | | | | | | | |
|  | First | GeTe | 3.2 | | | | | | | | |
| 100-7 | Third | GeTe | 4.75 | ○ | ○ | ○ | ○ | ○ | ○ | ○ | ○ |
|  | Second | $(Bi_2Te_3)_{60}(In_2Te_3)_{40}$ | 0.5 | | | | | | | | |
|  | First | GeTe | 4.75 | | | | | | | | |
| 100-A |  | $(GeTe)_{95}(Bi_2Te_3)_3(In_2Te_3)_2$ | 10 | ○ | ○ | ○ | x | ○ | ○ | Δ | x |

As shown in Table 1, the media 100-1 to 7 having the recording layer constituted from a plurality of constituent layers were evaluated with rating of "○" for all the evaluation items, and proved usability in a range from 2-fold speed to 5-fold speed. The medium 100-A, in contrast, was evaluated as "x" for 2 T erase ratio at 5-fold speed, "Δ" and "x" for change in erase ratio at 2-fold speed and at 5-fold speed respectively. These results showed that a medium having showed small change in erase ratio, 2 dB or less, at 5-fold speed. Moreover, while the media 100-1 showed a change of about 2 dB in erase ratio, the media 100-2 showed a very small change of about 1 dB in erase ratio. That is, in case the first constituent layer and the M-th constituent layer have a difference in the elemental composition, archival overwrite characteristic tends to become better as the number M of the constituent layers becomes larger.

In case the first constituent layer and the M-th constituent layer had the same elemental composition as in the media 100-3 to 100-7, on the other hand, high archival characteristic was obtained at a low disc speed. In order to verify this tendency, a reliability evaluation test was continued. Archival characteristic of media that had been put in the temperature-controlled chamber for 200 hours, 300 hours and 500 hours was evaluated. Rating of "○" or "Δ" after 100 hours of standing under conditions of 80° C. and 80% humidity means an estimated service life of 30 years or more at room temperature, indicating that the medium is practically satisfactory. Therefore, a rating of "x" after 200 or more hours of standing does not indicate a problem in practical use, while rating of "○" means an estimated service life of several hundreds or several thousands of years. The results are shown in Table 1-2.

100-4 showed a decrease in CNR of less than 1 dB even after standing under the aging accelerating conditions for 500 hours. The medium 100-5 showed a decrease in CNR of 1.8 dB at 2-fold speed after standing for 500 hours. The medium 100-6 showed a decrease in CNR of 2.8 dB at 2-fold speed and 1.5 dB at 5-fold speed after standing for 500 hours. The medium 100-7 showed a decrease in CNR of 4 dB at 2-fold speed and 2.5 dB at 5-fold speed after standing for 500 hours.

These results show that, as the number of constituent layers is larger, better archival characteristic can be achieved, also when the first constituent layer and the M-th constituent layer have the same elemental composition. Comparison of the medium 100-3 and the medium 100-5 shows that reliability of the medium can be improved by distributing a component that is included predominantly throughout the recording layer

TABLE 1-2

| Medium No. | Recording layer m-th constituent layer | Composition | Thickness (nm) | CNR Change (After 200 hr) 2x | 5x | CNR Change (After 300 hr) 2x | 5x | CNR Change (After 500 hr) 2x | 5x |
|---|---|---|---|---|---|---|---|---|---|
| 100-1 | Third | $In_2Te_3$ | 0.2 | ○ | ○ | Δ | ○ | x | Δ |
| | Second | $Bi_2Te_3$ | 0.3 | | | | | | |
| | First | GeTe | 9.5 | | | | | | |
| 100-2 | Sixth | $In_2Te_3$ | 0.1 | ○ | ○ | Δ | ○ | Δ | Δ |
| | Fifth | $Bi_2Te_3$ | 0.15 | | | | | | |
| | Fourth | GeTe | 4.75 | | | | | | |
| | Third | $In_2Te_3$ | 0.1 | | | | | | |
| | Second | $Bi_2Te_3$ | 0.15 | | | | | | |
| | First | GeTe | 4.75 | | | | | | |
| 100-3 | Seventh | GeTe | 3.1 | ○ | ○ | ○ | ○ | Δ | Δ |
| | Sixth | $In_2Te_3$ | 0.1 | | | | | | |
| | Fith | $Bi_2Te_3$ | 0.15 | | | | | | |
| | Fourth | GeTe | 3.2 | | | | | | |
| | Third | $In_2Te_3$ | 0.1 | | | | | | |
| | Second | $Bi_2Te_3$ | 0.15 | | | | | | |
| | First | GeTe | 3.2 | | | | | | |
| 100-4 | Eleventh | GeTe | 1.5 | ○ | ○ | ○ | ○ | ○ | ○ |
| | Tenth | $Bi_2Te_3$ | 0.1 | | | | | | |
| | Ninth | GeTe | 1.5 | | | | | | |
| | Eighth | $In_2Te_3$ | 0.1 | | | | | | |
| | Seventh | GeTe | 1.5 | | | | | | |
| | Sixth | $Bi_2Te_3$ | 0.1 | | | | | | |
| | Fifth | GeTe | 1.5 | | | | | | |
| | Fourth | $In_2Te_3$ | 0.1 | | | | | | |
| | Third | GeTe | 1.5 | | | | | | |
| | Second | $Bi_2Te_3$ | 0.1 | | | | | | |
| | First | GeTe | 2 | | | | | | |
| 100-5 | Seventh | GeTe | 2.3 | ○ | ○ | ○ | ○ | Δ | ○ |
| | Sixth | $Bi_2Te_3$ | 0.15 | | | | | | |
| | Fifth | GeTe | 2.4 | | | | | | |
| | Fourth | $In_2Te_3$ | 0.2 | | | | | | |
| | Third | GeTe | 2.4 | | | | | | |
| | Second | $Bi_2Te_3$ | 0.15 | | | | | | |
| | First | GeTe | 2.4 | | | | | | |
| 100-6 | Fifth | GeTe | 3.1 | ○ | ○ | ○ | ○ | Δ | Δ |
| | Fourth | $In_2Te_3$ | 0.2 | | | | | | |
| | Third | GeTe | 3.2 | | | | | | |
| | Second | $Bi_2Te_3$ | 0.3 | | | | | | |
| | First | GeTe | 3.2 | | | | | | |
| 100-7 | Third | GeTe | 4.75 | ○ | ○ | ○ | ○ | x | Δ |
| | Second | $(Bi_2Te_3)_{60}(In_2Te_3)_{40}$ | 0.5 | | | | | | |
| | First | GeTe | 4.75 | | | | | | |
| 100-A | | $(GeTe)_{95}(Bi_2Te_3)_3(In_2Te_3)_2$ | 10 | Δ | ○ | x | Δ | x | x |

As shown Table 1-2, the medium 100-1 and the medium 100-2 were evaluated with a rating of "Δ" or "x" after standing under the aging accelerating conditions for 300 hours or more, and the media 100-3 to 100-7 showed high archival characteristic after being left to stand for 300 hours or more. The medium 100-3 showed a decrease in CNR of 2.7 dB at 2-fold speed and 1.3 dB at 5-fold speed after standing under the aging accelerating conditions for 500 hours. The medium (GeTe in this Example) over a number of thin layers and providing at as short intervals as possible, namely in every other layer.

Example 2

In Example 2, too, information recording media were fabricated according to the specifications of a Blu-ray Disc, and were tested. Similarly to Example 1, information recording media 100 shown in FIG. 1 were made and subjected to evaluation of recording and reproduction and evaluation of reliability. Media 100-11 to 13 having the same constitution as the medium 100-1 of Example 1 and comparison media 100-B to D were prepared. The media 100-11 to 13 were different from the medium 100-1 in the material used to form the third constituent layer of the recording layer 104 as shown in Table 2.

The media 100-11 to 13 were made by a method similar to that for the medium 100-1 of Example 1, except for the formation of the third constituent layer under the sputtering conditions described below. For all the media, the third constituent layer was formed by sputtering by means of a DC power supply in an Ar gas atmosphere having a pressure of 0.13 Pa.

The third constituent layer of the medium 100-11 was formed by sputtering a Ga—Te target with a power of 50 W thereby forming a $Ga_2Te_3$ layer. Recording layer of the medium 100-B for comparison was formed from $(GeTe)_{95}$ $(Bi_2Te_3)_3(Ga_2Te_3)_2$ (mol %) in a single layer. The recording mono layer was formed by sputtering a Ge—Te—Bi—Ga target with a power of 100 W.

The third constituent layer of the medium 100-12 was formed by sputtering an Al—Te target with a power of 50 W thereby forming an $Al_2Te_3$ layer. A recording layer of the comparison medium 100-C for comparison was formed of $(GeTe)_{95}(Bi_2Te_3)_3(Al_2Te_3)_2$ (mol %) in a single layer. The single recording layer was formed by sputtering of a Ge—Te—Bi—Al target with a power of 100 W.

The third constituent layer of the medium 100-13 was formed by sputtering a Sb—Te target with a power of 50 W thereby forming a $Sb_2Te_3$ layer. A recording layer of the medium 100-D was formed for comparison with the medium 100-13 from $(GeTe)_{95}(Bi_2Te_3)_3(Sb_2Te_3)_2$ (mol %) in a single layer. The single recording layer was formed by sputtering of a Ge—Te—Bi—Sb target with a power of 100 W.

All the media 100-11 to 13 and 100-B to D showed mirror surface reflectance of about 20% in terms of Rc and about 3% in terms of Ra.

Recording and reproduction evaluation method and reliability evaluation method for these media are described in connection with Example 1. Results of evaluating (1) 2TCNR, (2) 2 T erase ratio, (3) change in CNR and (4) change in erase ratio of these 6 types of medium at 2-fold speed and 5-fold speed are shown in Table 2. Symbols shown in the table have the same meanings as in Example 1.

As shown in Table 2, the media 100-11 to 13 having the recording layers comprised of a plurality of constituent layers were evaluated with rating of "○" for all evaluation items, and proved usability in a range from 2-fold speed to 5-fold speed. The media 100-B to 100-D, in contrast, were evaluated as "Δ" or "x" for erase ratio. Results were similar to those of Example 1 also when the third constituent layer was formed from $Ga_2Te_3$, $Al_2Te_3$ or $Sb_2Te_3$.

Example 3

In Example 3, too, information recording media were fabricated according to the specifications of a Blu-ray Disc, and were tested. The information recording medium 100 shown in FIG. 1 was made and subjected to evaluation of recording and reproduction and evaluation of reliability. Media 100-21 to 29 and media 100-E to M for comparison were prepared. These media had the same constitution (including material and thickness) as that in Example 1 and were fabricated by the same method as that in Example 1, except for the recording layer 104. The media 100-21 to 29 were different from the media of Example 1 in that the recording layer 104 comprised two constituent layers (M=2) as shown in Table 3, that the first constituent layer includes Bi—Te or a combination of Bi—Te and other element, and that overall thickness of the recording layer 104 was 16 nm. In every media, the second constituent layer was formed on the dielectric layer 105 as a GeTe having a thickness of 15.2 nm.

Now the first constituent layer of each medium will be described. For all the media, the first constituent layer or a single recording layer was formed by sputtering using a DC power supply in an Ar gas atmosphere having a pressure of 0.13 Pa.

The first constituent layer of the medium 100-21 was formed by sputtering a Bi—In—Te target with a power of 50 W, thereby forming a layer of $(Bi_2Te_3)_{60}(In_2Te_3)_{40}$ (mol %) having a thickness of 0.8 nm. The recording layer 104 of the medium 100-E for comparison was formed by sputtering a Ge—Te—Bi—In target with a power of 100 W so that a single layer of $(GeTe)_{95}(Bi_2Te_3)_3(In_2Te_3)_2$ (mol %) having a thickness of 16 nm was formed.

The first constituent layer of the medium 100-22 was formed by sputtering a Bi—Sb—Te target with a power of 50 W, thereby forming a layer of $(Bi_2Te_3)_{60}(Sb_2Te_3)_{40}$ (mol %) having a thickness of 0.8 nm. The recording layer 104 of the medium 100-F for comparison was formed by sputtering a Ge—Te—Bi—Sb target with a power of 100 W so that a

TABLE 2

| Medium No. | Recording layer | | | 2T Erase | | | | Erase Ratio | |
|---|---|---|---|---|---|---|---|---|---|
| | m-th constituent layer | Composition | Thickness (nm) | 2TCNR | | Ratio | | CNR Change | | Change | |
| | | | | 2x | 5x | 2x | 5x | 2x | 5x | 2x | 5x |
| 100-11 | Third | $Ga_2Te_3$ | 0.2 | ○ | ○ | ○ | ○ | ○ | ○ | ○ | ○ |
| | Second | $Bi_2Te_3$ | 0.3 | | | | | | | | |
| | First | GeTe | 9.5 | | | | | | | | |
| 100-B | $(GeTe)_{95}(Bi_2Te_3)_3(Ga_2Te_3)_2$ | | 10 | ○ | ○ | ○ | x | ○ | ○ | Δ | x |
| 100-12 | Third | $Al_2Te_3$ | 0.2 | ○ | ○ | ○ | ○ | ○ | ○ | ○ | ○ |
| | Second | $Bi_2Te_3$ | 0.3 | | | | | | | | |
| | First | GeTe | 9.5 | | | | | | | | |
| 100-C | $(GeTe)_{95}(Bi_2Te_3)_3(Al_2Te_3)_2$ | | 10 | ○ | ○ | Δ | x | ○ | ○ | x | x |
| 100-13 | Third | $Sb_2Te_3$ | 0.2 | ○ | ○ | ○ | ○ | ○ | ○ | ○ | ○ |
| | Second | $Bi_2Te_3$ | 0.3 | | | | | | | | |
| | First | GeTe | 9.5 | | | | | | | | |
| 100-D | $(GeTe)_{95}(Bi_2Te_3)_3(Sb_2Te_3)_2$ | | 10 | ○ | ○ | ○ | x | ○ | ○ | Δ | x | single layer of $(GeTe)_{95}(Bi_2Te_3)_3(Sb_2Te_3)_2$ (mol %) having a thickness of 16 nm was formed.

The first constituent layer of the medium 100-23 was formed by sputtering a Bi—Si—Te target with a power of 50 W, thereby forming a layer of $(Bi_2Te_3)_{60}(SiTe_2)_{40}$ (mol %) having a thickness of 0.8 nm. The recording layer 104 of the medium 100-G for comparison was formed by sputtering a Ge—Te—Bi—Si target with a power of 100 W so that a single layer of $(GeTe)_{95}(Bi_2Te_3)_3(Sb_2Te_2)_2$ (mol %) having a thickness of 16 nm was formed.

The first constituent layer of the medium 100-24 was formed by sputtering a Bi—Te—Si—Se target with a power of 50 W, thereby forming a layer of $(Bi_2Te_3)_{60}(SiSe_2)_{40}$ (mol %) having a thickness of 0.8 nm. The recording layer 104 of the medium 100-H for comparison was formed by sputtering a Ge—Te—Bi—Si—Se target with a power of 100 W so that a single layer of $(GeTe)_{95}(Bi_2Te_3)_3(SiSe_2)_2$ (mol %) having a thickness of 16 nm was formed.

The first constituent layer of the medium 100-25 was formed by sputtering a Bi—Ga—Te target with a power of 50 W, thereby forming a layer of $(Bi_2Te_3)_{60}(Ga_2Te_3)_{40}$ (mol %) having a thickness of 0.8 nm. The recording layer 104 of the medium 100-I for comparison was formed by sputtering a Ge—Te—Bi—Ga target with a power of 100 W so that a single layer of $(GeTe)_{95}(Bi_2Te_3)_3(Ga_2Te_3)_2$ (mol %) having a thickness of 16 nm was formed.

The first constituent layer of the medium 100-26 was formed by sputtering a Bi—Al—Te target with a power of 50 W, thereby forming a layer of $(Bi_2Te_3)_{60}(Al_2Te_3)_{40}$ (mol %) having a thickness of 0.8 nm. The recording layer 104 of the medium 100-J for comparison was formed by sputtering a Ge—Te—Bi—Al target with a power of 100 W so that a single layer of $(GeTe)_{95}(Bi_2Te_3)_3(Al_2Te_3)_2$ (mol %) having a thickness of 16 nm was formed.

The first constituent layer of the medium 100-27 was formed by sputtering a Bi—Sn—Te target with a power of 50 W, thereby forming a layer of $(Bi_2Te_3)_{60}(SnTe)_{40}$ (mol %) having a thickness of 0.8 nm. The recording layer 104 of the medium 100-K for comparison was formed by sputtering a Ge—Te—Bi—Sn target with a power of 100 W so that a single layer of $(GeTe)_{95}(Bi_2Te_3)_3(SnTe)_2$ (mol %) having a thickness of 16 nm was formed.

The first constituent layer of the medium 100-28 was formed by sputtering a Bi—Pb—Te target with a power of 50 W, thereby forming a layer of $(Bi_2Te_3)_{60}(PbTe)_{40}$ (mol %) having a thickness of 0.8 nm. The recording layer 104 of the medium 100-L for comparison was formed by sputtering a Ge—Te—Bi—Pb target with a power of 100 W so that a single layer of $(GeTe)_{95}(Bi_2Te_3)_3(PbTe)_2$ (mol %) having a thickness of 16 nm was formed.

The first constituent layer of the medium 100-29 was formed by sputtering a Bi—Te target with a power of 50 W, thereby forming a layer of $Bi_2Te_3$ having a thickness of 0.8 nm. The recording layer 104 of the medium 100-M for comparison was formed by sputtering a Ge—Te—Bi target with a power of 100 W so that a single layer of $(GeTe)_{95}(Bi_2Te_3)_5$ (mol %) having a thickness of 16 nm was formed.

All the media 100-21 to 29 and 100-E to M made as described above showed mirror-surface reflectance of about 25% in terms of Rc and about 2% in terms of Ra.

Recording and reproduction evaluation method and reliability evaluation method for these media are described in connection with in Example 1. Results of evaluating (1) 2TCNR, (2) 2 T erase ratio, (3) change in CNR and (4) change in erase ratio of the 18 types of medium at 2-fold speed (2×) and 5-fold speed (5×) are shown in Table 3. Symbols shown in the table have the same meanings as in Example 1.

TABLE 3

| Medium No. | Recording layer m-th constituent layer | Composition | Thickness (nm) | 2TCNR 2x | 2TCNR 5x | 2T Erase Ratio 2x | 2T Erase Ratio 5x | CNR Change 2x | CNR Change 5x | Erase Ratio Change 2x | Erase Ratio Change 5x |
|---|---|---|---|---|---|---|---|---|---|---|---|
| 100-21 | Second | GeTe | 15.2 | ○ | ○ | ○ | ○ | ○ | ○ | ○ | ○ |
|  | First | $(Bi_2Te_3)_{60}(In_2Te_3)_{40}$ | 0.8 |  |  |  |  |  |  |  |  |
| 100-E |  | $(GeTe)_{95}(Bi_2Te_3)_3(In_2Te_3)_2$ | 16 | Δ | ○ | ○ | ○ | x | Δ | ○ | ○ |
| 100-22 | Second | GeTe | 15.2 | ○ | ○ | ○ | ○ | ○ | ○ | ○ | ○ |
|  | First | $(Bi_2Te_3)_{60}(Sb_2Te_3)_{40}$ | 0.8 |  |  |  |  |  |  |  |  |
| 100-F |  | $(GeTe)_{95}(Bi_2Te_3)_3(Sb_2Te_3)_2$ | 16 | Δ | ○ | ○ | ○ | x | Δ | ○ | ○ |
| 100-23 | Second | GeTe | 15.2 | ○ | ○ | ○ | ○ | ○ | ○ | ○ | ○ |
|  | First | $(Bi_2Te_3)_{60}(SiTe_2)_{40}$ | 0.8 |  |  |  |  |  |  |  |  |
| 100-G |  | $(GeTe)_{95}(Bi_2Te_3)_3(SiTe_2)_2$ | 16 | Δ | ○ | ○ | ○ | x | Δ | ○ | ○ |
| 100-24 | Second | GeTe | 15.2 | ○ | ○ | ○ | ○ | ○ | ○ | ○ | ○ |
|  | First | $(Bi_2Te_3)_{60}(SiSe_2)_{40}$ | 0.8 |  |  |  |  |  |  |  |  |
| 100-H |  | $(GeTe)_{95}(Bi_2Te_3)_3(SiSe_2)_2$ | 16 | Δ | ○ | ○ | ○ | x | Δ | ○ | ○ |
| 100-25 | Second | GeTe | 15.2 | ○ | ○ | ○ | ○ | ○ | ○ | ○ | ○ |
|  | First | $(Bi_2Te_3)_{60}(Ga_2Te_3)_{40}$ | 0.8 |  |  |  |  |  |  |  |  |
| 100-I |  | $(GeTe)_{95}(Bi_2Te_3)_3(Ga_2Te_3)_2$ | 16 | Δ | ○ | ○ | ○ | x | Δ | ○ | ○ |
| 100-26 | Second | GeTe | 15.2 | ○ | ○ | ○ | ○ | ○ | ○ | ○ | ○ |
|  | First | $(Bi_2Te_3)_{60}(Al_2Te_3)_{40}$ | 0.8 |  |  |  |  |  |  |  |  |
| 100-J |  | $(GeTe)_{95}(Bi_2Te_3)_3(Al_2Te_3)_2$ | 16 | Δ | ○ | ○ | ○ | x | Δ | ○ | ○ |
| 100-27 | Second | GeTe | 15.2 | ○ | ○ | ○ | ○ | ○ | ○ | ○ | ○ |
|  | First | $(Bi_2Te_3)_{60}(SnTe)_{40}$ | 0.8 |  |  |  |  |  |  |  |  |
| 100-K |  | $(GeTe)_{95}(Bi_2Te_3)_3(SnTe)_2$ | 16 | Δ | ○ | ○ | ○ | x | Δ | ○ | ○ |
| 100-28 | Second | GeTe | 15.2 | ○ | ○ | ○ | ○ | ○ | ○ | ○ | ○ |
|  | First | $(Bi_2Te_3)_{60}(PbTe)_{40}$ | 0.8 |  |  |  |  |  |  |  |  |
| 100-L |  | $(GeTe)_{95}(Bi_2Te_3)_3(PbTe)_2$ | 16 | Δ | ○ | ○ | ○ | x | Δ | ○ | ○ |
| 100-29 | Second | GeTe | 15.2 | ○ | ○ | ○ | ○ | Δ | ○ | ○ | ○ |
|  | First | $Bi_2Te_3$ | 0.8 |  |  |  |  |  |  |  |  |
| 100-M |  | $(GeTe)_{95}(Bi_2Te_3)_5$ | 16 | Δ | ○ | ○ | ○ | x | x | ○ | ○ |

As shown in Table 3, media which could be used in a range from 2-fold speed to 5-fold speed having ratios of maximum speed/minimum speed of 2.5 were obtained, also in the case when one of the constituent layers of the recording layer 104 included two compounds. All of the media that included a single recording layer having the same overall composition, in contrast, did not have practical usefulness in such a range of speeds. This result shows that performance of the recording layer can be improved by forming it in 2-layer structure by dividing 3-component materials into GeTe and a combination of $Bi_2Te_3$ and another telluride compound or a selenide compound.

The media 100-21 to 28 having the recording layers comprised of a plurality of constituent layers were evaluated with rating of "○" for all the evaluation items. The medium 100-29 was evaluated with "Δ" for change in CNR at 2-fold speed. This result shows that the recording layer that includes other elements in addition to Bi and Te provides better recording and reproduction performance and reliability even when the overall thickness was as large as 16 nm. The media 100-E to L for comparison were all evaluated as "x" for the change in CNR at 2-fold speed and usable at 5-fold speed, but inappropriate for use at least in such a range of speeds as when the ratio maximum speed/minimum speed of 2.4 was required for CAV. This is supposedly because the increased thickness 16 nm of the recording layer led to a higher crystallization speed, although the archival characteristic decreased accordingly. The medium 100-M was evaluated as "x" for the change in CNR at 2-fold speed and 5-fold speed.

Example 4

In Example 4, too, information recording media were fabricated according to the specifications of a Blu-ray Disc, and were tested. The information recording medium 100 shown in FIG. 1 was made and subjected to evaluation of recording and reproduction and evaluation of reliability at 5-fold speed and a very high linear velocity of 12-fold speed. Media 100-31 to 35 and media 100-N to R for comparison were prepared in this Example. These media had the same constitution (including material and thickness) as that in Example 1 and were fabricated by the same method as that in Example 1, except for the recording layer 104.

Overall thickness of the recording layer 104 of the media 100 of this Example was set to 8 nm. Thickness of the recording layer 104 was made smaller than the thickness of the recording layer of the media of Examples 1 to 3 in order to decrease the heat capacity during recording, by taking into consideration the shorter duration of irradiation of the recording layer 104 with laser beam because of higher linear speeds for the recording and reproduction evaluation compared to Examples 1 to 3. Proportion of $Bi_2Te_3$ in the composition of the entire recording layer was increased so as to achieve a sufficiently high crystallization speed, in order to enable operation at 12-fold speed.

The recording layer 104 of the media 100-31 to 35 consisted of five constituent layers. In any of these media, the fifth and second constituent layers were ones of GeTe, the fourth and first constituent layers were ones of $Bi_2Te_3$, and the third constituent layer was formed from various materials having strong crystallinity.

Now the constitution of the recording layer 104 will be described in more detail. As the fifth constituent layer, a layer of GeTe having a thickness of 2.1 nm was formed on the dielectric layer 105. As the fourth layer, a layer of $Bi_2Te_3$ having a thickness of 0.9 nm was formed on the fifth constituent layer. The third layer was formed to a thickness of 2 nm by a method to be described later on the fourth constituent layer. As the second layer, a layer of GeTe having a thickness of 2.1 nm was formed on the third constituent layer. As the first layer, a layer of $Bi_2Te_3$ having a thickness of 0.9 nm was formed on the second constituent layer.

For all the media, the respective constituent layers were formed by sputtering using a DC power supply in an Ar gas atmosphere having a pressure of 0.13 Pa. The GeTe layer was formed by sputtering a Ge—Te target, and the $Bi_2Te_3$ layer was formed by sputtering a Bi—Te target.

Now the third constituent layer of each medium will be described. The third constituent layer of the medium 100-31 was formed by sputtering an Sn—Te target with a power of 50 W, thereby forming an SnTe layer. The recording layer 104 of the medium 100-N for comparison was formed by sputtering a Ge—Te—Bi—Sn target with a power of 100 W, thereby forming a single layer of $(GeTe)_{52.5}(Bi_2Te_3)_{22.5}(SnTe)_{25}$ (mol %) having a thickness of 8 nm.

The third constituent layer of the medium 100-32 was formed by sputtering a Bi—Te target with a power of 50 W, thereby forming a BiTe layer. The recording layer 104 of the medium 100-O for comparison was formed by sputtering a Ge—Te—Bi target with a power of 100 W, thereby forming a single layer of $(GeTe)_{52.5}(Bi_2Te_3)_{22.5}(BiTe)_{25}$ (mol %) having a thickness of 8 nm.

The third constituent layer of the medium 100-33 was formed by sputtering a Pb—Te target with a power of 50 W, thereby forming a PbTe layer. The recording layer 104 of the medium 100-P for comparison was formed by sputtering a Ge—Te—Bi—Pb target with a power of 100 W, thereby forming a single layer of $(GeTe)_{52.5}(Bi_2Te_3)_{22.5}(PbTe)_{25}$ (mol %) having a thickness of 8 nm.

The third constituent layer of the medium 100-34 was formed by sputtering a Se—Sn target with a power of 50 W, thereby forming a SeSn layer. The recording layer 104 of the medium 100-Q for comparison was formed by sputtering a Ge—Te—Bi—Se—Sn target with a power of 100 W, thereby forming a single layer of $(GeTe)_{52.5}(Bi_2Te_3)_{22.5}(SeSn)_{25}$ (mol %) having a thickness of 8 nm.

The third constituent layer of the medium 100-35 was formed by sputtering a Bi—Se target with a power of 50 W, thereby forming a BiSe layer. The recording layer 104 of the medium 100-R of comparison was formed by sputtering a Ge—Te—Bi—Se target with a power of 100 W, thereby forming a single layer of $(GeTe)_{52.5}(Bi_2Te_3)_{22.5}(BiSe)_{25}$ (mol %) having a thickness of 8 nm.

All the media 100-31 to 35 and 100-N to R made as described above showed mirror-surface reflectance of about 18% in terms of Rc and about 3% in terms of Ra.

Now a method of evaluation of recording and reproduction in this Example will be described. The evaluation was conducted by means of a record reproduction apparatus of a similar constitution to that of the apparatus used in Example 1. Recording was carried out while controlling the rotation frequency of the medium so as to record the data at 5-fold speed (24.6 m/second, 180 Mbps) or 12-fold speed (59.0 m/second, 432 Mbps) at a position of 57 mm from the center. Reproduction of the recorded data was evaluated by applying a laser beam having a power of 0.35 mW at the base speed. Evaluation of the recording and reproduction was based on measurements of signal amplitude-to-noise ratio (CNR) and of the erase ratio. In this Example, too, values of Pp and Pb at 5-fold speed and 12-fold speed were determined in a similar procedure to that employed in Example 1, and the CNR and the erase ratio were measured by a method similar to that used in Example 1. For the media 100-31 to 35 and 100-N to R, the CNR and the erase ratio at 5-fold speed and 12-fold speed were measured for signals which were recorded with power modulation between Pp and Pb ((1) 2TCNR, (2) 2 T erase ratio).

Reliability was also evaluated by a method similar to that employed in Example 1, except for the linear velocity. Results of evaluating (1) 2TCNR, (2) 2 T erase ratio, (3) change in CNR and (4) change in erase ratio of the 10 types of information recording media at 5-fold speed (5×) and 12-fold speed (12×) are shown in Table 4. Symbols shown in the table have the same meanings as in Example 1.

time in the media 100-31 to 35. In the recording layers of these media, it is supposed that the third constituent layer contributes to the improvement of crystallization speed, the second and fifth constituent layers contribute to the suppression of CNR change, and the first and fourth constituent layers contribute to the suppression of erase ratio change. Further the information recording medium that could be used

TABLE 4

| Medium No. | Recording layer | | | 2TCNR | | 2T Erase Ratio | | CNR Change | | Erase Ratio Change | |
| | m-th constituent layer | Composition | Thickness (nm) | 5× | 12× | 5× | 12× | 5× | 12× | 5× | 12× |
| --- | --- | --- | --- | --- | --- | --- | --- | --- | --- | --- | --- |
| 100-31 | Fifth | GeTe | 2.1 | ○ | ○ | ○ | ○ | ○ | ○ | ○ | ○ |
| | Fourth | $Bi_2Te_3$ | 0.9 | | | | | | | | |
| | Third | SnTe | 2 | | | | | | | | |
| | Second | GeTe | 2.1 | | | | | | | | |
| | First | $Bi_2Te_3$ | 0.9 | | | | | | | | |
| 100-N | $(GeTe)_{52.5}(Bi_2Te_3)_{22.5}(SnTe)_{25}$ | | 8 | x | Δ | ○ | ○ | x | Δ | ○ | ○ |
| 100-32 | Fifth | GeTe | 2.1 | ○ | ○ | ○ | ○ | ○ | ○ | ○ | ○ |
| | Fourth | $Bi_2Te_3$ | 0.9 | | | | | | | | |
| | Third | BiTe | 2 | | | | | | | | |
| | Second | GeTe | 2.1 | | | | | | | | |
| | First | $Bi_2Te_3$ | 0.9 | | | | | | | | |
| 100-O | $(GeTe)_{52.5}(Bi_2Te_3)_{22.5}(BiTe)_{25}$ | | 8 | x | Δ | ○ | ○ | x | Δ | ○ | ○ |
| 100-33 | Fifth | GeTe | 2.1 | ○ | ○ | ○ | ○ | ○ | ○ | ○ | ○ |
| | Fourth | $Bi_2Te_3$ | 0.9 | | | | | | | | |
| | Third | PbTe | 2 | | | | | | | | |
| | Second | GeTe | 2.1 | | | | | | | | |
| | First | $Bi_2Te_3$ | 0.9 | | | | | | | | |
| 100-P | $(GeTe)_{52.5}(Bi_2Te_3)_{22.5}(PbTe)_{25}$ | | 8 | x | Δ | ○ | ○ | x | Δ | ○ | ○ |
| 100-34 | Fifth | GeTe | 2.1 | ○ | ○ | ○ | ○ | ○ | ○ | ○ | ○ |
| | Fourth | $Bi_2Te_3$ | 0.9 | | | | | | | | |
| | Third | SeSn | 2 | | | | | | | | |
| | Second | GeTe | 2.1 | | | | | | | | |
| | First | $Bi_2Te_3$ | 0.9 | | | | | | | | |
| 100-Q | $(GeTe)_{52.5}(Bi_2Te_3)_{22.5}(SeSn)_{25}$ | | 8 | x | Δ | ○ | ○ | x | Δ | ○ | ○ |
| 100-35 | Fifth | GeTe | 2.1 | ○ | ○ | ○ | ○ | ○ | ○ | ○ | ○ |
| | Fourth | $Bi_2Te_3$ | 0.9 | | | | | | | | |
| | Third | BiSe | 2 | | | | | | | | |
| | Second | GeTe | 2.1 | | | | | | | | |
| | First | $Bi_2Te_3$ | 0.9 | | | | | | | | |
| 100-R | $(GeTe)_{52.5}(Bi_2Te_3)_{22.5}(BiSe)_{25}$ | | 8 | x | Δ | ○ | ○ | x | Δ | ○ | ○ |

As shown in Table 4, the media 100-31 to 35 having the recording layer constituted from a plurality of constituent layers were evaluated with rating of "○" for all the evaluation items, and proved usability in a range from 5-fold speed to 12-fold speed. The media 100-N to R that were made for the purpose of comparison, in contrast, were all evaluated as "x" for the 2TCNR and the change in CNR. A satisfactory erase ratio was achieved at 12-fold speed since the crystallization speed was made higher by increasing the content of $Bi_2Te_3$. However, it was difficult to form the record marks, and even the initial performance was unsatisfactory. When archival characteristic was examined on the media 100-N to R, marks that had been recorded thereon almost disappeared due to crystallization. Thus it was determined to be difficult to use the media 100-N to R at 5-fold speed and 12-fold speed.

As will be apparent from the results of evaluating the media 100-N to R, making a medium that can be used at a higher linear velocity requires an increase in the crystallization speed of the recording layer, which makes it difficult to ensure the archival characteristic at a low linear velocity. This problem can be solved by distributing a phase-change material having a high crystallization speed into a plurality of constituent components so as to form a recording layer of a multilayer as in the media 100-31 to 35. Excellent initial performance and reliability (namely small change in CNR and small change in erase ratio) were successfully achieved at the same time in the media 100-31 to 35. In the recording layers of these media, it is supposed that the third constituent layer contributes to the improvement of crystallization speed, the second and fifth constituent layers contribute to the suppression of CNR change, and the first and fourth constituent layers contribute to the suppression of erase ratio change. Further the information recording medium that could be used at a higher linear velocity and in a wider range of linear velocities was realized by designing the recording layer so as to have a periodic structure by providing two GeTe layers.

Example 5

In Example 5, an information recording medium 200 having two information layers shown in FIG. 2 was fabricated according to the specifications of a Blu-ray Disc, and was subjected to evaluation of recording and reproduction and evaluation of reliability at 5-fold speed and 12-fold speed similarly to Example 4.

Media 200-1 and 200-2 and media 200-A and 200-B for comparison were prepared. Specifically, as shown in Table 5, a second recording layer 211 of the medium 200-1 was formed in 5-layer structure (M=5), with the first constituent layer formed of $Bi_2Te_3$, the second constituent layer formed of GeTe, the third constituent layer formed of SnTe, the fourth constituent layer formed of $In_2Te_3$ and the fifth constituent layer formed of GeTe, while the overall thickness D of the recording layer was set to 8 nm. The first recording layer 204 was also formed in a 5-layer structure (M=5), with the first constituent layer formed of $Bi_2Te_3$, the second constituent layer formed of GeTe, the third constituent layer formed of SnTe, the fourth constituent layer formed of $Bi_2Te_3$ and the fifth constituent layer formed of GeTe, while the overall thickness D of the recording layer was set to 6 nm.

A second recording layer 211 of the medium 200-A was formed from a material having the same overall composition as that of the second recording layer 211 of the medium 200-1, namely $(GeTe)_{44}(In_2Te_3)_{13}(SnTe)_{25}(Bi_2Te_3)_{18}$ (mol %), and its thickness was 8 nm. A first recording layer 204 of the medium 200-A was also formed from a material having the same overall composition as that of the first recording layer 204 of the medium 200-1, namely $(GeTe)_{34}(SnTe)_{33}(Bi_2Te_3)_{33}$ (mol %), and its thickness was 6 nm.

A second recording layer 211 of the medium 200-2 was formed in 5-layer structure (M=5), with the first constituent layer formed of $Ge_{20}Sb_{80}$, the second constituent layer formed of Sb, the third constituent layer formed of $In_{20}Sb_{80}$, the fourth constituent layer formed of Sb and the fifth constituent layer formed of $Ge_{20}Sb_{30}$, while the overall thickness D of the recording layer was set to 8 nm. The first recording layer 204 was also formed in 5-layer structure (M=5), with the first constituent layer formed of $Ge_{15}Sb_{85}$, the second constituent layer formed of Sb, the third constituent layer formed of $In_{15}Sb_{85}$, the fourth constituent layer formed from Sb and the fifth constituent layer formed of $Ge_{15}Sb_{85}$, while the overall thickness of the recording layer was set to 6 nm.

A second recording layer 211 of the medium 200-B was formed from a material having the same overall composition as that of the second recording layer 211 of the medium 200-2, namely $In_4Ge_8Sb_{88}$ (atomic %), and its thickness was 8 nm. The first recording layer 204 was also formed from a material having the same overall composition as that of the first recording layer 204 of the medium 200-2, namely $In_3Ge_6Sb_{91}$ (atomic %), and its thickness was 6 nm.

Now the method of fabricating the media will be described. The media 200-1 and 2 and the media 200-A and B were made by the same method with the same structure, except for the recording layers 211 and 204. Specifically, every media was made by forming, as a reflective layer 213, a layer of an Ag—Cu alloy having a thickness of 80 nm on the surface of a substrate 214 whereon guide grooves were formed, and, as a dielectric layer 212, a layer of $(ZrO_2)_{50}(In_2O_3)_{50}$ (mol %) having a thickness of 18 nm, and the second recording layer 211 was formed to an overall thickness of 8 nm. Constitutions of the recording layers 211 are as described previously. Then, as an interface layer 210, a layer of $(ZrO_2)_{25}(SiO_2)_{25}(Cr_2O_3)_{50}$ (mol %) having a thickness of 5 nm was formed on the second recording layer 211, and, as a dielectric layer 209, a layer of $(ZnS)_{80}(SiO_2)_{20}$ (mol %) having a thickness of 60 nm was formed, thereby forming a second information layer 250.

Then an intermediate layer 208 having guide grooves was formed on the surface of the dielectric layer 209 to a thickness of 25 µm. As a dielectric layer 207, a layer of $TiO_2$ having a thickness of 20 nm was formed on the guide-groove forming surface of the intermediate layer 208. As a reflective layer 206, a layer of Ag—Cu alloy having a thickness of 10 nm was formed. As a dielectric layer 205, a layer of $(ZrO_2)_{50}(In_2O_3)_{50}$ (mol %) having a thickness of 12 nm was formed. The first recording layer 204 was formed to an overall thickness of 6 nm. Constitution of the first recording layer 204 was as described previously. Then, as an interface layer 203, a layer of $(ZrO_2)_{25}(SiO_2)_{25}(Cr_2O_3)_{50}$ (mol %) having a thickness of 5 nm was formed on the first recording layer 204, and, as a dielectric (mol %) having a thickness of 40 nm was formed, thereby forming a first information layer 240.

Now the conditions of sputtering the layers will be described. The reflective layer 213 was formed under sputtering conditions similar to those for the reflective layer 106 of Example 1. The dielectric layer 212 was formed under sputtering conditions similar to those for the dielectric layer 105 of Example 1.

Now the sputtering conditions for forming the second recording layer 211 of the medium 200-1 will be described. Sputtering operations for forming the first to fifth constituent layers constituting the second recording layer 211 were all carried out by sputtering targets measuring 100 mm in diameter and 6 mm in thickness and using a DC power supply in an Ar gas atmosphere having a pressure of 0.13 Pa, first forming the fifth constituent layer followed by the other layers successively. The sputtering for forming the fifth constituent layer was carried out using a Ge—Te target so that a layer of GeTe having a thickness of 2 nm was formed on the dielectric layer 212. The sputtering for forming fourth constituent layer was carried out using an In—Te target so that a layer of $In_2Te_3$ having a thickness of 1 nm was formed on the fifth constituent layer. The sputtering for forming the third constituent layer was carried out using an Sn—Te target so that a layer of SnTe having a thickness of 2 nm was formed on the fourth constituent layer. The sputtering for forming the second constituent layer was carried out using a Ge—Te target so that a layer of GeTe having a thickness of 1.5 nm was formed on the third constituent layer. The sputtering for forming the first constituent layer was carried out using a Bi—Te target so that a layer of $Bi_2Te_3$ having a thickness of 1.5 nm was formed on the second constituent layer.

The constituent layers of the second recording layer 211 of the medium 200-2 were formed by employing the same power, atmosphere and target size as those employed when forming the second recording layer 211 of the medium 200-1. The sputtering for forming the fifth constituent layer was carried out using a Ge—Sb target so that a layer of $Ge_{20}Sb_{80}$ having a thickness of 1.6 nm was formed on the dielectric layer 212. The sputtering for forming the fourth constituent layer was carried out using an Sb target so that a layer of Sb having a thickness of 1.6 nm was formed on the fifth constituent layer. The sputtering for forming the third constituent layer was carried out using an In—Sb target so that a layer of $In_{20}Sb_{80}$ having a thickness of 1.6 nm was formed on the fourth constituent layer. The sputtering for forming the second constituent layer was carried out using a Sb target so that a layer of Sb having a thickness of 1.6 nm was formed on the third constituent layer. The sputtering for forming the first constituent layer was carried out using a Ge—Sb target so that a layer of $Ge_{20}Sb_{80}$ having a thickness of 1.6 nm was formed on the second constituent layer.

The second recording layer 211 of the medium 200-A was formed by using a Ge—In—Sn—Bi—Te target so as to form a layer of $(GeTe)_{44}(In_2Te_3)_{13}(SnTe)_{25}(Bi_2Te_3)_{18}$ (mol %) having a thickness of 8 nm on the dielectric layer 212. The second recording layer 211 of the medium 200-B was formed by using an In—Ge—Sb target so as to form a layer of $In_4Ge_8Sb_{88}$ (atomic %) having a thickness of 8 nm on the dielectric layer 212. The second recording layers 211 of both media were formed by sputtering targets measuring 100 mm in diameter and 6 mm in thickness and using a DC power supply with a power of 100 W in an Ar gas atmosphere having a pressure of 0.13 Pa.

Then the interface layer 210 was formed by sputtering under conditions similar to those for the interface layer 103 of Example 1. Next, the dielectric layer 209 was formed by sputtering under conditions similar to those for the dielectric layer 102 of Example 1.

After forming the reflective layer 213, the dielectric layer 212, the second recording layer 211, the interface layer 210 and the dielectric layer 209 successively on the substrate 214, the substrate 214 was taken out of the sputtering apparatus.

Then the intermediate layer 208 was formed in the following procedure. First, the dielectric layer 209 was coated with an ultraviolet-cured resin by a spin coating method. Then a polycarbonate substrate having concavities and convexities (20 nm in depth, 0.32 μm apart between the grooves) of configuration complementary to the guide grooves to be formed on the intermediate layer was placed with the surface where the ridges were formed in contact with the ultraviolet-curing resin. After the resin was hardened by being irradiated with ultraviolet in this state, the polycarbonate substrate having concavities and convexities was removed. Thus the guide grooves similar to those of the substrate 214 were formed on the surface of the intermediate layer 208.

The substrate 214 having the intermediate layer 208 formed thereon was put into the sputtering apparatus again, and the first information layer 240 was formed on the intermediate layer 208. The dielectric layer 207 was firstly formed on the intermediate layer 208. The dielectric layer 207 was formed by sputtering a $TiO_2$ target measuring 100 mm in diameter and 6 mm in thickness using a RF power supply with a power of 400 W at a pressure of 0.13 Pa in a mixed atmosphere wherein an $O_2$ gas of 3% was mixed with an Ar gas. Then the reflective layer 206 was formed under conditions similar to those for forming the reflective layer 203, and the dielectric layer 205 was formed under conditions similar to those for forming the dielectric layer 212.

Now the sputtering conditions for forming the first recording layer 204 of the medium 200-1 will be described. Sputtering operations for forming the first through the fifth constituent layers constituting the first recording layer were all carried out by sputtering targets measuring 100 mm in diameter and 6 mm in thickness by using a DC power supply with a power of 50 W in Ar gas atmosphere having a pressure of 0.13 Pa. The sputtering for forming the fifth constituent layer was carried out using a Ge—Te target, so that a layer of GeTe having a thickness of 1 nm was formed on the dielectric layer 205 by sputtering. The sputtering for forming the fourth constituent layer was carried out using a Bi—Te target, so that a layer of $Bi_2Te_3$ having a thickness of 1 nm was formed on the fifth constituent layer by sputtering. The sputtering for forming the third constituent layer was carried out using an Sn—Te target, so that a layer of SnTe having a thickness of 2 nm was formed on the fourth constituent layer by sputtering. The sputtering for forming the second constituent layer was carried out using a Ge—Te target, so that a layer of GeTe having a thickness of 1 nm was formed on the third constituent layer by sputtering. The sputtering for forming the first constituent layer was carried out using a Bi—Te target, so that a layer of $Bi_2Te_3$ having a thickness of 1 nm was formed on the second constituent layer by sputtering.

The constituent layer constituting the first recording layer 204 of the medium 200-2 was formed by employing the same power, atmosphere and target size as those employed when forming the first recording layer 204 of the medium 200-1. The sputtering for forming the fifth constituent layer was carried out using a Ge—Sb target, so that a layer of $Ge_{15}SiO_{85}$ having a thickness of 1.2 nm was formed on the dielectric layer 205 by sputtering. The sputtering for forming the fourth constituent layer was carried out using a Sb target, so that a layer of Sb having a thickness of 1.2 nm was formed on the fifth constituent layer by sputtering. The sputtering for forming the third constituent layer was carried out using an In—Sb target, so that a layer of $In_{15}SiO_{85}$ having a thickness of 1.2 nm was formed on the fourth constituent layer by sputtering. The sputtering for forming the second constituent layer was carried out using an Sb target, so that a layer of Sb having a thickness of 1.2 nm was formed on the third constituent layer by sputtering. The sputtering for forming the first constituent layer was carried out using a Ge—Sb target, so that a layer of $Ge_{15}Sb_{85}$ having a thickness of 1.2 nm was formed on the second constituent layer by sputtering.

The first recording layer 204 of the medium 200-A was formed by using a Ge—Sn—Bi—Te target so as to form a layer of $(GeTe)_{34}(SnTe)_{33}(Bi_2Te_3)_{33}$ (mol %) having a thickness of 6 nm on the dielectric layer 205. The first recording layer 204 of the medium 200-B was formed by using an In—Ge—Sb target so as to form a layer of $In_3Ge_6Sb_{91}$ (atomic %) having a thickness of 6 nm on the dielectric layer 205. The first recording layers 204 of both media were formed by sputtering targets measuring 100 mm in diameter and 6 mm in thickness by means of a DC power supply with a power of 50 W in an Ar gas atmosphere having a pressure of 0.13 Pa.

Then the interface layer 203 was formed by sputtering under conditions similar to those for the interface layer 210. The dielectric layer 202 was formed by sputtering under conditions similar to those for the dielectric layer 209.

After forming the dielectric layer 207, the reflective layer 206, the dielectric layer 205, the first recording layer 204, the interface layer 203 and the dielectric layer 202 successively on the intermediate layer 208 as described above, the substrate 214 was taken out of the sputtering apparatus.

Then the dielectric layer 202 was coated with an ultraviolet-curing resin to a thickness of 75 μm by a spin coating method. The resin was hardened by being irradiated with ultraviolet, thereby forming a cover layer 201.

After completing the process of forming the cover layer, the medium was initialized. In the initialization process, the second recording layer 211 was firstly crystallized, and then the first recording layer 204 was crystallized by using a semiconductor laser having a wavelength of 810 nm. The material in these recording layers was crystallized over substantially the entire annular region ranging from a radius of 22 mm to a radius of 60 mm. Thereby the initialization process was finished and the fabrication of the media 200-1 and 200-2 was completed.

In the media 200-1, both the first information layer 240 and the second information layer 250 showed mirror-surface reflectance of about 6% in terms of Rc and about 1% in terms of Ra. The first information layer 240 showed light transmittance of about 51% in terms of Tc and about 52% in terms of Ta. In the media 200-2, both the first information layer 240 and the second information layer 250 showed mirror-surface reflectance of about 6% in terms of Rc and about 1% in terms of Ra. The first information layer 240 showed light transmittance of about 51% in terms of Tc and about 45% in terms of Ta. Reflectance of the second information layer 250 was determined using the laser beam which passed through the first information layer 240 for both media.

Evaluation of recording and reproduction was conducted in this Example by a method similar to that employed in Example 4, except for recording signals on the first information layer 240 and the second information layer 250 at 5-fold speed and 12-fold speed, and evaluating the reproduction of the recorded signals by applying a laser beam of 0.7 mW at the base speed. Evaluation of reliability was also conducted by a method similar to that employed in Example 4. Results of evaluating (1) 2TCNR, (2) 2 T erase ratio, (3) change in CNR and (4) change in erase ratio of the media 200-1 and 200-2 and media 200-A and 200-B at 5-fold speed (5×) and 12-fold speed (12×) are shown in Table 5. Symbols shown in the table have the same meanings as in Example 1.

TABLE 5

| Medium No. | Recording Layer | Recording layer m-th constituent layer | Composition | Thickness (nm) | 2TCNR 5x | 2TCNR 12x | 2T Erase Ratio 5x | 2T Erase Ratio 12x | CNR Change 5x | CNR Change 12x | Erase Ratio Change 5x | Erase Ratio Change 12x |
|---|---|---|---|---|---|---|---|---|---|---|---|---|
| 200-1 | Second | Fifth | GeTe | 2 | ○ | ○ | ○ | ○ | ○ | ○ | ○ | ○ |
| | | Fourth | $In_2Te_3$ | 1 | | | | | | | | |
| | | Third | SnTe | 2 | | | | | | | | |
| | | Second | GeTe | 1.5 | | | | | | | | |
| | | First | $Bi_2Te_3$ | 1.5 | | | | | | | | |
| | First | Fifth | GeTe | 1 | ○ | ○ | ○ | ○ | ○ | ○ | ○ | ○ |
| | | Fourth | $Bi_2Te_3$ | 1 | | | | | | | | |
| | | Third | SnTe | 2 | | | | | | | | |
| | | Second | GeTe | 1 | | | | | | | | |
| | | First | $Bi_2Te_3$ | 1 | | | | | | | | |
| 200-A | Second | | $(GeTe)_{44}(In_2Te_3)_{13}(SnTe)_{25}(Bi_2Te_3)_{18}$ | 8 | x | Δ | ○ | ○ | x | x | ○ | ○ |
| | First | | $(GeTe)_{34}(SnTe)_{33}(Bi_2Te_3)_{33}$ | 6 | x | Δ | ○ | ○ | x | x | ○ | ○ |
| 200-2 | Second | Fifth | $Ge_{20}Sb_{80}$ | 1.6 | ○ | ○ | ○ | ○ | ○ | ○ | ○ | ○ |
| | | Fourth | Sb | 1.6 | | | | | | | | |
| | | Third | $In_{20}Sb_{80}$ | 1.6 | | | | | | | | |
| | | Second | Sb | 1.6 | | | | | | | | |
| | | First | $Ge_{20}Sb_{80}$ | 1.6 | | | | | | | | |
| | First | Fifth | $Ge_{15}Sb_{85}$ | 1.2 | ○ | ○ | ○ | ○ | ○ | ○ | ○ | ○ |
| | | Fourth | Sb | 1.2 | | | | | | | | |
| | | Third | $In_{15}Sb_{85}$ | 1.2 | | | | | | | | |
| | | Second | Sb | 1.2 | | | | | | | | |
| | | First | $Ge_{15}Sb_{85}$ | 1.2 | | | | | | | | |
| 200-B | Second | | $In_4Ge_8Sb_{88}$ | 8 | x | Δ | ○ | ○ | x | x | ○ | ○ |
| | First | | $In_3Ge_6Sb_{91}$ | 6 | x | Δ | ○ | ○ | x | x | ○ | ○ |

As shown in Table 5, the media 200-1 and 200-2 having the recording layer composed of a plurality of constituent layers were evaluated with rating of "○" for all the evaluation items, and proved the possibility of recording by CAV system in a range from 5-fold speed to 12-fold speed.

The media 200-A fabricated for the purpose of comparison, in contrast, was evaluated as "x" for 2TCNR and change in CNR of the recording layer 211 (the second information layer 250). Satisfactory erase ratio was achieved at 12-fold speed due to the high crystallization speed since the composition included SnTe and $Bi_2Te_3$. However, it was difficult to form the record marks, and even the initial performance was unsatisfactory. In the second recording layer 211 of the medium 200-A, despite the composition including $In_2Te_3$, marks that had been recorded thereon almost disappeared due to crystallization when archival characteristic was evaluated.

The media 200-A was also evaluated as "x" for 2TCNR and change in CNR of the first recording layer 204 (the first information layer 240). Although satisfactory erase ratio was achieved at 12-fold speed due to the high crystallization speed since the composition included SnTe and $Bi_2Te_3$. However, it was difficult to form the record marks, and even the initial performance was unsatisfactory. When the archival characteristic of the first information layer 240 of the medium 200-A was evaluated, marks that had been recorded thereon almost disappeared due to crystallization. The media 200-A showed the impossibility of using both information layers at any linear velocity in the range from 5-fold speed to 12-fold speed. This applies to the medium 200-B that was fabricated for the purpose comparison.

As will be apparent from the results of evaluating the media 200-A and B, making a medium that can be used at a higher linear velocity requires an increase in the crystallization speed of the recording layer, which makes it difficult to ensure archival characteristic at a low linear velocity. Also a crystallization speed that enables it to ensure archival characteristic makes the erase ratio at high linear velocities insufficient. These problems can be solved by distributing a phase transition material having a high crystallization speed into a plurality of constituent components so as to form a recording layer of a multilayer as in the case of the media 200-1 and 200-2. The two information layers of the media 200-1 and 200-2 showed excellent performance in all of the initial performance, change in CNR and change in erase ratio.

It is supposed that performance of the two information layers of the media 200-1 and 200-2 was improved also by the periodic structure thereof. That is, in the medium 200-1, the second constituent layer and the fifth constituent layer of the second recording layer had the same elemental composition, and the first constituent layer and the fourth constituent layer of the first recording layer had the same elemental composition. In the medium 200-2, the first constituent layer and the fifth constituent layer of the two recording layers had the same elemental composition, and the second constituent layer and the fourth constituent layer had the same elemental composition, in a symmetrical constitution with respect to the third constituent layer. In this example, an information recording medium of a 2-layer structure that could be used at a higher linear velocity and over a wide range of linear velocities was realized.

This example also showed that the effect of dividing the recording layer into a plurality of components in a multilayer structure could be achieved with respect to either the recording layer having a compound-based composition including GeTe or the recording layer of eutectic composition including Sb. In this example, it was also verified that elements other than the above could be used individually to form the constituent layer.

Example 6

In Example 6, an information recording medium for DVD-RAMs was fabricated and tested. The information recording medium 300 of FIG. 3 was fabricated, and evaluation of recording and reproduction and evaluation of reliability at 6-fold speed and 16-fold speed were performed. In this example, recording layer 304 was formed by a first constituent layer and a second constituent layer (M=2), and as shown in FIG. 6, 11 types of information recording media 300-1 to 300-11 wherein the compositions differed from each other for said first constituent layer and/or said second constituent layer were prepared, and then 6 types of information recording media 300-A to 300-F were prepared for comparison. The specifics of the composition and production method of each medium are explained below.

First, a production method for an information recording medium 300 is explained. For substrate 301, a polycarbonate substrate (120 mm diameter, 0.6 mm thickness) on which a guide groove (50 nm depth, 0.615 μm group-land distance) was formed was prepared and attached inside a sputtering apparatus. On a surface of substrate 301 where the guide groove was formed, a layer of 140 nm thickness composed of $(ZnS)_{80}(SiO_2)_{20}$ (mol %) as a dielectric layer 302, a layer of 5 nm thickness composed of $(ZrO_2)_{25}(SiO_2)_{25}(Cr_2O_3)_{50}$ (mol %) as an interface layer 303, and a layer of 8 nm thickness as a recording layer 304 were formed. For the composition of a recording layer 304, a two-layer composition including the first constituent layer and the second constituent layer was employed. The details are explained later.

Next, on said recording layer 304, a layer of 5 nm thickness composed of $(ZrO_2)_{25}(SiO_2)_{25}(Cr_2O_3)_{50}$ (mol %) as an interface layer 305, a layer of 35 nm thickness composed of (mol %) as a dielectric layer 306, a layer of 30 nm thickness composed of $Si_2Cr$ as an optical compensation layer 307, and a layer of 120 nm thickness composed of an Ag—Cu alloy as a reflective layer 308 were successively formed.

The sputtering conditions for each layer are explained. The dielectric layer 302 and the dielectric layer 306 were formed under the same conditions as the sputtering conditions for the dielectric layer 102 of Example 1. The interface layer 303 and the interface layer 305 were formed under the same conditions as the sputtering conditions for the interface layer 103 of Example 1.

Next, the sputtering conditions for the recording layer 304 of media 300-1 to 11 are explained. Regarding all of said media, the first and second constituent layers that comprised the recording layer were formed by sputtering a target of 100 mm diameter and 6 mm thickness in an Ar-gas atmosphere at 0.13 Pa pressure, with the use of a DC power supply.

The sputtering of the first constituent layer of the recording layer 304 of the medium 300-1 was conducted using a Ge—Te target so that a layer of GeTe having a 2 nm thick was formed on the interface layer 303. Next, as a second constituent layer, a layer of $(GeTe)_{86}(Bi_2Te_3)_{12}(Ga_2Te_3)_2$ (mol %) having a 6 nm thickness was formed on the first constituent layer by sputtering using a Ge—Bi—Ga—Te target. As the recording layer 304 of the medium 300-A for comparison, a layer of $(GeTe)_{89.5}(Bi_2Te_3)_9(Ga_2Te_3)_{1.5}$ (mol %) having a 8 nm thickness was formed on the interface layer 303 by sputtering using a Ge—Bi—Ga—Te target.

The sputtering of the first constituent layer of the recording layer of the medium 300-2 was performed using a Ge—Te target such that a layer of GeTe having a 2 nm thickness was formed on the interface layer 303. Next, a layer of $(GeTe)_{86}(Bi_2Te_3)_{12}(In_2Te_3)_2$ (mol %) having a 6 nm thickness was formed as the second constituent layer on the first constituent layer by sputtering using a Ge—Bi—In—Te target. As the recording layer 304 of the medium 300-B for comparison, a layer of $(GeTe)_{89.5}(Bi_2Te_3)_9(In_2Te_3)_{1.5}$ (mol %) having a 8 nm thickness was formed on the interface layer 303 by sputtering using a Ge—Bi—In—Te target.

The sputtering of the first constituent layer of the recording layer 304 of the medium 300-3 was performed using a Ge—Te target such that a layer of GeTe having a 2 nm thickness was formed on the interface layer 303. Next, a layer of $(GeTe)_{86}(Bi_2Te_3)_{12}(Sb_2Te_3)_2$ (mol %) having a 6 nm thickness was formed as the second constituent layer on the first constituent layer by sputtering using a Ge—Bi—Sb—Te target. In the medium 300-C for comparison, a layer of $(GeTe)_{89.5}(Bi_2Te_3)_9(Sb_2Te_3)_{1.5}$ (mol %) having 8 nm thickness was formed on the interface layer 303 by sputtering using a Ge—Bi—Sb—Te target.

The sputtering of the first constituent layer of the recording layer 304 of the medium 300-4 was performed using a Ge—Te target whereby a layer of GeTe having a 2 nm thickness was formed on the interface layer 303. Next, a layer of $(GeTe)_{86}(Bi_2Te_3)_{12}(Al_2Te_3)_2$ (mol %) having a 6 nm thickness was formed as the second constituent layer on the first constituent layer by sputtering using a Ge—Bi—Al—Te target. In the medium 300-D for comparison, a layer of $(GeTe)_{89.5}(Bi_2Te_3)_9(Al_2Te_3)_{1.5}$ (mol %) having a 8 nm thickness was formed on the interface layer 303 by sputtering using a Ge—Bi—Al—Te target.

The sputtering of the first constituent layer of the recording layer 304 of the medium 300-5 was performed using a Sb—Te target such that a layer of $Sb_{70}Te_{30}$ (atomic %) having a 2 nm thickness was formed on the interface layer 303. Next, a layer of $(GeTe)_{86}(Bi_2Te_3)_{12}(In_2Te_3)_2$ (mol %) having a 6 nm thickness was formed as the second constituent layer on the first constituent layer by sputtering using a Ge—Bi—In—Te target. In the medium 300-E for comparison, a layer of $[(GeTe)_{86}(Bi_2Te_3)_{12}(Al_2Te_3)_2]_{75}(Sb_{70}Te_{30})_{25}$ (mol %) having a 8 nm thickness was formed on the interface layer 303 by sputtering using a Ge—Bi—Al—Sb—Te target.

The sputtering of the first constituent layer of the recording layer 304 of the medium 300-6 was performed using an Al—Sb target such that a layer of $Al_{30}Sb_{70}$ (atomic %) having a 2 nm thickness was formed on the interface layer 303. Next, a layer of $(GeTe)_{86}(Bi_2Te_3)_{12}(In_2Te_3)_2$ (mol %) having a 6 nm thickness was formed as the second constituent layer on the first constituent layer by sputtering using a Ge—Bi—In—Te target.

The sputtering of the first constituent layer of the recording layer 304 of the medium 300-7 was performed using an In—Sb target whereby a layer of $In_{30}Sb_{70}$ (atomic %) having a 2 nm thickness was formed on the interface layer 303. Next, a layer of $(GeTe)_{86}(Bi_2Te_3)_{12}(In_2Te_3)_2$ (mol %) having a 6 nm thickness was formed as a second constituent layer on the first constituent layer by sputtering using a Ge—Bi—In—Te target.

The sputtering of the first constituent layer of the recording layer 304 of the medium 300-8 was performed using a Ga—Sb target such that a layer of $Ga_{30}Sb_{70}$ (atomic %) having a 2 nm thickness was formed on the interface layer 303. Next, a layer of $(GeTe)_{86}(Bi_2Te_3)_{12}(In_2Te_3)_2$ (mol %) having a 6 nm thickness was formed as the second constituent layer on the first constituent layer by sputtering using a Ge—Bi—In—Te target.

The sputtering of the first constituent layer of the recording layer 304 of the medium 300-9 was performed using a Ge—Sb target such that a layer of $Ge_{30}Sb_{70}$ (atomic %) having a 2 nm thickness was formed on the interface layer 303. Next, a layer of $(GeTe)_{86}(Bi_2Te_3)_{12}(In_2Te_3)_2$ (mol %) having a 6 nm thickness was formed as the second constituent layer on the first constituent layer by sputtering using a Ge—Bi—In—Te target.

The sputtering of the first constituent layer of the recording layer 304 of the medium 300-10 was performed using an In—Sb target such that a layer of $In_{30}Sb_{70}$ (atomic %) having a 2 nm thickness was formed on the interface layer 303. Next, a layer of $Ge_{15}SiO_{85}$ (atomic %) having 6 nm thickness was formed as the second constituent layer on the first constituent layer by sputtering using a Ge—Sb target.

As the recording layer 304 of the medium 300-F for comparison, a layer of $(Ge_{15}Sb_{85})_{75}(In_{30}Sb_{70})_{25}$ (mol %) having a 8 nm thickness was formed on the interface layer 303 by sputtering using a Ge—Sb—In target.

The sputtering of the first constituent layer of the recording layer 304 of the medium 300-11 was performed using a Ga—Sb target whereby a layer of $Ga_{30}Sb_{70}$ (atomic %) having a 2 nm thickness was formed on the interface layer 303. Next, a layer of $Ge_{15}SiO_{85}$ (atomic %) having a 6 nm thickness was formed as the second constituent layer on the first constituent layer by sputtering using a Ge—Sb target.

The $Si_2Cr$ layer as the optical compensation layer 307 was formed by sputtering a Si—Cr target having a 100 mm diameter and a 6 mm thickness with a power of 300 W using a RF power supply in an Ar-gas atmosphere at 0.27 Pa pressure. The reflective layer 308 was formed by sputtering an Ag—Cu alloy target having a 100 mm diameter and a 6 mm thickness, with a power of 200 W using a DC power supply in an Ar-gas atmosphere at 0.4 Pa pressure.

By the above methods, the dielectric layer 302, the interface layer 303, the recording layer 304, the interface layer 305, the dielectric layer 306, the optical compensation layer 307 and the reflective layer 308 were successively formed on the substrate 301, after which said substrate 301 was taken out of the sputtering apparatus. Next, an ultraviolet-curing resin was applied on the reflective layer 308, and a disc-shaped polycarbonate substrate having a 120 mm diameter and a 0.6 mm thickness as a dummy substrate 310 was attached to the applied ultraviolet-curing resin. Furthermore, ultra-violet light was applied from a side of the dummy substrate 310 to harden the resin. By this action, an adhesive layer 309 with a thickness of 30 μm and comprising a hardened resin was formed, and simultaneously the dummy substrate 310 was bonded to the substrate 301 through the adhesive layer 309.

After bonding the dummy substrate 310, an initialization process was performed. For said initialization process, a semiconductor laser with a wavelength of 810 nm was used, and nearly the entire surface of the recording layer 304 of the information recording medium 300 was crystallized within an annular region of 22 to 60 mm radius. By these actions, said initialization process was completed, and the fabrication of media 300-1 to 11 and 300-A to F was completed. All fabricated media 300-1 to 11 and 300-A to F showed mirror-surface reflectance of about 16% in terms of Rc and about 2% in terms of Ra.

Next, the evaluation method of recording and reproducing is explained. Information was recorded on the information recording medium 300 by using a recording-reproducing apparatus of general construction equipped with a spindle motor to rotate said information recording medium 300, an optical head equipped with a semiconductor laser that produced a laser beam 320, and an objective lens that focused the laser beam 320 on the recording layer 304 of the information recording medium 300. For evaluation of the information recording medium 300, a semiconductor laser with a wavelength of 660 nm and objective lens with a numerical aperture of 0.65 was used, and data corresponding to a 4.7 GB was recorded. The rotation frequencies of the information recording medium 300 were in a range of from 10000 rpm to 11000 rpm. By this, information was recorded at linear velocities of approximately 25 m/second corresponding to 6-fold speed on the innermost circumference of the disc and approximately 65 m/second corresponding to 16-fold speed on the outermost circumference. A reproduction evaluation of the recorded signal was performed at approximately 8 m/second corresponding to 2-fold speed by applying a laser beam of 1 mW. Regarding the reproduction evaluation conditions, a linear velocity higher than 2-fold speed may be used and a reproducing power higher than 1 mW may be used.

Said evaluation of recording and reproducing was performed based on jitter (the index that statistically evaluated how the formed record mark of a specified length was shifted from a specified position). In order to establish a condition for determining the jitter value, a peak power (Pp) and a bias power (Pb) were determined according to the following procedure. The information recording medium 300 was irradiated with the laser beam 320 while modulating its power between a high power level and a low power level to record random signals having mark lengths within 0.42 μm (3 T) to 1.96 μm (14 T) ten times on the same groove surface of the recording layer 304 by groove recording. For this recording, a laser beam of non-multiple pulse was applied.

After recording, a jitter value between front ends and a jitter value between rear ends were measured with a time interval analyzer and a jitter-average value was calculated as the mean values of these jitters. Such jitter-average value was measured on each recording condition with the bias power being fixed while the peak power was varied. A power that was 1.25 times as large as a peak power at which the jitter-average value for the random signal became 13% was determined as Pp1 temporarily. Next, a jitter-average value was measured under each recording condition with the peak power being fixed at Pp1 while the bias power was varied. The mean value of upper and lower limits of bias powers at which the jitter-average value for the random signal became 13% or less was determined as Pb. Then, the jitter-average value was measured on each recording condition with the bias power being fixed at Pb while the peak power was varied. A power that was 1.25 times as large as a peak power at which the jitter-average value for the random signal became 13% was determined as Pp. Pp and Pb were determined at 16-fold speed and 6-fold speed.

In this way, when recording was performed at the set conditions of Pp and Pb, for example for 10 repetitions of repeated recording, average jitter values of 8 to 9% were achieved for 16-fold speed recordings and 6-fold speed recordings. Considering the upper limit of laser power of the system, it is preferable to satisfy Pp≦30 mW and Pb≦13 mW even for 16-fold speed.

Next, the reliability evaluation is explained. The reliability evaluation was performed to investigate whether the recorded signal was preserved when the recorded signal was exposed to conditions of high temperature and high humidity, and whether overwriting was possible even after exposure to conditions of high temperature and high humidity. Said evaluation was performed using the recording-reproducing apparatus as described above. Beforehand, random signals were multiple-track recorded at the foregoing Pp and Pb powers on the groove surface under conditions of 16-fold speed and 6-fold speed on 17 types of information recording media 300 as described above ((1) jitter value). These media were left in a temperature-controlled chamber at a temperature of 80° C. and a relative humidity of 80% for 100 hours and then were taken out. After taking out, the recorded signal was reproduced and the jitter value ja (%) was measured ((2) archival characteristic). Furthermore, the signal that had been recorded was over-written one time at Pp and Pb, and the jitter value jo (%) was measured ((3) archival overwrite characteristic). The jitter value before being kept in the temperature-controlled chamber and the jitter value after being kept were compared, and the reliability was evaluated. As Δja ((2) ja change) and Δjo ((3) jo change) are larger wherein Δja=(ja−j) (%) and Δjo=(jo−j) (%), reliability is lower. There is a tendency for the values of Δja to increase for signals recorded at a lower-fold speed, and there is a tendency for values of Δjo to increase for signals recorded at a higher-fold speed. To the extent that both Δja and Δjo are simultaneously small, an information recording medium can be used more favorably over a wide range of linear velocities.

Regarding the 17 types of information recording media, the evaluation results of (1) jitter value, (2) ja change, and (3) jo change at 16-fold speed (16×) and 6-fold speed (6×) are shown in Table 6. In the tables, the meanings of each of the symbols are as follows.
(1) Jitter value
○: 8% or less
Δ: greater than 8% and 10% or less
x: greater than 10%
(2) Archival characteristic and archival overwrite characteristic
○: 2% or less
Δ: greater than 2% and 5% or less
x: greater than 5%
For all of the evaluations, "x" evaluation indicates that it is difficult to use the medium at that linear velocity, and "○" and "Δ" evaluations means "usable at the linear velocity." "○" is more preferable.

difficult to form, and even a 6-fold-speed jitter as the initial characteristic was insufficient. Furthermore, for such media, upon evaluation of archival characteristics, nearly all of the marks recorded beforehand had been erased (crystallized). Regarding media with evaluations of "x" for jo change, a 16-fold-speed jitter as the initial characteristic was insufficient because the crystallization speed was insufficient. Therefore, for both of 6-fold speed and 16-fold speed, the increase in the jitter value was large.

As is clear from the evaluation results of the media 300-A to 300-F, in order to adapt the media more successfully to high linear velocities, it is necessary to increase the crystallization speed, and said increase thereby creates difficulty securing the archival characteristic at low linear velocities. Conversely, when securement of the archival characteristic at low linear velocities is pursued, the crystallization speed is thereby insufficient. These problems can be solved by forming the first constituent layer with materials of high crystallization temperatures (200° C. or more) and by forming the second constituent layer with materials of high crystallization speeds as in the media 300-1 to 11. In other words, rather than mixing two materials having differing properties, by using as a lamination, both of the archival characteristic at low linear velocities and the archival overwrite characteristic at high linear velocities were able to be satisfactory.

TABLE 6

| Medium No. | Recording layer | | Thickness (nm) | Jitter | | Ja Change | | jo Change | |
| | m-th constituent layer | Composition | | 6x | 16x | 6x | 16x | 6x | 16x |
|---|---|---|---|---|---|---|---|---|---|
| 300-1 | Second | $(GeTe)_{86}(Bi_2Te_3)_{12}(Ga_2Te_3)_2$ | 6 | ○ | ○ | ○ | ○ | ○ | ○ |
| | First | GeTe | 2 | | | | | | |
| 300-A | | $(GeTe)_{89.5}(Bi_2Te_3)_9(Ga_2Te_3)_{1.5}$ | 8 | Δ | ○ | x | x | ○ | ○ |
| 300-2 | Second | $(GeTe)_{86}(Bi_2Te_3)_{12}(In_2Te_3)_2$ | 6 | ○ | ○ | ○ | ○ | ○ | ○ |
| | First | GeTe | 2 | | | | | | |
| 300-B | | $(GeTe)_{89.5}(Bi_2Te_3)_9(In_2Te_3)_{1.5}$ | 8 | Δ | ○ | x | x | ○ | ○ |
| 300-3 | Second | $(GeTe)_{86}(Bi_2Te_3)_{12}(Sb_2Te_3)_2$ | 6 | ○ | ○ | ○ | ○ | ○ | ○ |
| | First | GeTe | 2 | | | | | | |
| 300-C | | $(GeTe)_{89.5}(Bi_2Te_3)_9(Sb_2Te_3)_{1.5}$ | 8 | Δ | ○ | x | x | ○ | ○ |
| 300-4 | Second | $(GeTe)_{86}(Bi_2Te_3)_{12}(Al_2Te_3)_2$ | 6 | ○ | ○ | ○ | ○ | ○ | ○ |
| | First | GeTe | 2 | | | | | | |
| 300-D | | $(GeTe)_{89.5}(Bi_2Te_3)_9(Al_2Te_3)_{1.5}$ | 8 | Δ | ○ | x | x | ○ | ○ |
| 300-5 | Second | $(GeTe)_{86}(Bi_2Te_3)_{12}(In_2Te_3)_2$ | 6 | ○ | ○ | ○ | ○ | ○ | ○ |
| | First | $Sb_{70}Te_{30}$ | 2 | | | | | | |
| 300-E | | $[(GeTe)_{86}(Bi_2Te_3)_{12}(Al_2Te_3)_2]_{75}(Sb_{70}Te_{30})_{25}$ | 8 | ○ | Δ | ○ | ○ | x | x |
| 300-6 | Second | $(GeTe)_{86}(Bi_2Te_3)_{12}(In_2Te_3)_2$ | 6 | ○ | ○ | ○ | ○ | ○ | ○ |
| | First | $Al_{30}Sb_{70}$ | 2 | | | | | | |
| 300-7 | Second | $(GeTe)_{86}(Bi_2Te_3)_{12}(In_2Te_3)_2$ | 6 | ○ | ○ | ○ | ○ | ○ | ○ |
| | First | $In_{30}Sb_{70}$ | 2 | | | | | | |
| 300-8 | Second | $(GeTe)_{86}(Bi_2Te_3)_{12}(In_2Te_3)_2$ | 6 | ○ | ○ | ○ | ○ | ○ | ○ |
| | First | $Ga_{30}Sb_{70}$ | 2 | | | | | | |
| 300-9 | Second | $(GeTe)_{86}(Bi_2Te_3)_{12}(In_2Te_3)_2$ | 6 | ○ | ○ | ○ | ○ | ○ | ○ |
| | First | $Ge_{30}Sb_{70}$ | 2 | | | | | | |
| 300-10 | Second | $Ge_{15}Sb_{85}$ | 6 | ○ | ○ | ○ | ○ | ○ | ○ |
| | First | $In_{30}Sb_{70}$ | 2 | | | | | | |
| 300-F | | $(Ge_{15}Sb_{85})_{75}(In_{30}Sb_{70})_{25}$ | 8 | Δ | ○ | x | x | ○ | ○ |
| 300-11 | Second | $Ge_{15}Sb_{85}$ | 6 | ○ | ○ | ○ | ○ | ○ | ○ |
| | First | $Ga_{30}Sb_{70}$ | 2 | | | | | | |

As shown in Table 6, the media 300-1 to 11 whose recording layers were comprising a plurality of constituent layers achieved "○" evaluations for all of the items, and was therefore usable at CAV of from 6-fold speed to 16-fold speed. In contrast, the media 300-A to 300-F were evaluated as "x" for ja change or jo change. For the media for which ja change was evaluated "x", the crystallization speeds of the recording layers were sufficiently high, and erase ratio were favorable at a 16-fold speed, but for this reason, the record marks were Example 7

In Example 7, the same information recording medium as that of Example 6 was fabricated according to DVD-RAM specifications and tested. In this Example, media 300-12 to 14 and media 300-G to I for comparison were prepared. The elements of these media other than the recording layer 304 were formed using materials, thickness and production methods similar to those of Example 6. The media 300-12 to 14 were different from the media of Example 6 in that the recording layer 304 was constituted of 7 constituent layers (M=7) and at least one constituent layer contained at least one element selected from rare-earth metals X and at least one element selected from Ge, Sb, Bi and Te (group α).

In the following, composition and formation conditions of the recording layer 304 of each media are specifically explained. Regarding all of the media, each constituent layer and single recording layer were formed by sputtering using a target of a 100 mm diameter and a 6 mm thickness and a DC power supply in an Ar gas atmosphere at a pressure of 0.13 Pa.

A first constituent layer of medium 300-12 was formed on the interface layer 303 by sputtering a Gd—Sb target, and the layer was of GdSb and had a thickness of 0.5 nm. Next, a layer of $(GeTe)_{88}(BiTe)_{12}$ (mol %) having a 2 nm thickness was formed as a second constituent layer on the first constituent layer, by sputtering Ge—Bi—Te target. Next, a layer of GdSb having a 0.5 nm thickness was formed as a third constituent layer on the second constituent layer, by sputtering a Gd—Sb target. Next, a layer of $(GeTe)_{88}(BiTe)_{12}$ (mol %) having a 2 nm thickness was formed as a fourth constituent layer on the third constituent layer, by sputtering a Ge—Bi—Te target.

Next, a layer of GdSb having a 0.5 nm thickness was formed as a fifth constituent layer on the fourth constituent layer, by sputtering a Gd—Sb target. Next, a layer of $(GeTe)_{88}(BiTe)_{12}$ (mol %) having a 2 nm thickness was formed as a sixth constituent layer on the fifth constituent layer, by sputtering a Ge—Bi—Te target. Next, a layer of GdSb having a 0.5 nm thickness was formed as a seventh constituent layer on the sixth constituent layer, by sputtering a Gd—Sb target. All from the first constituent layer to the seventh constituent layer were formed by sputtering with a power of 50 W using a DC power supply.

A recording layer 304 of the medium 100-G was formed as a single layer of $(GdSb)_{25}(GeTe)_{66}(BiTe)_9$ (mol %) having a 8 nm thickness on the interface layer 303, by sputtering a target of Gd—Sb—Ge—Bi—Te. The recording layer 304 of single-layer structure was sputtered with a power of 100 W using a DC power supply.

A first constituent layer of the medium 300-13 was formed on the interface layer 303 by sputtering a Dy—Te target, and the layer was of DyTe and had a thickness of 0.5 nm. Next, a layer of $(GeTe)_{88}(SnTe)_{12}$ (mol %) having a 2 nm thickness was formed as a second constituent layer on the first constituent layer, by sputtering a Ge—Sn—Te target. Next, a layer of $(DyTe)_{96}Si_4$ having a 0.5 nm thickness was formed as a third constituent layer on the second constituent layer, by sputtering a Dy—Te—Si target. Next, a layer of $(GeTe)_{88}(SnTe)_{12}$ (mol %) having a 2 nm thickness was formed as a fourth constituent layer on the third constituent layer, by sputtering a Ge—Sn—Te target. Next, a layer of $(DyTe)_{96}Si_4$ having a 0.5 nm thickness as a fifth constituent layer on the fourth constituent layer, by sputtering a Dy—Te—Si target.

Next, a layer of $(GeTe)_{88}(SnTe)_{12}$ (mol %) having a 2 nm thickness was formed as a sixth constituent layer on the fifth constituent layer, by sputtering Ge—Sn—Te target. Next, layer of DyTe having a 0.5 nm thickness was formed as a seventh constituent layer on the sixth constituent layer, by sputtering a Dy—Te target. All from the first constituent layer to the seventh constituent layer were formed by sputtering with a power of 50 W using a DC power supply.

A recording layer 304 of the medium 300-H was formed as a layer of $(DyTe)_{24.5}Si_{0.5}(GeTe)_{66}(SnTe)_9$ (mol %) having a 8 nm thickness on the interface layer 303 by sputtering a Dy—Si—Ge—Sn—Te target. Said recording layer 304 of single-layer structure was sputtered with a power of 100 W using a DC power supply.

A first constituent layer of the medium 300-14 was formed on the interface layer 303 by sputtering a Tb—Bi target, and the layer was of TbBi and had a thickness of 0.5 nm. Next, a layer of $(GeTe)_{88}(BiTe)_{12}$ (mol %) having a 2 nm thickness was formed as a second constituent layer on the first constituent layer, by sputtering a Ge—Bi—Te target. Next, a layer of TbBi having a 0.5 nm thickness was formed as a third constituent layer on the second constituent layer, by sputtering a Tb—Bi target. Next, formed a layer of $(GeTe)_{88}(BiTe)_{12}$ (mol %) having 2 nm thickness was formed as a fourth constituent layer on the third constituent layer, by sputtering a Ge—Bi—Te target.

Next, a layer of TbBi having a 0.5 nm thickness was formed as a fifth constituent layer on the fourth constituent layer, by sputtering a Tb—Bi target. Next, a layer of $(GeTe)_{88}(BiTe)_{12}$ (mol %) having a 2 nm thickness was formed as a sixth constituent layer on the fifth constituent layer, by sputtering a Ge—Bi—Te target. Next, a layer of TbBi having a 0.5 nm thickness was formed as a seventh constituent layer on the sixth constituent layer, by sputtering a Tb—Bi target. All from the first constituent layer to the seventh constituent layer were formed by sputtering with a power of 50 W using a DC power supply.

A recording layer 304 of the medium 300-I was formed as a single layer of $(TbBi)_{25}(GeTe)_{66}(BiTe)_9$ (mol %) having a 8 nm thickness on the interface layer 303 by sputtering a target of Tb—Bi—Ge—Te. The recording layer 304 of single-layer structure was sputtered with a power of 100 W using a DC power supply.

The evaluation results of (1) jitter value, (2) ja change, and (3) jo change at 16-fold speed and 6-fold speed for 6 types of information recording media are shown in Table 7. The meanings of the symbols in the table are as explained in relation to Example 6.

TABLE 7

| | Recording layer | | | Jitter | | ja Change | | jo Change | |
|---|---|---|---|---|---|---|---|---|---|
| Medium No. | m-th constituent layer | Composition | Thickness (nm) | 6x | 16x | 6x | 16x | 6x | 16x |
| 300-12 | Seventh | GdSb | 0.5 | ○ | ○ | ○ | ○ | ○ | ○ |
| | Sixth | $(GeTe)_{88}(BiTe)_{12}$ | 2 | | | | | | |
| | Fifth | GdSb | 0.5 | | | | | | |
| | Fourth | $(GeTe)_{88}(BiTe)_{12}$ | 2 | | | | | | |
| | Third | GdSb | 0.5 | | | | | | |
| | Second | $(GeTe)_{88}(BiTe)_{12}$ | 2 | | | | | | |
| | First | GdSb | 0.5 | | | | | | |
| 300-G | | $(GdSb)_{25}(GeTe)_{66}(BiTe)_9$ | 8 | ○ | ○ | ○ | ○ | Δ | x |
| 300-13 | Seventh | DyTe | 0.5 | ○ | ○ | ○ | ○ | ○ | ○ |
| | Sixth | $(GeTe)_{88}(SnTe)_{12}$ | 2 | | | | | | |

TABLE 7-continued

| Medium No. | Recording layer | | Thickness (nm) | Jitter | | ja Change | | jo Change | |
|---|---|---|---|---|---|---|---|---|---|
| | m-th constituent layer | Composition | | 6x | 16x | 6x | 16x | 6x | 16x |
| | Fifth | $(DyTe)_{96}Si_4$ | 0.5 | | | | | | |
| | Fourth | $(GeTe)_{88}(SnTe)_{12}$ | 2 | | | | | | |
| | Third | $(DyTe)_{96}Si_4$ | 0.5 | | | | | | |
| | Second | $(GeTe)_{88}(SnTe)_{12}$ | 2 | | | | | | |
| | First | DyTe | 0.5 | | | | | | |
| 300-H | $(DyTe)_{24.5}Si_{0.5}(GeTe)_{66}(SnTe)_9$ | | 8 | ○ | ○ | ○ | ○ | Δ | x |
| 300-14 | Seventh | TbBi | 0.5 | ○ | ○ | ○ | ○ | ○ | ○ |
| | Sixth | $(GeTe)_{88}(BiTe)_{12}$ | 2 | | | | | | |
| | Fifth | TbBi | 0.5 | | | | | | |
| | Fourth | $(GeTe)_{88}(BiTe)_{12}$ | 2 | | | | | | |
| | Third | TbBi | 0.5 | | | | | | |
| | Second | $(GeTe)_{88}(BiTe)_{12}$ | 2 | | | | | | |
| | First | TbBi | 0.5 | | | | | | |
| 300-I | $(TbBi)_{25}(GeTe)_{66}(BiTe)_9$ | | 8 | ○ | ○ | ○ | ○ | Δ | x |

As shown in Table 7, the media 300-12 to 14 for which the recording layers comprising a plurality of constituent layers achieved "○" evaluations for all items, and were therefore usable at CAV of from 6-fold speed to 16-fold speed. In contrast, all of the media 300-G to I for comparison were evaluated as "x" for the jo change at 16-fold speed. Regarding the media 300-G to I, the jitter values as the initial characteristic were evaluated as "○," but it is thought that the crystallization speeds were slightly insufficient. In this example, the materials having a high crystallization temperature (200° C. or more), the crystalline structure of NaCl-type were used as the materials for the first, third, fifth and seventh constituent layers, and the recording layer was constructed to have a periodic composition. As a result, the crystallization speed was improved and simultaneously it was possible to secure the archival characteristic. In this way, also when recording layers of multiple-layer composition were formed by dividing the phase-change material including at least one element selected from rare-earth metals X and at least one element selected from Ge, Sb, Bi and Te, both of the archival characteristic at low linear velocities and the archival overwrite characteristic at high linear velocities were able to be satisfactory.

Example 8

As Example 8, a medium having a recording layer of composition similar to that of the medium 300-13 of Example 7 was fabricated, and a similar evaluation to that of Example 7 was performed. The medium of Example 8 differed from the medium of Example 7 in the point that the third constituent layer and the fifth constituent layer were formed by a material wherein an element that was other than Si and selected from group β (Al, Ag, Au, Co, Cr, Cu, Fe, Ga, Hf, In, Ir, Mn, Mo, Nb, Ni, Os, Pb, Pd, Pt, Re, Rh, Ru, Se, Sn, Ta, Ti, V, W, Zn, and Zr) was added to DyTe. In this Example, 30 types of medium 300-13-1 to 30 were fabricated.

The compositions of the third constituent layer and the fifth constituent layer of the media 300-13-1 to 30 were in order, $(DyTe)_{96}Al_4$, $(DyTe)_{96}Ag_4$, $(DyTe)_{96}Au_4$, $(DyTe)_{96}Co_4$, $(DyTe)_{96}Cr_4$, $(DyTe)_{96}Cu_4$, $(DyTe)_{96}Fe_4$, $(DyTe)_{96}Ga_4$, $(DyTe)_{96}Hf_4$, $(DyTe)_{96}In_4$, $(DyTe)_{96}Ir_4$, $(DyTe)_{96}Mn_4$, $(DyTe)_{96}Mo_4$, $(DyTe)_{96}Nb_4$, $(DyTe)_{96}Ni_4$, $(DyTe)_{96}Os_4$, $(DyTe)_{96}Pb_4$, $(DyTe)_{96}Pd_4$, $(DyTe)_{96}Pt_4$, $(DyTe)_{96}Re_4$, $(DyTe)_{96}Rh_4$, $(DyTe)_{96}Ru_4$, $(DyTe)_{96}Se_4$, $(DyTe)_{96}Sn_4$, $(DyTe)_{96}Ta_4$, $(DyTe)_{96}Ti_4$, $(DyTe)_{96}V_4$, $(DyTe)_{96}W_4$, $(DyTe)_{96}Zn_4$, and $(DyTe)_{96}Zr_4$.

Of these, for the materials containing a β element which has a melting point less than 250° C. in a state of simple substance, such as $(DyTe)_{96}Ga_4$, $(DyTe)_{96}In_4$, $(DyTe)_{96}Se_4$ and $(DyTe)_{96}Sn_4$, targets of Dy—Te, β—Te and Dy were set in one sputtering chamber, and the layer was formed by simultaneous sputtering. As a result of the evaluation of the media, the media 300-13-1 to 30, showed "○" evaluations for all of the items, and it was verified that they were able to be used at CAV of from 6-fold speed to 16-fold speed.

Example 9

In Example 9, an experiment was conducted for a memory by to which electric energy was applied. An information recording medium on which information is recorded by electrical means and a recording system therefor are shown in FIG. 4. In this example, the recording layer 403 of the information recording medium 400 shown in FIG. 4 was composed of a plurality of constituent layers in accordance with the present invention.

The information recording medium 400 of this example was fabricated as follows. Firstly, a Si substrate 401 was prepared having a nitrided surface and being 5 mm length, 5 mm width and 1 mm thickness. An Au lower electrode 402 having a 100 nm thickness was formed onto said substrate 401 in a region of 1 mm×1 mm. A recording layer 403 was formed until reaching a 100 nm thickness onto the lower electrode 402 in the region of 1 mm×1 mm, and an Au upper electrode 404 was formed until reaching a 100 nm thickness in the region of 0.6 mm×0.6 mm.

The recording layer 403 comprised the first constituent layer to the third constituent layer (M=3). Referring to the layer closest to the lower electrode 402 as the first constituent layer, the first constituent layer was a $Bi_2Te_3$ layer (10 nm thickness), the second constituent layer was a GeTe layer (80 nm thickness), and the third constituent layer was a $Bi_2Te_3$ layer (10 nm thickness).

All of the lower electrode 402, the recording layer 403 and the upper electrode 404 were formed by a sputtering method. These sputterings were successively formed by setting substrate 401 in a film-forming apparatus. Firstly, a lower electrode 402 was formed onto the substrate 401 by sputtering a target of Au with a power of 200 W. Next, a first constituent layer was formed onto the lower electrode 402 by sputtering a Bi—Te target with a power of 100 W, and a second constituent layer was formed onto the first constituent layer by sputtering a Ge—Te target with a power of 100 W. Next, a third constituent layer was formed onto the second constituent layer by sputtering a Bi—Te target with a power of 100 W, and the formation of the recording layer 403 was thereby completed. Next, an upper electrode 404 was formed onto the recording layer 403 by sputtering an Au target with a power of 200 W. All targets were of 100 mm diameter and 6 mm thickness. Furthermore, all of the sputtering was performed using a DC power supply in an Ar-gas atmosphere at 0.13 Pa pressure.

An occurrence of a reversible phase change in a recording layer 403 resulting from application of electric energy to an information recording medium 400 that was produced as described above was confirmed by the system shown in FIG. 4. As shown in FIG. 4, by bonding each of two application parts 409 to the lower electrode 402 and the upper electrode 404 by Au lead wires, the electrically recording/reproducing device 411 was connected to the information recording medium (memory) 400 by means of the application part 409. In the electrically recording/reproducing device 411, a pulse producing part 405 was connected by a switch 408, and furthermore, a resistance measuring device 406 was connected by a switch 407 between the application parts 409 connected to the lower electrode 402 and the upper electrode 404, respectively. The resistance measuring device 406 was connected to a judgment part 410 that judges whether the resistance measured by said resistance measuring device 406 was high or low. By using the pulse producing part 405, a current pulse was sent through the application part 409 between the upper electrode 404 and the lower electrode 402, and the resistance between the lower electrode 402 and the upper electrode 404 was measured using the resistance measuring device 406. The judgment part 410 judged whether the resistance was high or low. The resistance changes because of the phase change of the recording layer 403.

In the case of this example, the recording layer 403 had a melting point of 600° C., a crystallization temperature of 160° C., and a crystallization time of 40 ns. The resistance for the recording layer 403 between the lower electrode 402 and the upper electrode 404 was $1000\Omega$ in the amorphous state and $20\Omega$ in the crystalline state. When the recording layer 403 was in an amorphous state (in other words, a high resistance state), and when a current pulse of 20 mA and 50 ns was applied between the lower electrode 402 and the upper electrode 404. As a result, the resistance between the lower electrode 402 and the upper electrode 404 was decreased, and the recording layer 403 was transformed from an amorphous state into a crystalline state. Next, when the recording layer 403 was in a crystalline state (in other words, a low resistance state), a current pulse of 200 mA and 20 ns was applied between the lower electrode 402 and the upper electrode 404. As a result, the resistance between the lower electrode 402 and the upper electrode 404 was increased, and the recording layer 403 was transformed from a crystalline state into an amorphous state. In other words, a reversible phase change was confirmed. Furthermore, high-speed transformations of 100 ns or less was possible, and a high-speed memory was obtained.

From the above results, it was learned that a phase change was obtainable by applying electric energy to a three layer-composition recording layer comprising a first constituent layer $Bi_2Te_3$ (10 nm), a second constituent layer GeTe (80 nm) and a third constituent layer $Bi_2Te_3$ (10 nm). Therefore, it was confirmed that this information recording medium 400 including a recording layer had the function of high speed recording and erasing of information. Furthermore, it becomes possible to improve access capability and switching capability and increase memory capacity by connecting a plurality of information recording media 400.

In the above, as explained through various examples, the present invention can be applied to both information recording media that record by optical means and information recording media that record by electrical means. In other words, a recording layer comprised of a plurality of constituent layers makes it possible to obtain an information recording medium having high recording and erasing performance, excellent archival characteristic and archival overwrite characteristic at high linear velocities and over a wide range of linear velocities, which medium has not been previously realized.

Industrial Applicability

The information recording medium of the present invention has a recording layer that presents excellent performance and can be utilized as a large capacity optical information recording medium in such applications as DVD-RAM discs, DVD-RW discs, DVD+RW discs, and rewriteable Blu-ray Discs. Furthermore, the information recording medium of the present invention can also be utilized as an electrical high-speed switching device as an electrical information recording medium.

The invention claimed is:

1. An information recording medium which comprises a recording layer which has, as a whole, a composition that can generate phase change, wherein the recording layer comprises a first through an M-th constituent layers (wherein M is an integer of 4 or greater) which are stacked in a thickness direction, and elemental compositions of an m-th constituent layer and a (m+1)th constituent layer are different from each other and at least one m-th layer comprises Ge and Te, assuming that the constituent layer located at an m-th position from a laser light incident side is the m-th constituent layer, m being an integer and satisfying $1 \leq m \leq (M-1)$.

2. The information recording medium according to claim 1, where the first constituent layer and the M-th constituent layer have the same elemental composition.

3. The information recording medium according to claim 1, where the first constituent layer and the M-th constituent layer has different elemental compositions.

4. The information recording medium according to claim 1, wherein the constituent layers having the same elemental composition are located every second or third layer.

5. The information recording medium according to claim 1, wherein a thickness dm(nm) of each constituent layer satisfies $0.1 \leq dm \leq 15$.

6. The information recording medium according to claim 1, wherein at least other one m-th constituent layer is a constituent layer "R" which comprises at least one element selected from Te, Bi, Sb, Ge, In, Ga, Al, Sn, Pb, Se and Si.

7. The information recording medium according to claim 6, wherein the constituent layer "R" comprises Te and at least one element selected from Ge, Al, In and Ga.

8. The information recording medium according to claim 7, wherein a constituent layer adjacent to the constituent layer "R" is a constituent layer "Q" which comprise Bi and Te.

9. The information recording medium according to claim 8, wherein the constituent layer "Q" further comprises at least one element selected from Sb, Ge, In, Ga, Al, Sn, Pb, Se and Si.

10. The information recording medium according to claim 1, wherein at least other one m-th constituent layer is a constituent layer "T" which comprises Sb.

11. The information recording medium according to claim 10, wherein the constituent layer "T" further comprises at least one element selected from Te, Al, In, Ge, Sn and Ga.

12. The information recording medium according to claim 10, wherein the constituent layer "T" comprises Sb in an amount of 50 atomic % or more.

13. The information recording medium according to claim 1, the m-th constituent layer comprising Ge and Te comprises at least one element selected from Bi, Sb, In, Ga, Al, Pb, Se and Si.

14. The information recording medium according to claim 1, wherein the composition of the entire recording layer comprises a material of which crystallization temperature is 25° C. or lower in an amount of 40 mol % or more.

15. The information recording medium according to claim 1, wherein at least other one m-th constituent layer is a constituent layer "X" which comprises at least one element selected from Sc, Y, La, Ce, Pr, Nd, Sm, Gd, Tb, Dy, Ho, Er, Yb and Lu, and at least one element selected from Ge, Sb, Bi and Te.

16. The information recording medium according to claim 15, wherein the constituent layer "X" further comprises at least one element selected from Al, Ag, Au, Co, Cr, Cu, Fe, Ga, Hf, In, Ir, Mn, Mo, Nb, Ni, Os, Pb, Pd, Pt, Re, Rh, Ru, Se, Si, Sn, Ta, Ti, V, W, Zn and Zr.

17. The information recording medium according to claim 1, which comprises two or more information layers, wherein at least one information layer comprises the recording layer comprising the first through the m-th constituent layers.

18. A method for producing an information recording medium which comprises a step of forming a recording layer which has, as a whole, a composition which can generate phase change, wherein the step of forming the recording layer comprises a first through an M-th steps (M being an integer of 4 or more), and an m-th step and a (m+1) step that are successive are carried out by using sputtering targets whose elemental compositions are different from each other and at least one m-th step is carried out by using a sputtering target comprising Ge and Te, assuming that the step carried out m-thly is the m-th step, m being an integer and satisfying $1 \leq m \leq (M-1)$.

19. The method for producing an information recording medium according to claim 18, which further comprises determining the composition of the entire recording layer, dividing the composition into a plurality of groups and designing the recording layer so that the recording layer is consisted of a first through an M-th constituent layers and the elemental compositions of an m-th constituent layer and a (m+1)-th constituent layer are different from each other, and at least one m-th constituent layer comprises Ge and Te.

20. The method for producing an information recording medium according to claim 18, wherein the sputtering target used in at least other one m-th step comprises at least one element selected from Te, Bi, Sb, Ge, In, Ga, Al, Sn, Pb, Se, and Si.

21. The method for producing an information recording medium according to claim 18, wherein the sputtering target used in at least other one m-th step comprises Te and at least one element selected from Ge, Al, In, and Ga.

22. The method for producing an information recording medium according to claim 21, wherein the sputtering target used in a step immediately before or immediately after the at least one m-th step wherein the sputtering target comprising Te and at least one element selected from Ge, Al, In and Ga, comprises Bi and Te.

23. The method for producing an information recording medium according to claim 22, wherein the sputtering target comprising Bi and Te further comprises at least one element selected from Sb, Ge, In, Ga, Al, Sn, Pb, Se and Si.

24. The method for producing an information recording medium according to claim 18, wherein the sputtering target used in at least other one m-th step comprises Sb.

25. The method for producing an information recording medium according to claim 24, wherein the sputtering target comprising Sb further comprises at least one element selected from Te, Al, In and Ga.

26. A method for producing an information recording medium comprising two or more information layers, wherein a step of forming each information layer comprises a step of forming a recording layer which has, as a whole, a composition which can generate phase change, and at least one step of forming the recording layer comprises a first through an M-th steps (M being an integer of 4 or more), an m-th step and a (m+1) step that are successive are carried out by using sputtering targets whose elemental compositions are different from each other and at least one m-th step is carried out by using a sputtering target comprising Ge and Te, assuming that the step carried out m-thly is the m-th step, m being an integer and satisfying $1 \leq m \leq (M-1)$.

27. The method for producing an information recording medium according to claim 26, wherein the at least one step of forming the recording layer comprises determining the composition of the entire recording layer, dividing the composition into a plurality of groups and designing the recording layer so that the recording layer is consisted of a first through an M-th constituent layers and the elemental compositions of an m-th constituent layer and a (m+1)-th constituent layer are different from each other.

28. An information recording medium which comprises a recording layer which has, as a whole, a composition that can generate phase change by application of electric energy, wherein the recording layer comprises a first through an M-th constituent layers (wherein M is an integer of 4 or greater) which are stacked in a thickness direction, elemental compositions of an m-th constituent layer and a (m+1)th constituent layer are different from each other and at least one m-th constituent layer comprises Ge and Te, assuming that the constituent layer located at an m-th position from a substrate side is the m-th constituent layer, m being an integer and satisfying $1 \leq m \leq (M-1)$.

29. The information recording medium according to claim 28, wherein a thickness dm(nm) of each constituent layer satisfies $1 \leq dm < 100$.

30. The information recording medium according to claim 28, wherein at least other one m-th constituent layer comprises at least one element selected from Te, Bi, Sb, Ge, In, Ga, Al, Sn, Pb, Se, and Si.

31. The method for producing an information recording medium according to claim 18, wherein the sputtering target comprising Ge and Te comprises at least one element selected from Bi, Sb, In, Ga, Al, Pb, Se and Si.

32. The method for producing an information recording medium according to claim 26, wherein the sputtering target comprising Ge and Te comprises at least one element selected from Bi, Sb, In, Ga, Al, Pb, Se and Si.

* * * * *